(12) United States Patent
Zhang et al.

(10) Patent No.: US 12,322,873 B2
(45) Date of Patent: Jun. 3, 2025

(54) ELECTRONIC DEVICE

(71) Applicant: Huawei Technologies Co., Ltd., Shenzhen (CN)

(72) Inventors: Xiaowei Zhang, Shenzhen (CN); Dong Yu, Shanghai (CN); Meng Hou, Shanghai (CN); Hanyang Wang, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 17/780,848

(22) PCT Filed: Nov. 5, 2020

(86) PCT No.: PCT/CN2020/126746
§ 371 (c)(1),
(2) Date: May 27, 2022

(87) PCT Pub. No.: WO2021/103974
PCT Pub. Date: Jun. 3, 2021

(65) Prior Publication Data
US 2023/0008642 A1    Jan. 12, 2023

(30) Foreign Application Priority Data
Nov. 30, 2019    (CN) .......................... 201911209354.6

(51) Int. Cl.
*H01Q 1/22*    (2006.01)
*H01Q 5/10*    (2015.01)
(Continued)

(52) U.S. Cl.
CPC ............. *H01Q 5/28* (2015.01); *H01Q 1/2266* (2013.01); *H01Q 5/10* (2015.01); *H01Q 5/307* (2015.01); *H01Q 1/243* (2013.01)

(58) Field of Classification Search
CPC .......... H01Q 5/28; H01Q 1/2266; H01Q 5/10; H01Q 5/307; H01Q 1/243; H01Q 1/245;
(Continued)

(56) References Cited

U.S. PATENT DOCUMENTS 5,798,734 A    8/1998    Ohtsuka et al.
6,377,227 B1    4/2002    Zhu et al.
(Continued)

FOREIGN PATENT DOCUMENTS

CN    1154579 A    7/1997
CN    101540432 A    9/2009
(Continued)

OTHER PUBLICATIONS

Liu, G., et al., "Low-SAR hexa-band antenna for mobile applications," 2015 IEEE International Symposium on Antennas and Propagation and USNC/URSI National Radio Science Meeting, Vancouver, BC, Canada, 2015, pp. 372-373, doi: 10.1109/APS.2015.7304572.
(Continued)

*Primary Examiner* — Hai V Tran
*Assistant Examiner* — Michael M Bouizza
(74) *Attorney, Agent, or Firm* — Conley Rose, P.C.

(57) ABSTRACT

An electronic device comprises a first radiator coupled to a second radiator. One end of a second branch of the second radiator is connected between a head end and a tail end of a first branch of the second radiator. The other end of the second branch is connected between a head end and a tail end of a third branch of the second radiator. A projection of a reference face of the first branch on the first radiator is a first projection. The first projection partly overlaps the first radiator, or a distance between the first projection and the first radiator is within a range of 0 to 3 millimeters. A ratio of a first center distance between an end face of the third (Continued)

branch and the reference face, and a second center distance between the other end face of the third branch and the reference face is within a range of 0.5 to 2.

20 Claims, 43 Drawing Sheets

(51) Int. Cl.
*H01Q 5/28* (2015.01)
*H01Q 5/307* (2015.01)
*H01Q 1/24* (2006.01)

(58) Field of Classification Search
CPC .......... H01Q 5/385; H01Q 7/00; H01Q 5/371; H01Q 5/378; H01Q 9/42; H01Q 1/38; H01Q 1/22; H01Q 1/2258; H01Q 1/242; H01Q 1/48; H01Q 1/50; H04M 1/026
See application file for complete search history.

(56) References Cited

U.S. PATENT DOCUMENTS

| | | |
|---|---|---|
| 2004/0027295 A1 | 2/2004 | Huber et al. |
| 2008/0158086 A1 | 7/2008 | Yamagajo et al. |
| 2008/0316135 A1 | 12/2008 | Hilgers |
| 2010/0231468 A1 | 9/2010 | Ogino et al. |
| 2012/0050113 A1 | 3/2012 | Lan et al. |
| 2013/0033411 A1 | 2/2013 | Tsai |
| 2015/0288074 A1 | 10/2015 | Harper et al. |
| 2016/0248146 A1* | 8/2016 | Wang ........................ H01Q 7/00 |
| 2016/0276742 A1 | 9/2016 | Yu et al. |
| 2018/0254514 A1 | 9/2018 | Xiong |
| 2019/0006755 A1 | 1/2019 | Liao et al. |
| 2021/0184357 A1* | 6/2021 | Xu ........................... H01Q 1/48 |

FOREIGN PATENT DOCUMENTS

| | | |
|---|---|---|
| CN | 101710644 A | 5/2010 |
| CN | 102780072 A | 11/2012 |
| CN | 102916261 A | 2/2013 |
| CN | 203760655 U | 8/2014 |
| CN | 104022358 A | 9/2014 |
| CN | 104466356 A | 3/2015 |
| CN | 106654555 A | 5/2017 |
| CN | 106848594 A | 6/2017 |
| CN | 104956542 B | 9/2017 |
| CN | 107317100 A | 11/2017 |
| CN | 108054504 A | 5/2018 |
| CN | 108767499 A | 11/2018 |
| CN | 109066071 A | 12/2018 |
| CN | 109768386 A | 5/2019 |
| CN | 110034397 A | 7/2019 |
| CN | 110474157 A | 11/2019 |
| CN | 209709165 U | 11/2019 |
| WO | 2007015205 A1 | 2/2007 |

OTHER PUBLICATIONS

He, Y., et al., "Antenna design for a full-screen smart mobile phone," Chinese Journal of Radio Science, vol. 33 No. 4, Aug. 2018, 7 pages.

* cited by examiner

ELECTRONIC DEVICE

CROSS-REFERENCE TO RELATED APPLICATIONS

This is a U.S. National Stage of International Patent Application No. PCT/CN2020/126746 filed on Nov. 5, 2020, which claims priority to Chinese Patent Application No. 201911209354.6 filed on Nov. 30, 2019, both of which are hereby incorporated by reference in their entireties.

TECHNICAL FIELD

This application relates to the field of antenna technologies, and in particular, to an electronic device.

BACKGROUND

As functions of mobile phones become richer, communication coverage of conventional mobile phones needs to be wider. In this case, to meet communication coverage requirements of the conventional mobile phones, many researchers pay more attention to development of antenna technologies. However, a resonance mode generated by an antenna of a conventional electronic device is a differential mode. In the differential mode, a specific absorption rate SAR (Specific Absorption Ratio) may be relatively high.

SUMMARY

An electronic device provided in the technical solutions of this application can generate a resonance mode for one or more convection modes.

According to a first aspect, a technical solution of this application provides an electronic device. The electronic device includes a first radiator and a second radiator. The first radiator is coupled to the second radiator. In other words, a radio frequency signal can be coupled and fed to the second radiator through the first radiator. A radio frequency signal can also be coupled and fed to the first radiator through the second radiator.

The second radiator includes a first branch, a second branch, and a third branch. One end of the second branch is connected between a head end and a tail end of the first branch. The head end and the tail end of the first branch are respectively located on two sides of the second branch. The other end of the second branch is connected between a head end and a tail end of the third branch. The head end of the third branch and the tail end of the third branch are located on the two sides of the second branch. It may be understood that the two sides of the second branch may be understood as two sides of the second branch itself, or may be understood as two sides in an extension direction of the second branch.

The first branch has a reference face away from the second branch. A projection of the reference face on the first radiator is a first projection. The first projection partly or completely overlaps the first radiator, or a shortest distance between the first projection and the first radiator is within a range of 0 to 3 millimeters. In this case, a strong coupling can be implemented between the first radiator and the second radiator. In other words, when a current on the first radiator generates a magnetic field, the second radiator may be located in a relatively strong magnetic field region of the first radiator.

A center distance between an end face of the head end of the third branch and the reference face is a first value. A center distance between an end face of the tail end of the third branch and the reference face is a second value. A ratio of the first value to the second value is within a range of 0.5 to 2. In other words, the second radiator has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, when the first radiator and the second radiator radiate signals, the signals have little adverse impact on a user.

In an implementation, the third branch includes a first bifurcation branch and a second bifurcation branch. An end portion of the first bifurcation branch away from the second bifurcation branch is the head end of the third branch. An end portion of the second bifurcation branch away from the first bifurcation branch is the tail end of the third branch.

Both the first bifurcation branch and the second bifurcation branch are strip-shaped. An included angle between the first bifurcation branch and the second bifurcation branch is a, and a satisfies: $0° < a \leq 180°$. In other words, when $0° < a < 180°$, the third branch is approximately V-shaped or is V-shaped. When $a=180°$, the third branch is strip-shaped.

In this implementation, because the third branch is approximately V-shaped, or is V-shaped, or is strip-shaped, symmetry of the second radiator is better. In addition, a structure of the third branch is simple to facilitate processing.

In an implementation, the second radiator further includes a fourth branch, a third bifurcation branch, and a fourth bifurcation branch. The fourth branch, the third bifurcation branch, and the fourth bifurcation branch are all located on one side of the first branch away from the second branch. One end of the fourth branch is connected to a head end of the third bifurcation branch and a head end of the fourth bifurcation branch, and the other end of the fourth branch is connected to the reference face. A tail end of the third bifurcation branch and a tail end of the fourth bifurcation branch are located on two sides of the fourth branch. It may be understood that the two sides of the fourth branch may be understood as two sides of the fourth branch itself, or may be understood as two sides in an extension direction of the fourth branch.

A center distance between an end face of the tail end of the third bifurcation branch and the reference face is a third value. A center distance between an end face of the tail end of the fourth bifurcation branch and the reference face is a fourth value. A ratio of the third value to the fourth value is within a range of 0.5 to 2.

It may be understood that because the fourth branch, the third bifurcation branch, and the fourth bifurcation branch are connected on one side of the first branch away from the second branch, a convection mode is generated by using the third bifurcation branch and the fourth bifurcation branch, that is, a quantity of convection modes generated by the first radiator and the second radiator is further increased. In this case, a resonance mode with a low specific absorption rate covers a relatively wide frequency band. Therefore, the operating frequency band of the antenna is wider.

In an implementation, the third bifurcation branch extends in a direction away from the reference face. Alternatively, an extension direction of the third bifurcation branch is parallel to an extension direction of the reference face. The fourth bifurcation branch extends in a direction away from the first branch. Alternatively, an extension direction of the second bifurcation branch is parallel to an extension direction of the first branch.

In an implementation, both the third bifurcation branch and the fourth bifurcation branch are strip-shaped. An included angle between the third bifurcation branch and the fourth bifurcation branch is greater than 0° and less than or equal to 180°.

In an implementation, the second radiator further includes a fourth branch, a third bifurcation branch, and a fourth bifurcation branch. The fourth branch, the third bifurcation branch, and the fourth bifurcation branch are all located on one side of the first bifurcation branch and the second bifurcation branch away from the second branch. One end of the fourth branch is connected to a head end of the first bifurcation branch and a head end of the second bifurcation branch, and the other end of the fourth branch is connected to a head end of the third bifurcation branch and a head end of the fourth bifurcation branch. A tail end of the third bifurcation branch and a tail end of the fourth bifurcation branch are located on two sides of the fourth branch. The two sides of the fourth branch may be understood as two sides of the fourth branch itself, or may be understood as two sides in an extension direction of the fourth branch.

A center distance between an end face of the tail end of the third bifurcation branch and the reference face is a third value. A center distance between an end face of the tail end of the fourth bifurcation branch and the reference face is a fourth value. A ratio of the third value to the fourth value is within a range of 0.5 to 2.

Because the fourth branch, the third bifurcation branch and the fourth bifurcation branch are connected on one side of the first bifurcation branch and the second bifurcation branch away from the second branch, a convection mode is generated by using the current on the third bifurcation branch and the fourth bifurcation branch, that is, a quantity of convection modes generated by the first radiator and the second radiator is further increased. In this case, a resonance mode with a low specific absorption rate covers a relatively wide frequency band. Therefore, the operating frequency band of the antenna is wider.

In an implementation, the third bifurcation branch extends in a direction away from the reference face. Alternatively, an extension direction of the third bifurcation branch is parallel to an extension direction of the reference face. The fourth bifurcation branch extends in a direction away from the first branch. Alternatively, an extension direction of the second bifurcation branch is parallel to an extension direction of the first branch.

In an implementation, both the third bifurcation branch and the fourth bifurcation branch are strip-shaped. An included angle between the third bifurcation branch and the fourth bifurcation branch is greater than 0° and less than or equal to 180°.

In an implementation, the first radiator includes a first feeding branch. The first feeding branch has a grounding point. The first feeding branch includes a first end face and a second end face disposed away from the first end face. A distance between a center of the first end face and the grounding point is a fifth value. A distance between a center of the second end face and the grounding point is a sixth value. A ratio of the fifth value to the sixth value is within a range of 0.3 to 3. In this case, the first feeding branch has a quasi-symmetrical or symmetrical structure.

It may be understood that because the first feeding branch is disposed with a quasi-symmetrical or symmetrical structure, after the first radiator receives a radio frequency signal, the first radiator can generate a convection mode, that is, the first radiator has a resonance frequency of a convection mode. In this case, the operating frequency band of the antenna is set near the resonance frequency of the convection mode. In this way, w % ben the first radiator and the second radiator radiate signals, the signals have little adverse impact on the user.

In an implementation, the first radiator further includes a connection branch and a second feeding branch. The second feeding branch includes a first tail end and a second tail end disposed away from the first tail end. One end of the connection branch is connected between the first end face and the second end face of the first feeding branch, and the other end of the connection branch is connected between the first tail end and the second tail end. The first tail end and the second tail end are located on two sides of the connection branch. The two sides of the connection branch may be understood as two sides of the connection branch itself, or may be understood as two sides in an extension direction of the connection branch.

A distance between a center of an end face of the first tail end and the grounding point is a seventh value. A distance between a center of an end face of the second tail end and the grounding point is an eighth value. A ratio of the seventh value to the eighth value is within a range of 0.3 to 3. In other words, when the first radiator has the connection branch and the second feeding branch, the first radiator still has a quasi-symmetrical or symmetrical structure.

In this implementation, because the connection branch and the second feeding branch are disposed on one side of the first feeding branch, a convection mode is generated by using the connection branch and the second feeding branch, that is, a quantity of convection modes generated by the first radiator and the second radiator is further increased. In this case, a resonance mode with a low specific absorption rate covers a relatively wide frequency band. Therefore, the operating frequency band of the antenna is wider.

In an implementation, the first radiator includes a first feeding branch. The first feeding branch includes a first end face and a second end face disposed away from the first end face. A distance between a center of the first end face and a feeding point of the first feeding branch is a fifth value. A distance between a center of the second end face and the feeding point is a sixth value. A ratio of the fifth value to the sixth value is within a range of 0.3 to 3. In other words, the first radiator has a quasi-symmetrical or symmetrical structure.

It may be understood that because the first feeding branch is disposed with a quasi-symmetrical or symmetrical structure, after the first radiator receives a radio frequency signal, the first radiator can generate a convection mode, that is, the first radiator has a resonance frequency of a convection mode. In this case, the operating frequency band of the antenna is set near the resonance frequency of the convection mode. In this way, w % ben the first radiator and the second radiator radiate signals, the signals have little adverse impact on the user.

In an implementation, the first radiator is an inverted-F antenna, a composite left/right-handed antenna, or a loop antenna.

It may be understood that when the second radiator having a quasi-symmetrical structure or a symmetrical structure cooperates with the inverted-F antenna, the composite left/right-handed antenna, or the loop antenna, the second radiator can also generate a convection mode. In this case, the operating frequency band of the antenna is set near the resonance frequency of the convection mode. In this way, when the first radiator and the second radiator radiate signals, the signals have little adverse impact on the user.

In an implementation, the electronic device further includes a third radiator. The third radiator is coupled to the first radiator.

The third radiator includes a fifth bifurcation branch and a sixth bifurcation branch. A head end of the fifth bifurcation branch is connected to a head end of the sixth bifurcation branch. The fifth bifurcation branch extends in a direction away from the reference face, and the sixth bifurcation branch extends away from the reference face.

A projection of the third radiator on the first radiator is a second projection. The second projection is partly or completely located in the first radiator, or a shortest distance between the second projection and the first radiator is within a range of 0 to 3 millimeters.

A center distance between an end face of the head end and an end face of a tail end of the fifth bifurcation branch is a ninth value. A center distance between an end face of the head end and an end face of a tail end of the sixth bifurcation branch is a tenth value. A ratio of the ninth value to the tenth value is within a range of 0.5 to 2. In other words, the third radiator has a quasi-symmetrical or symmetrical structure.

In this implementation, because the third radiator is disposed on one side of the second radiator away from the first radiator, a convection mode is generated by using a current on the third radiator, that is, a quantity of convection modes generated by the first radiator, the second radiator, and the third radiator is further increased. In this case, a resonance mode with a low specific absorption rate covers a relatively wide frequency band. Therefore, the operating frequency band of the antenna is wider.

In an implementation, the electronic device further includes a housing. A screen is mounted in the housing. An accommodating space is enclosed by the screen and the housing. The housing includes a first surface and a second surface that are disposed opposite to each other. The first surface faces the accommodating space. The first radiator is fixed to the first surface. The second radiator is fixed to the second surface.

It may be understood that because the first radiator is fixed to the first surface and the second radiator is fixed to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator is fixed to a surface of the support facing the accommodating space. The second radiator is fixed to a surface of the housing facing the accommodating space, or the second radiator is fixed to a surface of the housing away from the accommodating space.

Because the first radiator is fixed to the surface of the support facing the accommodating space and the second radiator is fixed to the surface of the housing facing the accommodating space, both the first radiator and the second radiator are located in the accommodating space, and further, the first radiator and the second radiator are protected by using the housing and the screen. In addition, because the second radiator is fixed to the surface of the housing facing the accommodating space, a space of the housing is effectively used.

Alternatively, because the first radiator is fixed to the surface of the support facing the accommodating space and the second radiator is fixed to the surface of the housing away from the accommodating space, a distance between the first radiator and the second radiator is increased, that is, the antenna has a relatively large clear space.

In an implementation, the electronic device further includes a housing, a screen, a circuit board, and a support, where the screen is mounted in the housing, an accommodating space is enclosed by the screen and the housing, the circuit board is fixed in the accommodating space, the support is fixed to the circuit board and encloses a space with the circuit board, and the first radiator is fixed to a surface of the support facing the space; and the second radiator is fixed to a surface of the support away from the space; or the second radiator is fixed to a surface of the housing facing the accommodating space; or the second radiator is fixed to a surface of the housing away from the accommodating space.

In this implementation, because the first radiator is fixed to the surface of the support facing the space, on one hand, the first radiator is effectively protected by using the support, and on the other hand, a distance between the first radiator and the second radiator can be increased. Therefore, the antenna has a relatively large clear space.

According to a second aspect, a technical solution of this application provides an electronic device. The electronic device includes a first radiator and a second radiator. The first radiator is coupled to the second radiator. In other words, a radio frequency signal can be coupled and fed to the second radiator through the first radiator, or can be coupled and fed to the first radiator through the second radiator.

The second radiator includes a first branch, a first bifurcation branch, and a second bifurcation branch. One end of the first branch is connected to a head end of the first bifurcation branch and a head end of the second bifurcation branch. A tail end of the first bifurcation branch and a tail end of the second bifurcation branch are located on two sides of the first branch. It may be understood that the two sides of the first branch may be understood as two sides of the first branch itself, or may be understood as two sides in an extension direction of the first branch.

The first branch has a reference face away from the first bifurcation branch and the second bifurcation branch. A projection of the reference face on the first radiator is a first projection. The first projection partly or completely overlaps the first radiator, or a shortest distance between the first projection and the first radiator is within a range of 0 to 3 millimeters. In other words, a strong coupling can be implemented between the first radiator and the second radiator.

A center distance between an end face of the tail end of the first bifurcation branch and the reference face is a first value. A center distance between an end face of the tail end of the second bifurcation branch and the reference face is a second value. A ratio of the first value to the second value is within a range of 0.5 to 2. In other words, the second radiator has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, when the first radiator and the second radiator radiate signals, the signals have little adverse impact on a user.

In an implementation, both the first bifurcation branch and the second bifurcation branch are strip-shaped. An included angle between the first bifurcation branch and the second bifurcation branch is a, and a satisfies: 0°<a≤180°. In other words, when 0°<a<180°, the first bifurcation branch and the second bifurcation branch are approximately V-shaped or are V-shaped. When a=180°, the first bifurcation branch and the second bifurcation branch are strip-shaped.

In this implementation, because the second radiator is approximately V-shaped, or is V-shaped, or is strip-shaped, symmetry of the second radiator is better. In addition, a structure of the second radiator is simple to facilitate processing.

In an implementation, the first radiator includes a first feeding branch. The first feeding branch has a grounding point. The first feeding branch includes a first end face and a second end face disposed away from the first end face. A distance between a center of the first end face and the grounding point is a fifth value. A distance between a center of the second end face and the grounding point is a sixth value. A ratio of the fifth value to the sixth value is within a range of 0.3 to 3. In other words, the first feeding branch has a quasi-symmetrical or symmetrical structure.

It may be understood that because the first feeding branch is disposed with a quasi-symmetrical or symmetrical structure, after the first radiator receives a radio frequency signal, the first radiator can generate a convection mode, that is, the first radiator has a resonance frequency of a convection mode. In this case, the operating frequency band of the antenna is set near the resonance frequency of the convection mode. In this way, when the first radiator and the second radiator radiate signals, the signals have little adverse impact on the user.

In an implementation, the first radiator further includes a connection branch and a second feeding branch. The second feeding branch includes a first tail end and a second tail end disposed away from the first tail end. One end of the connection branch is connected between the first end face and the second end face of the first feeding branch, and the other end of the connection branch is connected between the first tail end and the second tail end. The first tail end and the second tail end are located on two sides of the connection branch. It may be understood that the two sides of the connection branch may be understood as two sides of the connection branch itself, or may be understood as two sides in an extension direction of the connection branch.

A distance between a center of an end face of the first tail end and the grounding point is a seventh value. A distance between a center of an end face of the second tail end and the grounding point is an eighth value. A ratio of the seventh value to the eighth value is within a range of 0.3 to 3. In other words, when the first radiator has the connection branch and the second feeding branch, the first radiator still has a quasi-symmetrical or symmetrical structure.

In this implementation, because the connection branch and the second feeding branch are disposed on one side of the first feeding branch, a convection mode is generated by using the connection branch and the second feeding branch, that is, a quantity of convection modes generated by the first radiator and the second radiator is further increased. In this case, a resonance mode with a low specific absorption rate covers a relatively wide frequency band. Therefore, the operating frequency band of the antenna is wider.

In an implementation, the first radiator includes a first feeding branch. The first feeding branch includes a first end face and a second end face disposed away from the first end face. A distance between a center of the first end face and a feeding point of the first feeding branch is a fifth value. A distance between a center of the second end face and the feeding point is a sixth value. A ratio of the fifth value to the sixth value is within a range of 0.3 to 3. In other words, the first radiator has a quasi-symmetrical or symmetrical structure.

It may be understood that because the first feeding branch is disposed with a quasi-symmetrical or symmetrical structure, after the first radiator receives a radio frequency signal, the first radiator can generate a convection mode, that is, the first radiator has a resonance frequency of a convection mode. In this case, the operating frequency band of the antenna is set near the resonance frequency of the convection mode. In this way, when the first radiator and the second radiator radiate signals, the signals have little adverse impact on the user.

In an implementation, the first radiator is an inverted-F antenna, a composite left/right-handed antenna, or a loop antenna.

It may be understood that when the second radiator having a quasi-symmetrical structure or a symmetrical structure cooperates with the inverted-F antenna, the composite left/right-handed antenna, or the loop antenna, the second radiator can also generate a convection mode. In this case, the operating frequency band of the antenna is set near the resonance frequency of the convection mode. In this way, when the first radiator and the second radiator radiate signals, the signals have little adverse impact on the user.

In an implementation, the electronic device further includes a housing. The screen is mounted in the housing. An accommodating space is enclosed by the screen and the housing. The housing includes a first surface and a second surface that are disposed opposite to each other. The first surface faces the accommodating space. The first radiator is fixed to the first surface. The second radiator is fixed to the second surface.

It may be understood that because the first radiator is fixed to the first surface and the second radiator is fixed to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator is fixed to a surface of the support facing the accommodating space. The second radiator is fixed to a surface of the housing facing the accommodating space, or the second radiator is fixed to a surface of the housing away from the accommodating space.

Because the first radiator is fixed to the surface of the support facing the accommodating space and the second radiator is fixed to the surface of the housing facing the accommodating space, both the first radiator and the second radiator are located in the accommodating space, and further, the first radiator and the second radiator are protected by using the housing and the screen. In addition, because the second radiator is fixed to the surface of the housing facing the accommodating space, a space of the housing is effectively used.

Alternatively, because the first radiator is fixed to the surface of the support facing the accommodating space and the second radiator is fixed to the surface of the housing away from the accommodating space, a distance between the first radiator and the second radiator is increased, that is, the antenna has a relatively large clear space.

In an implementation, the electronic device further includes a housing, a screen, a circuit board, and a support, where the screen is mounted in the housing, an accommodating space is enclosed by the screen and the housing, the circuit board is fixed in the accommodating space, the support is fixed to the circuit board and encloses a space with the circuit board, and the first radiator is fixed to a surface of the support facing the space; and the second radiator is fixed to a surface of the support away from the space; or the second radiator is fixed to a surface of the housing facing the accommodating space; or the second radiator is fixed to a surface of the housing away from the accommodating space.

In this implementation, because the first radiator is fixed to the surface of the support facing the space, on one hand, the first radiator is effectively protected by using the support, and on the other hand, a distance between the first radiator and the second radiator can be increased. Therefore, the antenna has a relatively large clear space.

According to a third aspect, a technical solution of this application provides an electronic device. The electronic device includes a first radiator and a second radiator. The first radiator is coupled to the second radiator. In other words, a radio frequency signal can be coupled and fed to the second radiator through the first radiator, or can be coupled and fed to the first radiator through the second radiator.

The second radiator includes a first bifurcation branch and a second bifurcation branch. A head end of the first bifurcation branch is connected to a head end of the second bifurcation branch. The first bifurcation branch extends in a direction away from the head end of the second bifurcation branch. The second bifurcation branch extends in a direction away from the head end of the first bifurcation branch.

A projection of the second radiator on the first radiator is a first projection. The first projection partly or completely overlaps the first radiator, or a shortest distance between the first projection and the first radiator is within a range of 0 to 3 millimeters. In other words, a strong coupling can be implemented between the first radiator and the second radiator.

A center distance between an end face of the head end and an end face of a tail end of the first bifurcation branch is a first value. A center distance between an end face of the head end and an end face of a tail end of the second bifurcation branch is a second value. A ratio of the first value to the second value is within a range of 0.2 to 2. In other words, the second radiator has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, when the first radiator and the second radiator radiate signals, the signals have little adverse impact on a user.

In an implementation, both the first bifurcation branch and the second bifurcation branch are strip-shaped. An included angle between the first bifurcation branch and the second bifurcation branch is a, and a satisfies: 0°<a<180°. In other words, when 0°<a<180°, the first bifurcation branch and the second bifurcation branch are approximately V-shaped or are V-shaped.

In this implementation, because the third branch is approximately V-shaped or is V-shaped, symmetry of the second radiator is better. In addition, a structure of the second radiator is simple to facilitate processing.

In an implementation, the first radiator includes a first feeding branch. The first feeding branch has a grounding point. The first feeding branch includes a first end face and a second end face disposed away from the first end face. A distance between a center of the first end face and the grounding point is a fifth value. A distance between a center of the second end face and the grounding point is a sixth value. A ratio of the fifth value to the sixth value is within a range of 0.3 to 3. In this case, the first feeding branch has a quasi-symmetrical or symmetrical structure.

It may be understood that because the first feeding branch is disposed with a quasi-symmetrical or symmetrical structure, after the first radiator receives a radio frequency signal, the first radiator can generate a convection mode, that is, the first radiator has a resonance frequency of a convection mode. In this case, the operating frequency band of the antenna is set near the resonance frequency of the convection mode. In this way, when the first radiator and the second radiator radiate signals, the signals have little adverse impact on the user.

In an implementation, the first radiator further includes a connection branch and a second feeding branch. The second feeding branch includes a first tail end and a second tail end disposed away from the first tail end. One end of the connection branch is connected between the first end face and the second end face of the first feeding branch, and the other end of the connection branch is connected between the first tail end and the second tail end. The first tail end and the second tail end are located on two sides of the connection branch. It may be understood that the two sides of the connection branch may be understood as two sides of the connection branch itself, or may be understood as two sides in an extension direction of the connection branch.

A distance between a center of an end face of the first tail end and the grounding point is a seventh value. A distance between a center of an end face of the second tail end and the grounding point is an eighth value. A ratio of the seventh value to the eighth value is within a range of 0.3 to 3. In other words, when the first radiator has the connection branch and the second feeding branch, the first radiator still has a quasi-symmetrical or symmetrical structure.

In this implementation, because the connection branch and the second feeding branch are disposed on one side of the first feeding branch, a convection mode is generated by using the connection branch and the second feeding branch, that is, a quantity of convection modes generated by the first radiator and the second radiator is further increased. In this case, a resonance mode with a low specific absorption rate covers a relatively wide frequency band. Therefore, the operating frequency band of the antenna is wider.

In an implementation, the first radiator includes a first feeding branch. The first feeding branch includes a first end face and a second end face disposed away from the first end face. A distance between a center of the first end face and a feeding point of the first feeding branch is a fifth value. A distance between a center of the second end face and the feeding point is a sixth value. A ratio of the fifth value to the sixth value is within a range of 0.3 to 3. In other words, the first radiator has a quasi-symmetrical or symmetrical structure.

It may be understood that because the first feeding branch is disposed with a quasi-symmetrical or symmetrical structure, after the first radiator receives a radio frequency signal, the first radiator can generate a convection mode, that is, the first radiator has a resonance frequency of a convection mode. In this case, the operating frequency band of the antenna is set near the resonance frequency of the convection mode. In this way, when the first radiator and the second radiator radiate signals, the signals have little adverse impact on the user.

In an implementation, the first radiator is an inverted-F antenna, a composite left/right-handed antenna, or a loop antenna.

It may be understood that when the second radiator having a quasi-symmetrical structure or a symmetrical structure cooperates with the inverted-F antenna, the composite left/right-handed antenna, or the loop antenna, the second radiator can also generate a convection mode. In this case, the operating frequency band of the antenna is set near the resonance frequency of the convection mode. In this way, when the first radiator and the second radiator radiate signals, the signals have little adverse impact on the user.

In an implementation, the electronic device further includes a housing. The screen is mounted in the housing. An accommodating space is enclosed by the screen and the housing. The housing includes a first surface and a second surface that are disposed opposite to each other. The first surface faces the accommodating space. The first radiator is fixed to the first surface. The second radiator is fixedly connected to the second surface.

It may be understood that because the first radiator is fixed to the first surface and the second radiator is fixedly connected to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator is fixed to a surface of the support facing the accommodating space. The second radiator is fixed to a surface of the housing facing the accommodating space, or the second radiator is fixed to a surface of the housing away from the accommodating space.

Because the first radiator is fixed to the surface of the support facing the accommodating space and the second radiator is fixed to the surface of the housing facing the accommodating space, both the first radiator and the second radiator are located in the accommodating space, and further, the first radiator and the second radiator are protected by using the housing and the screen. In addition, because the second radiator is fixed to the surface of the housing facing the accommodating space, a space of the housing is effectively used.

Alternatively, because the first radiator is fixed to the surface of the support facing the accommodating space and the second radiator is fixed to the surface of the housing away from the accommodating space, a distance between the first radiator and the second radiator is increased, that is, the antenna has a relatively large clear space.

In an implementation, the electronic device further includes a housing, a screen, a circuit board, and a support, where the screen is mounted in the housing, an accommodating space is enclosed by the screen and the housing, the circuit board is fixed in the accommodating space, the support is fixed to the circuit board and encloses a space with the circuit board, and the first radiator is fixed to a surface of the support facing the space; and
the second radiator is fixed to a surface of the support away from the space; or
the second radiator is fixed to a surface of the housing facing the accommodating space; or
the second radiator is fixed to a surface of the housing away from the accommodating space.

In this implementation, because the first radiator is fixed to the surface of the support facing the space, on one hand, the first radiator is effectively protected by using the support, and on the other hand, a distance between the first radiator and the second radiator can be increased. Therefore, the antenna has a relatively large clear space.

According to a fourth aspect, a technical solution of this application provides an electronic device. The electronic device includes a first radiator and a second radiator. The first radiator is coupled to the second radiator. In other words, a radio frequency signal can be coupled and fed to the second radiator through the first radiator. A radio frequency signal can also be coupled and fed to the first radiator through the second radiator.

The first radiator includes a first end face and a second end face disposed away from the first end face. The second radiator includes a third end face and a fourth end face disposed away from the third end face. The first end face is located between the third end face and the fourth end face. The second end face is located between the first end face and the fourth end face.

A projection of the second radiator on the first radiator is a first projection. The first projection partly or completely overlaps the first radiator, or a distance between the first projection and the first radiator is within a range of 0 to 3 millimeters. In this case, a strong coupling can be implemented between the first radiator and the second radiator.

A center distance between the first end face and the third end face is a first value. A center distance between the second end face and the fourth end face is a second value. A ratio of the first value to the second value is within a range of 0.5 to 2. In other words, the second radiator has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, when the first radiator and the second radiator radiate signals, the signals have little adverse impact on a user.

In an implementation, the second radiator is strip-shaped.

In this implementation, because the second radiator is strip-shaped, a structure of the second radiator is simplified to facilitate processing and manufacturing.

In an implementation, the electronic device further includes a housing. The screen is mounted in the housing. An accommodating space is enclosed by the screen and the housing. The housing includes a first surface and a second surface that are disposed opposite to each other. The first surface faces the accommodating space. The first radiator is fixed to the first surface. The second radiator is fixedly connected to the second surface.

It may be understood that because the first radiator is fixed to the first surface and the second radiator is fixedly connected to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator is fixed to a surface of the support facing the accommodating space. The second radiator is fixed to a surface of the housing facing the accommodating space, or the second radiator is fixed to a surface of the housing away from the accommodating space.

Because the first radiator is fixed to the surface of the support facing the accommodating space and the second radiator is fixed to the surface of the housing facing the accommodating space, both the first radiator and the second radiator are located in the accommodating space, and further, the first radiator and the second radiator are protected by using the housing and the screen. In addition, because the second radiator is fixed to the surface of the housing facing the accommodating space, a space of the housing is effectively used.

Alternatively, because the first radiator is fixed to the surface of the support facing the accommodating space and the second radiator is fixed to the surface of the housing away from the accommodating space, a distance between the first radiator and the second radiator is increased, that is, the antenna has a relatively large clear space.

In an implementation, the electronic device further includes a housing, a screen, a circuit board, and a support, where the screen is mounted in the housing, an accommodating space is enclosed by the screen and the housing, the circuit board is fixed in the accommodating space, the support is fixed to the circuit board and encloses a space with the circuit board, and the first radiator is fixed to a surface of the support facing the space; and the second radiator is fixed to a surface of the support away from the space; or the second radiator is fixed to a surface of the housing facing the accommodating space; or the second radiator is fixed to a surface of the housing away from the accommodating space.

In this implementation, because the first radiator is fixed to the surface of the support facing the space, on one hand, the first radiator is effectively protected by using the support, and on the other hand, a distance between the first radiator and the second radiator can be increased. Therefore, the antenna has a relatively large clear space.

According to a fifth aspect, a technical solution of this application provides an electronic device. The electronic device includes a first radiator and a second radiator. The first radiator is coupled to the second radiator. In other words, a radio frequency signal can be coupled and fed to the second radiator through the first radiator, or can be coupled and fed to the first radiator through the second radiator.

The first radiator includes a first end face and a second end face disposed away from the first end face. The second radiator includes a third end face and a fourth end face disposed away from the third end face. The third end face is located between the first end face and the second end face. The fourth end face is located on one side of the first end face away from the third end face.

A projection of the second radiator on the first radiator is a first projection. The first projection partly overlaps the first radiator. Alternatively, a shortest distance between the first projection and the first radiator is within a range of 0 to 3 millimeters. In this case, a strong coupling can be implemented between the first radiator and the second radiator.

A center distance between the first end face and the second end face is a first value. A center distance between the third end face and the fourth end face is a second value. A ratio of the first value to the second value is within a range of 0.5 to 2. In other words, the second radiator has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, w % ben the first radiator and the second radiator radiate signals, the signals have little adverse impact on a user.

In an implementation, a center distance between the first end face and the third end face is a third value. A ratio of the third value to the second value is within a range of 0 to 0.35.

In an implementation, both the first radiator and the second radiator are strip-shaped.

In this implementation, because the first radiator and the second radiator are disposed as strip-shaped, structures of the first radiator and the second radiator are simplified to facilitate processing and manufacturing.

In an implementation, the electronic device further includes a housing. The screen is mounted in the housing. An accommodating space is enclosed by the screen and the housing. The housing includes a first surface and a second surface that are disposed opposite to each other. The first surface faces the accommodating space. The first radiator is fixed to the first surface. The second radiator is fixedly connected to the second surface.

It may be understood that because the first radiator is fixed to the first surface and the second radiator is fixedly connected to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator is fixed to a surface of the support facing the accommodating space. The second radiator is fixed to a surface of the housing facing the accommodating space, or the second radiator is fixed to a surface of the housing away from the accommodating space.

Because the first radiator is fixed to the surface of the support facing the accommodating space and the second radiator is fixed to the surface of the housing facing the accommodating space, both the first radiator and the second radiator are located in the accommodating space, and further, the first radiator and the second radiator are protected by using the housing and the screen. In addition, because the second radiator is fixed to the surface of the housing facing the accommodating space, a space of the housing is effectively used.

Alternatively, because the first radiator is fixed to the surface of the support facing the accommodating space and the second radiator is fixed to the surface of the housing away from the accommodating space, a distance between the first radiator and the second radiator is increased, that is, the antenna has a relatively large clear space.

In an implementation, the electronic device further includes a housing, a screen, a circuit board, and a support, where the screen is mounted in the housing, an accommodating space is enclosed by the screen and the housing, the circuit board is fixed in the accommodating space, the support is fixed to the circuit board and encloses a space with the circuit board, and the first radiator is fixed to a surface of the support facing the space; and the second radiator is fixed to a surface of the support away from the space; or the second radiator is fixed to a surface of the housing facing the accommodating space; or the second radiator is fixed to a surface of the housing away from the accommodating space.

In this implementation, because the first radiator is fixed to the surface of the support facing the space, on one hand, the first radiator is effectively protected by using the support, and on the other hand, a distance between the first radiator and the second radiator can be increased. Therefore, the antenna has a relatively large clear space.

According to a sixth aspect, a technical solution of this application provides an electronic device. The electronic device includes a first radiator, a second radiator, and a radio frequency transceiver circuit. The second radiator is connected to the first radiator. The radio frequency transceiver circuit is connected to the first radiator. The radio frequency transceiver circuit is configured to transmit or receive radio frequency signals. In this case, radio frequency signals transmitted by the radio frequency transceiver circuit can be directly transmitted to the first radiator and the second radiator. Alternatively, the first radiator and the second radiator can transmit radio frequency signals to the radio frequency transceiver circuit.

The first radiator has a feeding point connected to the radio frequency transceiver circuit. The first radiator includes a first end face and a second end face disposed away from the first end face. A distance between a center of the first end face and the feeding point is a fifth value. A distance between a center of the second end face and the feeding point is a sixth value. A ratio of the fifth value to the sixth value is within a range of 0.3 to 3. In other words, the first radiator has a quasi-symmetrical or symmetrical structure.

The second radiator includes a first branch, a first bifurcation branch, and a second bifurcation branch. One end of the first branch is connected to a head end of the first bifurcation branch and a head end of the second bifurcation branch, and the other end of the first branch is connected to the first radiator. A tail end of the first bifurcation branch and a tail end of the second bifurcation branch are located on two sides of the first branch. It may be understood that the two sides of the first branch may be understood as two sides of the first branch itself, or may be understood as two sides in an extension direction of the first branch.

A center distance between an end face of the tail end of the first bifurcation branch and the feeding point is a first value. A center distance between an end face of the tail end of the second bifurcation branch and the feeding point is a second value. A ratio of the first value to the second value is within a range of 0.3 to 3. In other words, the second radiator also has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, w % ben the first radiator and the second radiator radiate signals, the signals have little adverse impact on a user.

In an implementation, both the first bifurcation branch and the second bifurcation branch are strip-shaped. An included angle between the first bifurcation branch and the second bifurcation branch is a, and a satisfies: 0°<a≤180°. In other words, when 0°<a<180°, the first bifurcation branch and the second bifurcation branch are approximately V-shaped or are V-shaped. When a=180°, the first bifurcation branch and the second bifurcation branch are strip-shaped.

In this implementation, because the second radiator is approximately V-shaped, or is V-shaped, or is strip-shaped, symmetry of the second radiator is better. In addition, a structure of the second radiator is simple to facilitate processing.

In an implementation, the electronic device further includes a housing. The screen is mounted in the housing. An accommodating space is enclosed by the screen and the housing. The housing includes a first surface and a second surface that are disposed opposite to each other. The first surface faces the accommodating space. The first radiator and the second radiator are fixed to the first surface. Alternatively, the first radiator and the second radiator are fixedly connected to the second surface.

It may be understood that because the first radiator and the second radiator are fixed to the first surface, a space of a rear cover can be effectively used. In other words, the first radiator and the second radiator occupying the accommodating space are prevented from reducing an arrangement of components in the accommodating space. In addition, the first radiator and the second radiator can be protected by using the housing.

Alternatively, it may be understood that because the first radiator and the second radiator are fixedly connected to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator and the second radiator are fixed to a surface of the support facing the accommodating space.

In an implementation, the electronic device further includes a housing, a screen, a circuit board, and a support. The screen is mounted in the housing. An accommodating space is enclosed by the screen and the housing. The circuit board is fixed in the accommodating space. The support is fixed to the circuit board and encloses a space with the circuit board. The first radiator and the second radiator are fixed to a surface of the support facing the space.

In this implementation, because the first radiator and the second radiator are fixed to the surface of the support facing the space, the first radiator and the second radiator are effectively protected by using the support.

According to a seventh aspect, a technical solution of this application provides an electronic device. The electronic device includes a first radiator, a second radiator, and a radio frequency transceiver circuit. The second radiator is connected to the first radiator. The radio frequency transceiver circuit is connected to the first radiator. The radio frequency transceiver circuit is configured to transmit or receive radio frequency signals. In this case, radio frequency signals transmitted by the radio frequency transceiver circuit can be directly transmitted to the first radiator and the second radiator. Alternatively, the first radiator and the second radiator can transmit radio frequency signals to the radio frequency transceiver circuit.

The first radiator has a grounding point. The first radiator includes a first end face and a second end face disposed away from the first end face. A distance between a center of the first end face and the grounding point is a fifth value. A distance between a center of the second end face and the grounding point is a sixth value. A ratio of the fifth value to the sixth value is within a range of 0.3 to 3. In other words, the first radiator has a quasi-symmetrical or symmetrical structure.

The second radiator includes a first branch, a first bifurcation branch, and a second bifurcation branch. One end of the first branch is connected to a head end of the first bifurcation branch and a head end of the second bifurcation branch, and the other end of the first branch is connected to the first radiator. A tail end of the first bifurcation branch and a tail end of the second bifurcation branch are located on two sides of the first branch. It may be understood that the two sides of the first branch may be understood as two sides of the first branch itself, or may be understood as two sides in an extension direction of the first branch.

A center distance between an end face of the tail end of the first bifurcation branch and the grounding point is a first value. A center distance between an end face of the tail end of the second bifurcation branch and the grounding point is a second value. A ratio of the first value to the second value is within a range of 0.3 to 3. In other words, the second radiator also has a quasi-symmetrical or symmetrical structure.

In this implementation, when the first radiator and the second radiator receive radio frequency signals, the first radiator and the second radiator can generate a resonance frequency of a convection mode in a frequency band. An operating frequency band of an antenna is set near the resonance frequency of the convection mode. In this way, when the first radiator and the second radiator radiate signals, the signals have little adverse impact on a user.

In an implementation, both the first bifurcation branch and the second bifurcation branch are strip-shaped. An included angle between the first bifurcation branch and the second bifurcation branch is a, and a satisfies: $0° < a \leq 180°$. In other words, when $0° < a < 180°$, the first bifurcation branch and the second bifurcation branch are approximately V-shaped or are V-shaped. When $a=180°$, the first bifurcation branch and the second bifurcation branch are strip-shaped.

In this implementation, because the second radiator is approximately V-shaped, or is V-shaped, or is strip-shaped, symmetry of the second radiator is better. In addition, a structure of the second radiator is simple to facilitate processing.

In an implementation, the electronic device further includes a housing. The screen is mounted in the housing. An accommodating space is enclosed by the screen and the housing. The housing includes a first surface and a second surface that are disposed opposite to each other. The first surface faces the accommodating space. The first radiator and the second radiator are fixed to the first surface. Alternatively, the first radiator and the second radiator are fixedly connected to the second surface.

It may be understood that because the first radiator and the second radiator are fixed to the first surface, a space of a rear cover can be effectively used. In other words, the first radiator and the second radiator occupying the accommodating space are prevented from reducing an arrangement of components in the accommodating space. In addition, the first radiator and the second radiator can be protected by using the housing.

Alternatively, it may be understood that because the first radiator and the second radiator are fixedly connected to the second surface, a space of a rear cover is effectively used. In other words, the first radiator and the second radiator occupying the accommodating space are prevented from reducing an arrangement of components in the accommodating space.

In an implementation, the electronic device further includes a housing, a screen, a circuit board, and a support. The screen is mounted in the housing. An accommodating space is enclosed by the screen and the housing. The circuit board is located in the accommodating space. The support is fixed to the circuit board. The first radiator and the second radiator are fixed to a surface of the support facing the accommodating space.

In an implementation, the electronic device further includes a housing, a screen, a circuit board, and a support. The screen is mounted in the housing. An accommodating space is enclosed by the screen and the housing. The circuit board is fixed in the accommodating space. The support is fixed to the circuit board and encloses a space with the circuit board. The first radiator and the second radiator are fixed to a surface of the support facing the space.

In this implementation, because the first radiator and the second radiator are fixed to the surface of the support facing the space, the first radiator and the second radiator are effectively protected by using the support.

BRIEF DESCRIPTION OF DRAWINGS

FIG. 5b is a side view of the radiator shown in FIG. 5a;

FIG. 5c is a top view of the radiator shown in FIG. 5a;

DESCRIPTION OF EMBODIMENTS

The following describes embodiments of this application with reference to the accompanying drawings in embodiments of this application.

Figure 1:
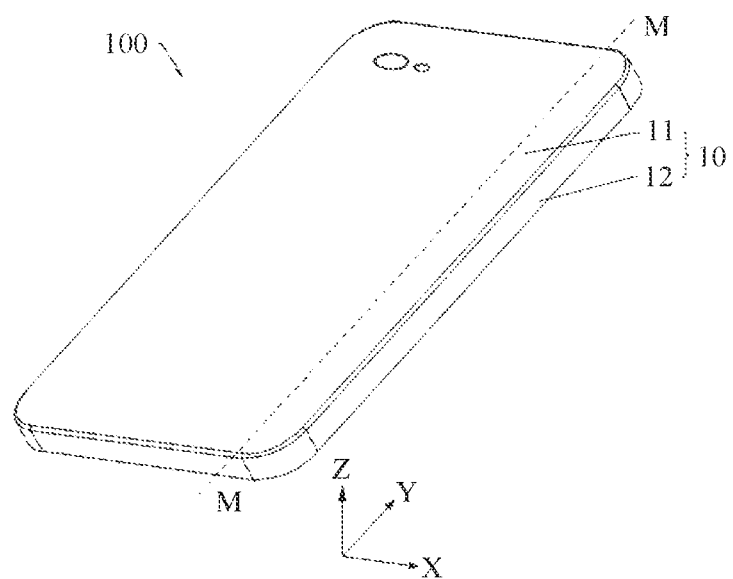
FIG. 1 is a schematic view of a structure of an implementation of an electronic device according to an embodiment of this application.

FIG. 1 is a schematic view of a structure of an implementation of an electronic device 100 according to an embodiment of this application. The electronic device 100 may be a tablet computer, a mobile phone, a camera, a personal computer, a notebook computer, a vehicle-mounted device, a wearable device, augmented reality (augmented reality. AR) glasses, an AR helmet, virtual reality (virtual reality, VR) glasses, or a VR helmet. In the embodiment shown in FIG. 1, the electronic device 100 is described by using the mobile phone as an example. For ease of description, as shown in FIG. 1, a width direction of the electronic device 100 is defined as an X axis, a length direction of the electronic device 100 is a Y axis, and a thickness direction of the electronic device 100 is a Z axis.

Figure 2:
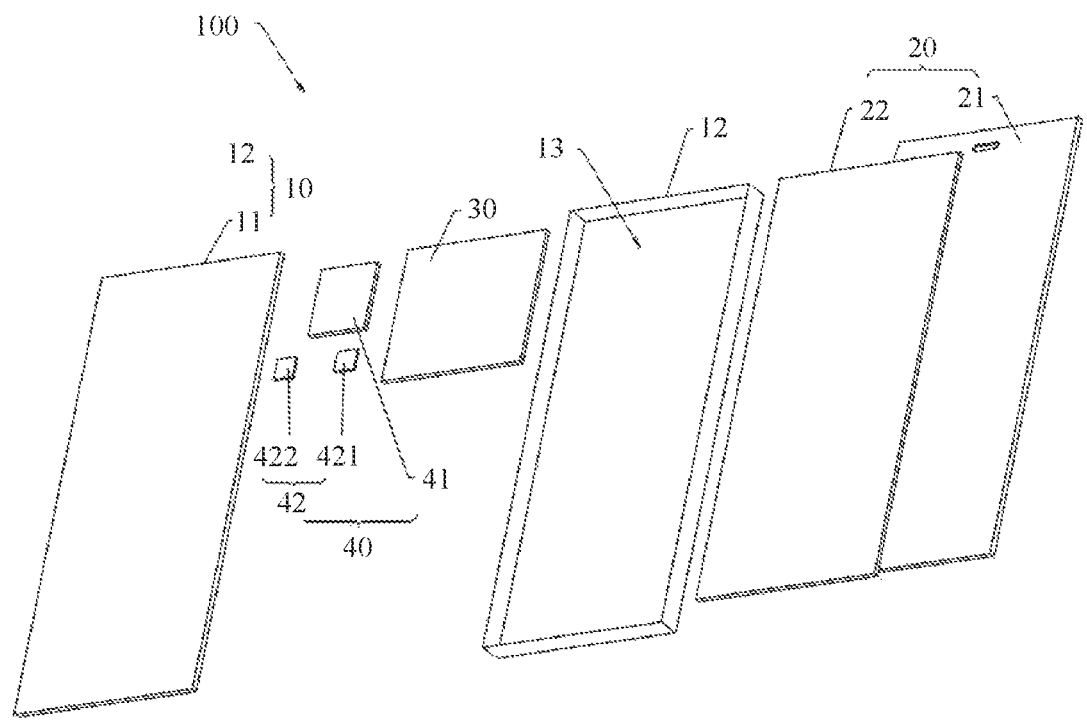
FIG. 2 is a schematic exploded view of the electronic device shown in FIG. 1.

FIG. 2 is a schematic exploded view of the electronic device 100 shown in FIG. 1.

The electronic device 100 includes a housing 10, a screen 20, a circuit board 30, and an antenna 40.

The screen 20 is mounted in the housing 10. An accommodating space 13 is enclosed by the screen 20 and the housing 10. The circuit board 30 is located in the accommodating space 13. In addition, the accommodating space 13 may alternatively be used to accommodate other components, such as a speaker, a microphone, an earpiece, and a camera module.

In an implementation, the housing 10 includes a rear cover 11 and a bezel 12. The rear cover 11 is disposed opposite to the screen 20. The rear cover 11 is disposed on one side of the bezel 12 away from the screen 20. In this case, the accommodating space 13 is enclosed by the rear cover 11, the bezel 12, and the screen 30 together. FIG. 1 shows an approximately rectangular structure enclosed by the rear cover 1I and the bezel 12. In an implementation, the rear cover 11 is integrated with the bezel 12.

In an implementation, the screen 20 includes a protection cover 21 and a display screen 22. The protection cover 21 is laminated on the display screen 22 to protect the display screen 22. The protection cover 21 may be made of a transparent material, for example, glass. In addition, the display screen 22 is used to display an image. The display screen 22 may be, but is not limited to, a liquid crystal display (liquid crystal display. LCD). For example, the display screen 22 may alternatively be an organic light-emitting diode (organic light-emitting diode, OLED) display screen.

Referring to FIG. 2 again, the circuit board 30 is located between the screen 20 and the rear cover 11. Electronic components of the electronic device 100 are mounted on the circuit board 30. For example, the electronic components may include a central processing unit (central processing unit, CPU), a battery management unit, and a baseband processing unit.

In addition, the antenna 40 may be configured to receive and transmit signals. Specifically, the antenna 40 includes a radio frequency transceiver circuit 41 and a radiator 42.

The radio frequency transceiver circuit 41 is located in the accommodating space 13. The radio frequency transceiver circuit 41 may be fixed to the circuit board 30. The radio frequency transceiver circuit 41 is configured to transmit and receive radio frequency signals. The radio frequency transceiver circuit 41 is not limited to a quantity, shape, and size shown in FIG. 2.

In an implementation, the radio frequency transceiver circuit 41 may include a radio frequency transceiver chip having an independent module. The radio frequency transceiver chip is configured to transmit and receive radio frequency signals. It may be understood that the radio frequency transceiver chip having an independent module may be disposed to independently run functions of transmitting and receiving radio frequency signals, thereby improving signal transmission efficiency and further improving antenna performance. In addition, the radio frequency transceiver circuit 41 may further include a component such as a capacitor, an inductor, or a resistor. The capacitor, inductor, or resistor is used to assist in transmitting a radio frequency signal, for example, amplifying the radio frequency signal. Certainly, in another implementation, the radio frequency transceiver circuit 41 may include a processing unit, for example, a CPU. In this case, the functions of transmitting and receiving radio frequency signals may be integrated into the CPU. It may be understood that, because the CPU has the functions of transmitting and receiving radio frequency signals, a space occupied by one chip may be saved inside the electronic device 100. Therefore, utilization of an internal space of the electronic device 100 is improved. In addition, the functions of transmitting and receiving radio frequency signals may alternatively be integrated on another chip, for example, a battery management chip.

In addition, the radiator 42 is configured to radiate a signal outside of the electronic device 100 when receiving a radio frequency signal transmitted by the radio frequency transceiver circuit 41. In addition, the radiator 42 may be further configured to receive a signal outside of the electronic device 100, convert the received signal into a radio frequency signal, and transmit the radio frequency signal to the radio frequency transceiver circuit 41.

It may be understood that the radiator 42 is disposed in a plurality of manners. The following describes in detail five embodiments of disposition manners of the radiator 42 with reference to the related drawings.

In a first embodiment, referring to FIG. 2 again, the radiator 42 includes a first radiator 421 and a second radiator 422. Both the first radiator 421 and the second radiator 422 may be configured to radiate and receive signals. Specifically, when a radio frequency signal is coupled and fed to the second radiator 422 through the first radiator 421, each of the first radiator 421 and the second radiator 422 radiates a signal outside of the electronic device 100 based on the radio frequency signal. In addition, the second radiator 422 may also receive a signal outside of the electronic device 100, and convert the signal into a radio frequency signal. The radio frequency signal is coupled and fed to the first radiator 421 through the second radiator 422. The first radiator 421 may transmit the radio frequency signal to the radio frequency transceiver circuit 41.

Figure 3A:
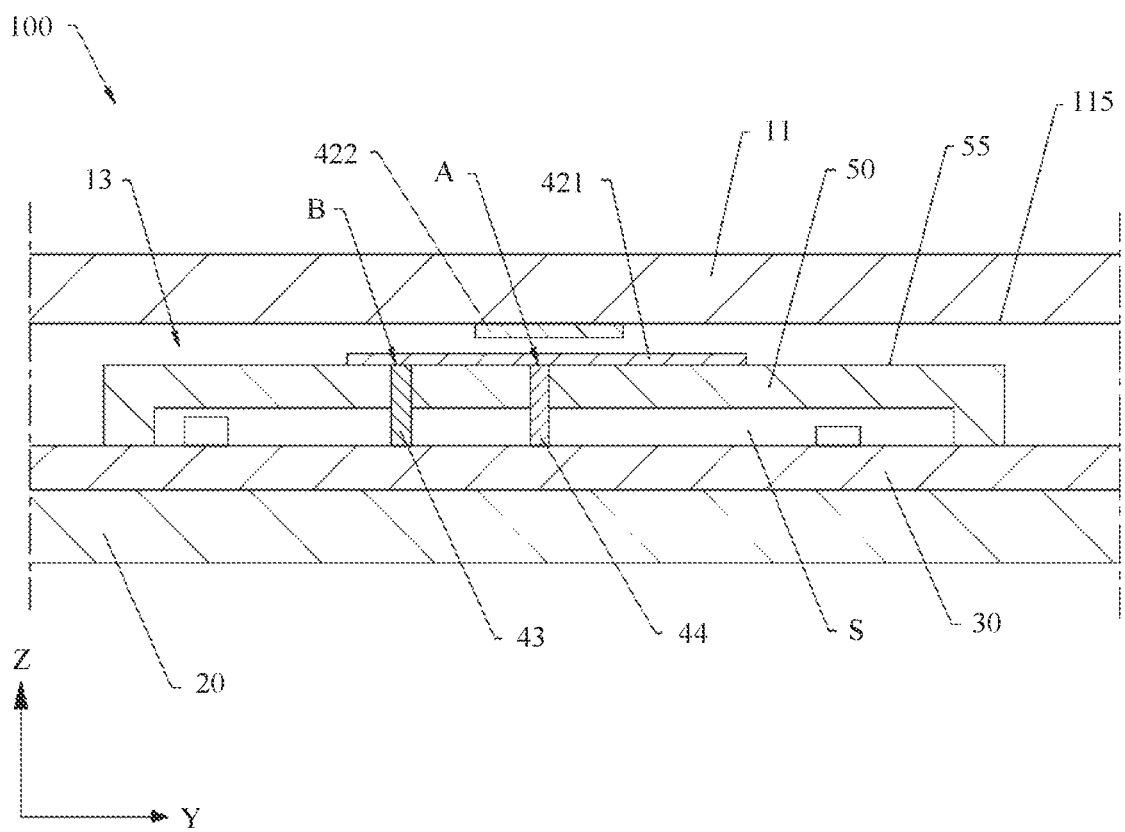
FIG. 3a is a schematic cross-sectional view of an implementation of the electronic device shown in FIG. 1 at a line M-M.

FIG. 3a is a partial schematic cross-sectional view of an implementation of the electronic device 100 shown in FIG. 1 at a line M-M. The electronic device 100 further includes a support 50. The support 50 may be fixed to one side of the circuit board 30 away from the screen 20.

In an implementation, the support 50 may have a frame structure. The support 50 covers the circuit board 30, and encloses a space S with the circuit board 30. Some electronic components on the circuit board 30 may be located in the space S. In this case, the support 50 may be configured to protect the electronic components. In another implementation, the support 50 may alternatively be plate-shaped or block-shaped.

In addition, the support 50 has a first surface 55 facing the rear cover 11. The first radiator 421 is fixed to the first surface 55. In an implementation, a part of the support 50 forms an insulating portion, and the insulating portion is made of an insulating material. The first radiator 421 is formed on the insulating portion by using a laser direct-structuring (laser directstructuring, LDS) technology. In addition, in another implementation, a conductive material (for example, a metallic material such as gold, silver, or copper, or graphene) may alternatively be formed on the insulating portion. The conductive material forms the first radiator 421. In another implementation, alternatively, the support 50 may be completely made of an insulating material.

Figure 3B:
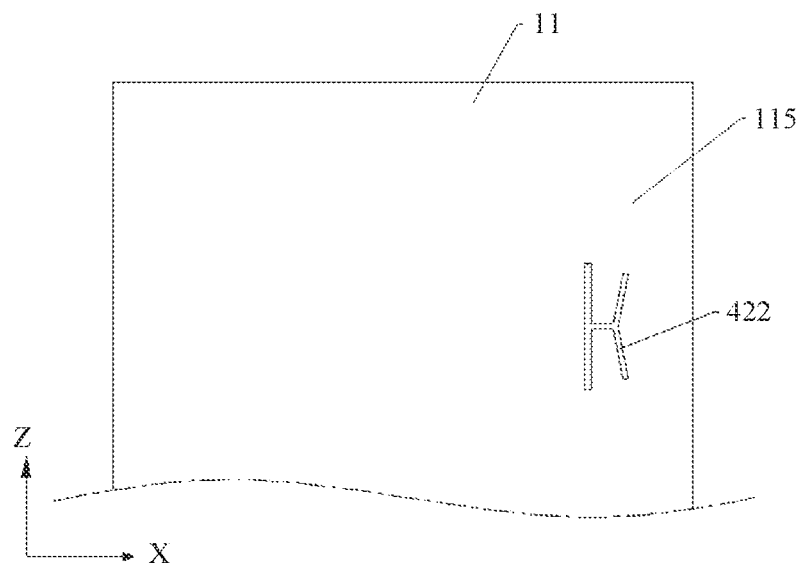
FIG. 3b is a schematic view of a structure of a rear cover and a second radiator of the electronic device shown in FIG. 1.

In addition, referring to FIG. 3b and with reference to FIG. 3a, FIG. 3b is a schematic view of a structure of the rear cover and the second radiator of the electronic device shown in FIG. 1. The rear cover 11 may be made of an insulating material. The rear cover 11 has a second surface 115 facing the accommodating space 13. The second radiator 422 is fixed to the second surface 115. In an implementation, the second radiator 422 is formed on the second surface 115 of the rear cover 11 by using LDS.

In another implementation, the rear cover 11 may alternatively include an insulating portion and a conductive portion connected to the insulating portion. In this case, the second radiator 422 is fixed to the insulating portion of the rear cover 11. In addition, in another implementation, a conductive material (for example, a metallic material such as gold, silver, or copper, or graphene) may be formed on the second surface 115. The conductive material forms the second radiator 422.

In another implementation, the rear cover 11 has a surface away from the accommodating space 13. The second radiator 422 may alternatively be fixed to the surface of the rear cover 11 away from the accommodating space 13. The surface of the rear cover 11 away from the accommodating space 13 may be an exposed surface of the rear cover 11.

In this embodiment, the first radiator 421 is fixed to the first surface 55 of the support 50, and the second radiator 422 is fixed to the second surface 115, so that the second radiator 422 and the first radiator 421 are coupled to each other. In other words, when the radio frequency transceiver circuit 41 transmits a radio frequency signal, the radio frequency signal may be coupled and fed to the second radiator 422 through the first radiator 421. The second radiator 422 radiates a signal outside of the electronic device 100.

It may be understood that when radio frequency signals are transmitted to the first radiator 421 and the second radiator 422, the first radiator 421 and the second radiator 422 may generate a resonance mode: a convection mode, that is, a common mode. Alternatively, the first radiator 421 and the second radiator 422 may generate a plurality of resonance modes, such as a convection mode and a differential mode. In other words, the radiator 42 in this embodiment may generate a convection mode. It may be understood that, because a specific absorption rate (specific absorption rate, SAR) of the convection mode is relatively low, signals radiated by the first radiator 421 and the second radiator 422 have little adverse impact on a user. Therefore, the electronic device 100 having the antenna 40 can meet a requirement of the user to a large extent.

Specifically, specific structures of the first radiator 421 and the second radiator 422 and principles of generating convection modes in the structures are hereinafter described in detail with reference to related drawings.

In a first implementation, referring to FIG. 3a again, the antenna 40 further includes a first spring 43 and a second spring 44. Both the first spring 43 and the second spring 44 may be fixed to the circuit board 30. The first spring 43 is configured to feed a radio frequency signal transmitted by the radio frequency transceiver circuit 41 into the first radiator 421. The second spring 44 is configured to ground the first radiator 421. In this case, a contact point between the first spring 43 and the first radiator 421 may be a feeding point B. A contact point between the second spring 44 and the first radiator 421 is a grounding point A. In this implementation, the feeding point B is not limited to a position shown in FIG. 3a described later. The feeding point B may alternatively be located at any position on the first radiator 421. The position of the grounding point A is specifically defined later. Details are not described herein. In another implementation, a radio frequency signal transmitted by the radio frequency transceiver circuit 41 may alternatively be fed into the first radiator 421 by using a connector. In addition, the first radiator 421 may alternatively be grounded by using the connector.

Figure 4:
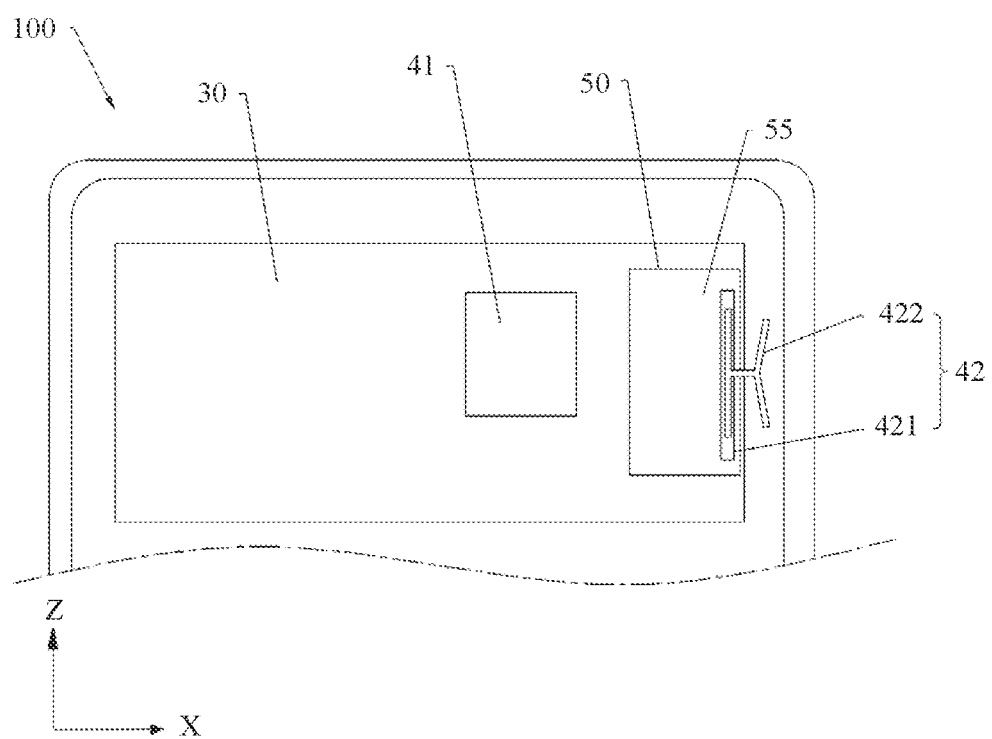
FIG. 4 is a schematic view of a partial structure of the electronic device shown in FIG. 1.

FIG. 4 is a schematic view of a partial structure of the electronic device 100 shown in FIG. 1. FIG. 4 shows a position relationship between the second radiator 422 and the first radiator 421 on the support 50 when the rear cover 11 is removed from the electronic device 100. A position between the first radiator 421 and the second radiator 422 is not limited to the following: A part of the second radiator 422 is disposed opposite to the first radiator 421 shown in FIG. 4, and a part of the second radiator 422 is not disposed opposite to the first radiator 421.

Figure 5A:
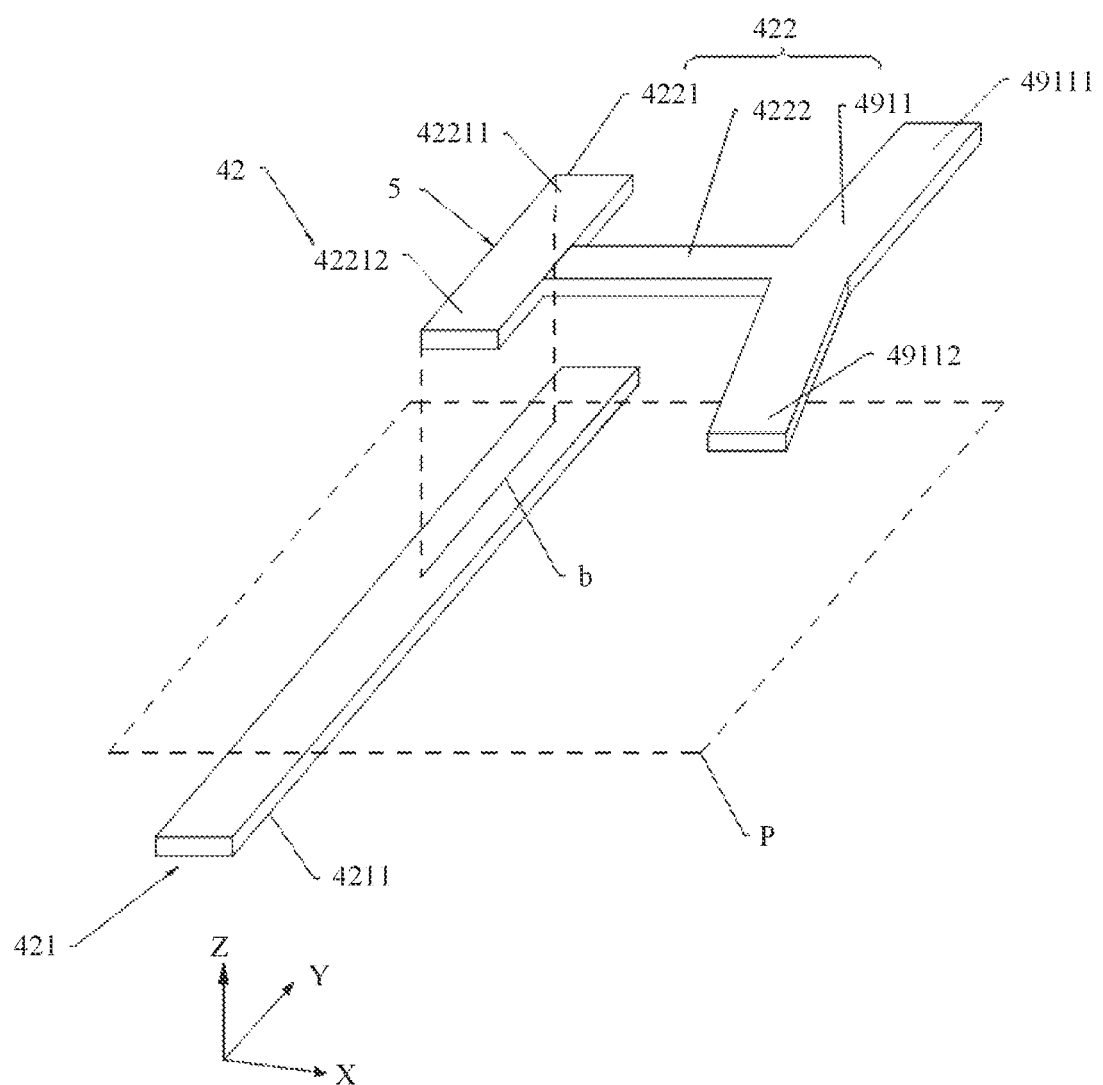
FIG. 5a is a schematic view of a structure of an implementation of a radiator of the electronic device shown in FIG. 4.
Figure 5B:
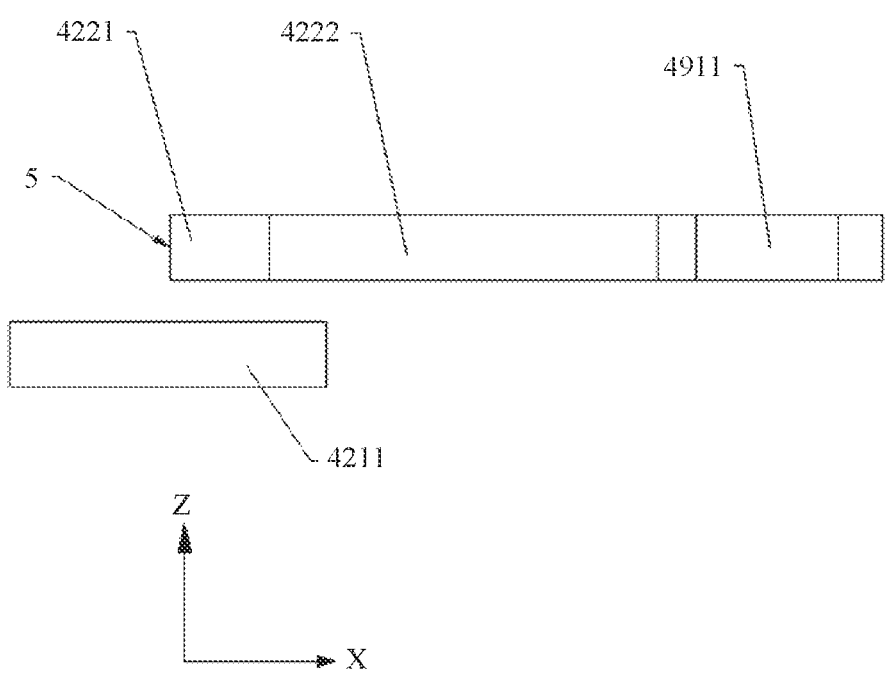

FIG. 5a is a schematic view of a structure of an implementation of the radiator of the electronic device shown in FIG. 4. FIG. 5b is a side view of the radiator shown in FIG. 5a.

The first radiator 421 includes a first feeding branch 4211. The first feeding branch 4211 is strip-shaped.

The second radiator 422 includes a first branch 4221, a second branch 4222, and a third branch 4911. The first branch 4221 includes a head end 42211 and a tail end 42212. The third branch 4911 includes a head end 49111 and a tail end 49112. One end of the second branch 4222 is connected between the head end 42211 and the tail end 42212 of the first branch 4221, and the other end of the second branch 4222 is connected between the head end 49111 and the tail end 49112 of the third branch 4911. The head end 42211 and the tail end 42212 of the first branch 4221 are located on two sides of the second branch 4222. The head end 49111 and the tail end 49112 of the third branch 4911 are located on the two sides of the second branch 4222. It may be understood that the two sides of the second branch 4222 may be understood as two sides of the second branch 4222 itself, or may be understood as two sides in an extension direction of the second branch 4222.

In addition, the first branch 4221 is spaced apart from and disposed opposite to the first feeding branch 4211. One part of the second branch 4222 is spaced apart from and disposed opposite to the first feeding branch 4211. Another part of the second branch 4222 is spaced apart from but not disposed opposite to the first feeding branch 4211. The third branch 4911 is spaced apart from but not disposed opposite to the first feeding branch 4211.

In addition, the first branch 4221 has a reference face 5 away from the second branch 4222. A projection of the reference face 5 on a plane P in which the first feeding branch 4211 is located is a first projection b. FIG. 5a shows the first projection b as a line. The first projection b is located in the first feeding branch 4211. In other words, when the first projection b is located in the first feeding branch 4211, the second radiator 422 is disposed close to the first feeding branch 4211. In another implementation, the reference face 5 may alternatively be an arc surface, and the first projection b may be an arc or an area.

Figure 5C:
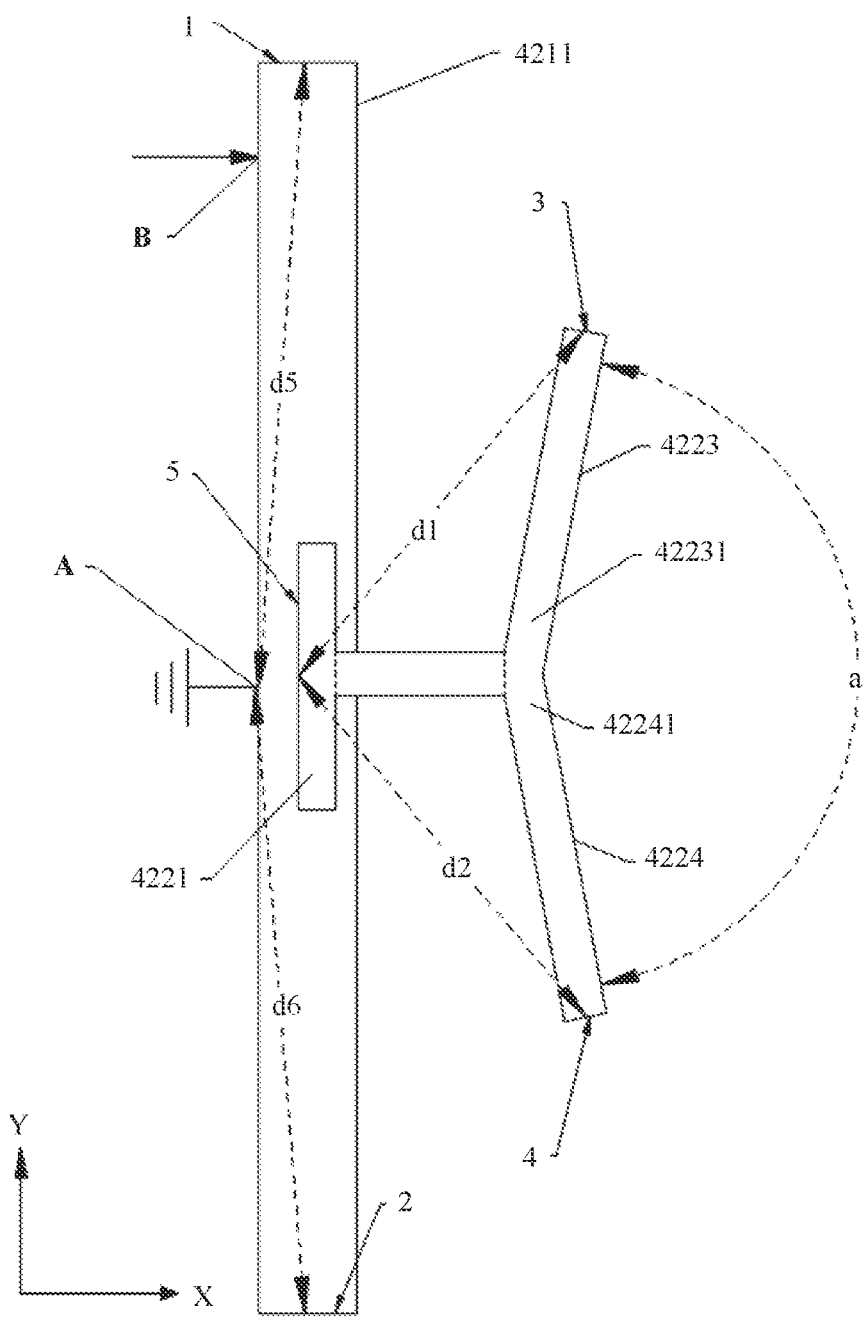

FIG. 5c is a top view of the radiator 42 shown in FIG. 5a.

The first feeding branch 4211 includes a first end face 1 and a second end face 2 disposed away from the first end face 1. A distance from a center of the first end face 1 to the grounding point A is a fifth value d5. A distance from a center of the second end face 2 to the grounding point A is a sixth value d6. A ratio of the fifth value d5 to the sixth value d6 is within a range of 0.3 to 3. In other words, the first feeding branch 4211 has a quasi-symmetrical or symmetrical structure. In this implementation, the ratio of the fifth value d5 to the sixth value d6 is 1. In another implementation, the ratio of the fifth value d5 to the sixth value d6 may alternatively be 0.3, 0.8, 1.2, 2.3, or 2.9.

In addition, the third branch 4911 includes a first bifurcation branch 4223 and a second bifurcation branch 4224.

Both the first bifurcation branch 4223 and the second bifurcation branch 4224 are strip-shaped. A head end 42231 of the first bifurcation branch 4223 is connected to a head end 42241 of the second bifurcation branch 4224. The first bifurcation branch 4223 extends in a direction away from the reference face 5. The second bifurcation branch 4224 extends in a direction away from the reference face 5. In addition, FIG. 5*c* shows that an included angle a between the first bifurcation branch and the second bifurcation branch is 165°. In another implementation, a satisfies 0°<a≤180, that is, a may be 10°, 20°, 33°, 73°, 122°, 155°, or 180°.

In addition, a center distance between an end face 3 of a tail end of the first bifurcation branch 4223 and the reference face 5 is a first value d1. It may be understood that the center distance is a distance between a center of the end face 3 of the tail end and a center of the reference face 5. A center distance between an end face 4 of a tail end of the second bifurcation branch 4224 and the reference face 5 is a second value d2. In this case, a ratio of the first value d1 to the second value d2 is within a range of 0.5 to 2. In other words, the second radiator 422 has a quasi-symmetrical or symmetrical structure. In this implementation, the ratio of the first value d1 to the second value d2 is 1. In another implementation, the ratio of the first value d1 to the second value d2 may alternatively be 0.8, 1.22, 1.5, or 2.

Figure 6:
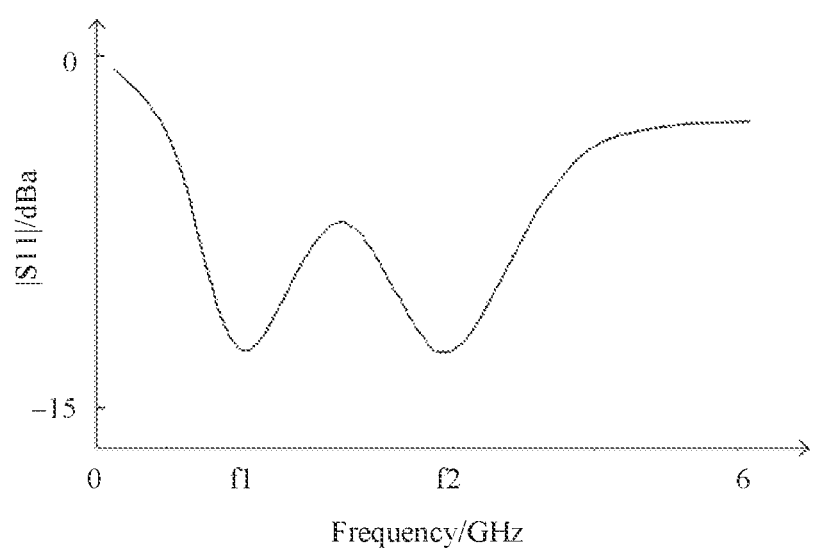
FIG. 6 is a graph of a relationship between a reflection coefficient and a frequency of the radiator shown in FIG. 5a in a frequency band of 0 to 6 GHz.

FIG. 6 is a graph of a relationship between a reflection coefficient (that is, a return loss) and a frequency of the radiator 42 shown in FIG. 5*a* in a frequency band of 0 to 6 GHz. When the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 may generate two resonance frequencies from 0 to 6 GHz. FIG. 6 shows that the two resonance frequencies generated by the first radiator 421 and the second radiator 422 are f1 and f2 respectively. It may be understood that this implementation is described by using the frequency band of 0 to 6 GHz as an example. Certainly, in another implementation, in another frequency band (for example, 6 GHz to 8 GHz, or 8 GHz to 11 GHz), the first radiator 421 and the second radiator 422 may also generate two resonance frequencies f1 and f2 respectively. In addition, in each of the following implementations, the frequency band of 0 to 6 GHz is also used as an example for description. It may be understood that the following implementations are also applicable to other frequency bands. This is not specifically limited in this application.

Figure 7:
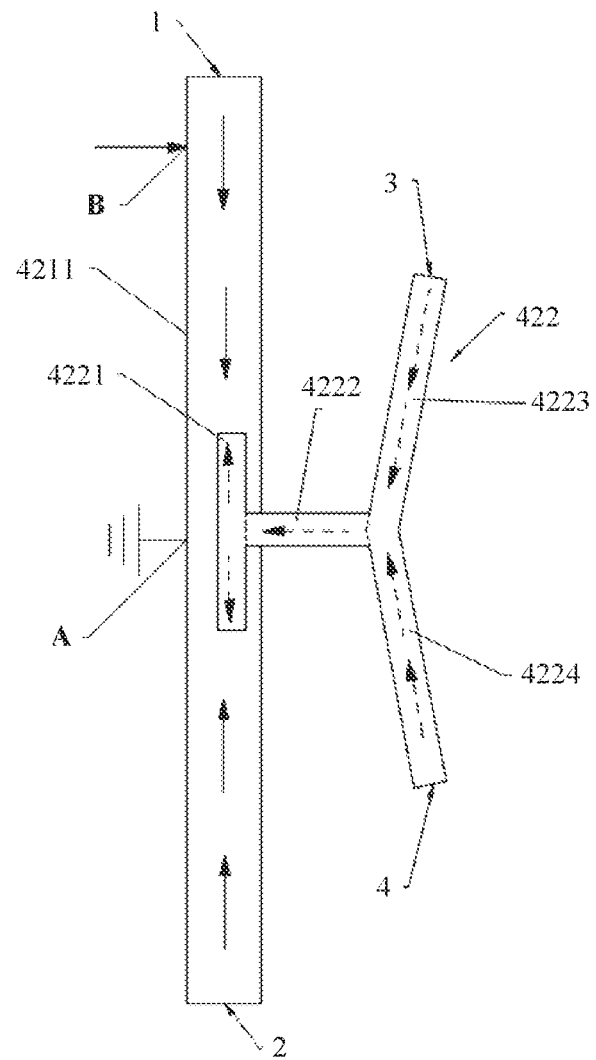
FIG. 7 is a schematic view of a current flow direction of the radiator shown in FIG. 5a at a frequency f1.
Figure 8:
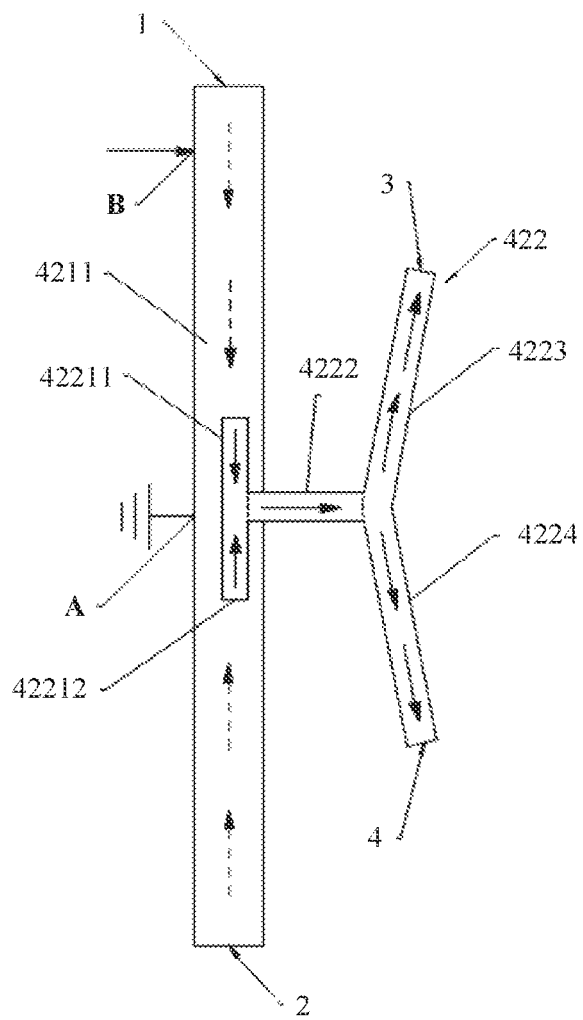
FIG. 8 is a schematic view of a current flow direction of the radiator shown in FIG. 5a at a frequency f2.

With reference to FIG. 7 and FIG. 8, the following describes in detail the resonance frequencies f1 and f2 both being resonance frequencies of convection modes. FIG. 7 is a schematic view of a current flow direction of the radiator 42 shown in FIG. 5*a* at the frequency f1. FIG. 8 is a schematic view of a current flow direction of the radiator 42 shown in FIG. 5*a* at the frequency f2.

Referring to FIG. 7, when the radio frequency transceiver circuit 41 transmits radio frequency signals in the frequency band of 0 to 6 GHz, the radio frequency signals are transmitted to the first radiator 421 and the second radiator 422. In this case, at the frequency f1, the first feeding branch 4211 has a first current flowing from the first end face 1 to the grounding point A and a second current flowing in a direction from the second end face 2 to the grounding point A. FIG. 7 shows the first current and the second current by using solid lines with arrows.

In addition, when the second radiator 422 is disposed close to the first feeding branch 4211, a strong coupling can be implemented between the first feeding branch 4211 and the second radiator 422. In addition, because the second radiator 422 has a quasi-symmetrical or symmetrical structure, the second radiator 422 has a third current flowing from the end face 3 of the tail end of the first bifurcation branch 4223 to the second branch 4222, and a fourth current flowing in a direction from the end face 4 of the tail end of the second bifurcation branch 4224 to the second branch 4222. FIG. 7 shows the third current and the fourth current by using dashed lines with arrows.

Therefore, it can be determined based on current distribution on the first feeding branch 4211 and the second radiator 422 that a resonance mode generated by the first feeding branch 4211 and the second radiator 422 at the frequency f1 is a convection mode. In addition, the frequency f1 is a resonance frequency of the convection mode, that is, the first resonance frequency f1 shown in FIG. 6.

In addition, by measuring intensity of the first current, the second current, the third current, and the fourth current, it can be learned that the intensity of the first current and the second current is greater than the intensity of the third current and the fourth current, that is, the intensity of the current on the first feeding branch 4211 is greater than the intensity of the current on the second radiator 422. Therefore, the resonance frequency f1 is mainly the resonance frequency generated by the first feeding branch 4211.

Referring to FIG. 8, when the radio frequency transceiver circuit 41 transmits radio frequency signals in the frequency band of 0 to 6 GHz, the radio frequency signals are transmitted to the first radiator 421 and the second radiator 422. In this case, at the frequency f2, the first feeding branch 4211 has a first current flowing from the first end face 1 to the grounding point A and a second current flowing in a direction from the second end face 2 to the grounding point A. FIG. 7 shows the first current and the second current by using solid lines with arrows.

In addition, when the second radiator 422 is disposed close to the first radiator 421, a strong coupling can be implemented between the first feeding branch 4211 and the second radiator 422. In addition, because the second radiator 422 has a quasi-symmetrical or symmetrical structure, the second radiator 422 has a third current flowing from the head end 42211 of the first branch 4221 to the end face 3 of the tail end of the first bifurcation branch 4223, and a fourth current flowing from the tail end 42212 of the first branch 4221 to the end face 4 of the tail end of the second bifurcation branch 4224. FIG. 8 shows the third current and the fourth current by using dashed lines with arrows.

Therefore, it can be determined based on current distribution on the first feeding branch 4211 and the second radiator 422 that a resonance mode generated by the first feeding branch 4211 and the second radiator 422 at the frequency f2 is a convection mode. In addition, the frequency f2 is a resonance frequency of the convection mode, that is, the first resonance frequency f2 shown in FIG. 6.

In addition, by measuring intensity of the first current, the second current, the third current, and the fourth current, it can be learned that the intensity of the third current and the fourth current is greater than the intensity of the first current and the second current, that is, the intensity of the current on the first feeding branch 4211 is less than the intensity of the current on the second radiator 422. Therefore, the resonance frequency f2 is mainly the resonance frequency generated by the second radiator 422.

It can be learned based on the foregoing description and with reference to FIG. 7 and FIG. 8 that the two resonance frequencies shown in FIG. 6 are both resonance frequencies of convection modes. In other words, the first radiator 421 and the second radiator 422 in this implementation can generate two convection modes.

In this implementation, when the first radiator 421 and the second radiator 422 receive the radio frequency signals in the frequency band of 0 to 6 GHz, the first radiator 421 and the second radiator 422 can generate resonance frequencies of two convection modes in the frequency band. An operating frequency band of the antenna 40 is set near the resonance frequency of the convection mode. In this way, when the first radiator 421 and the second radiator 422 radiate signals, the signals have little adverse impact on the user.

In addition, because the first radiator 421 and the second radiator 422 can generate more than one convection mode from 0 to 6 GHz, a resonance mode with a low specific absorption rate covers a relatively wide frequency band in the frequency band of 0 to 6 GHz. In other words, there are more convection modes, and the operating frequency band set near the resonance frequency is also wider.

In this implementation, the two resonance frequencies f1 and f2 generated by the first radiator 421 and the second radiator 422 may be any value from 0 to 6 GHz. For example, f1 may be 4 GHz, and f2 may be 4.6 GHz. It may be understood that values of the two resonance frequencies f1 and f2 are related to a factor such as a length of the first feeding branch 4211, a length of the second branch 4222, a length of the first branch 4211, a length of the first bifurcation branch 4223, a length of the second bifurcation branch 4224, a position of the feeding point B. or an external environment in which the first radiator 421 and the second radiator 422 are located (for example, fixed positions of the first radiator 421 and the second radiator 422). In other words, by changing the factor such as the length of the first feeding branch 4211, the length of the second branch 4222, the length of the first branch 4211, the length of the first bifurcation branch 4223, the length of the second bifurcation branch 4224, the position of the feeding point B, or the external environment in which the first radiator 421 and the second radiator 422 are located, the values of f1 and f2 may be changed.

For example, under a same condition, when the length of the first feeding branch 4211 is changed from 30 millimeters to 28 millimeters, the first resonance frequency f1 may be changed from 4 GHz to 4.1 GHz.

For another example, under a same condition, when the ratio of the first value d1 to the second value d2 is changed from 1 to 2, the second resonance frequency is changed from 4.6 GHz to 4.5 GHz.

In another implementation, when the first radiator 421 and the second radiator 422 may generate a differential mode, by changing the factor such as the length of the first feeding branch 4211, the length of the second branch 4222, the length of the first branch 4211, the length of the first bifurcation branch 4223, the length of the second bifurcation branch 4224, the ratio of the fifth value d5 to the sixth value d6, the ratio of the first value d1 to the second value d2, the position of the feeding point B, or the external environment in which the first radiator 421 and the second radiator 422 are located, a resonance frequency of the differential mode may also be changed correspondingly.

Figure 9:
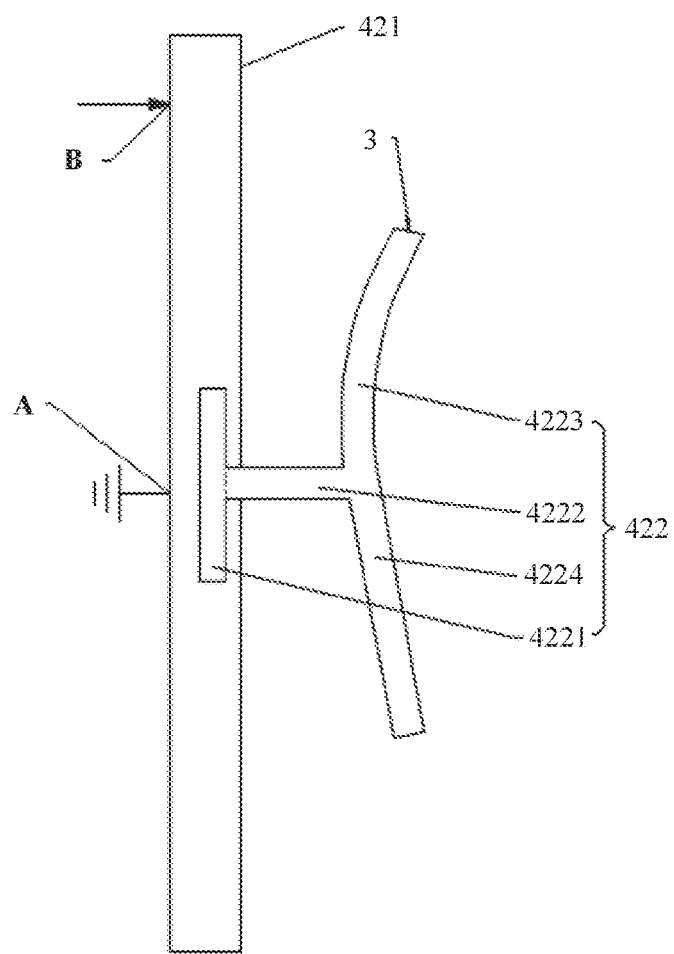
FIG. 9 is a schematic view of a structure of another implementation of a radiator according to an embodiment of this application.

In another implementation, referring to FIG. 9, FIG. 9 is a schematic view of a structure of another implementation of the radiator 42 according to an embodiment of this application. The first bifurcation branch 4223 is arc-shaped. The second bifurcation branch 4224 is strip-shaped. In this case, the first branch 4221, the second branch 4222, the first bifurcation branch 4223, and the second bifurcation branch 4224 are approximately I-shaped. It may be understood that, in this implementation, the first feeding branch 4211 and the second radiator 422 can also generate two convection modes. A principle of generating two convection modes by the first feeding branch 4211 and the second radiator 422 is the same as a principle of generating two convection modes in the first implementation, and details are not described herein again. In addition, in another implementation, the shape of the first bifurcation branch 4223 and the shape of the second bifurcation branch 4224 may alternatively be interchanged.

In a second implementation, technical content mostly the same as that in the first implementation is not described again.

Figure 10:
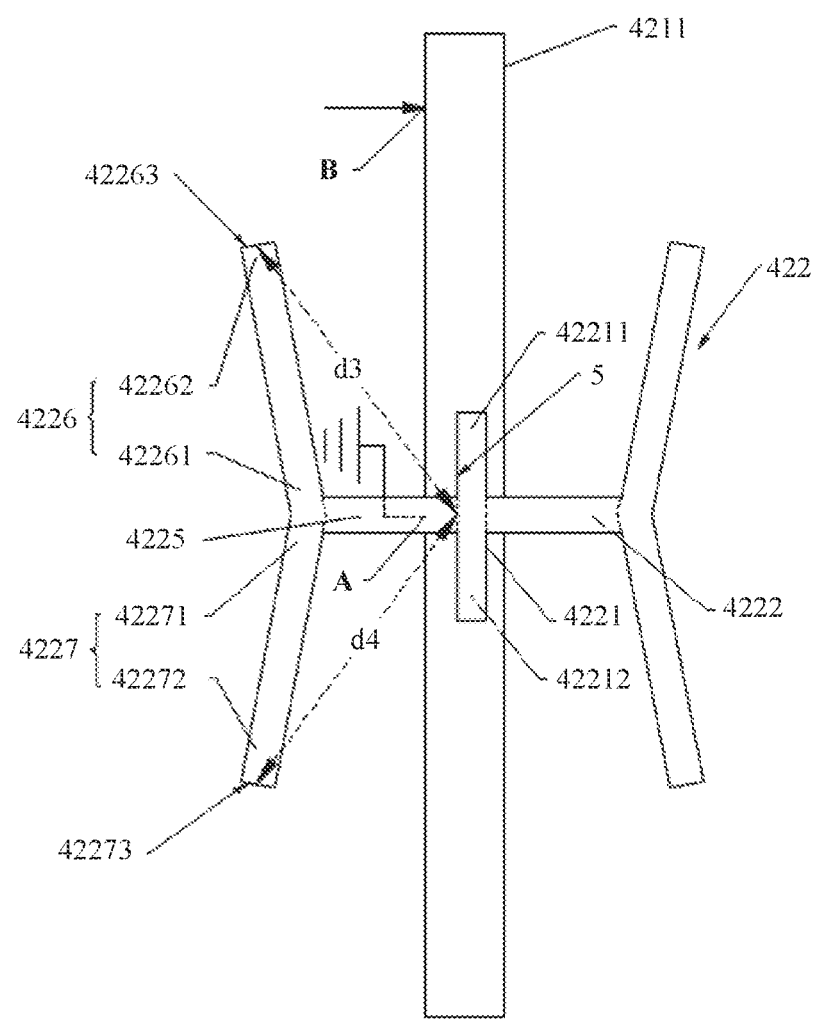
FIG. 10 is a schematic view of a structure of still another implementation of a radiator according to an embodiment of this application.

FIG. 10 is a schematic view of a structure of another implementation of the radiator according to an embodiment of this application. The second radiator 422 further includes a fourth branch 4225, a third bifurcation branch 4226, and a fourth bifurcation branch 4227. The fourth branch 4225, the third bifurcation branch 4226, and the fourth bifurcation branch 4227 are located on one side of the first branch 4221 away from the second branch 4222. A head end 42261 of the third bifurcation branch 4226 is connected to a head end 42271 of the fourth bifurcation branch 4227. In addition, one end of the fourth branch 4225 is connected to the head end 42261 of the third bifurcation branch 4226 and the head end 42271 of the fourth bifurcation branch 4227, and the other end of the fourth branch 4225 is connected to the reference face 5. A tail end 42262 of the third bifurcation branch 4226 and a tail end 42272 of the fourth bifurcation branch 4227 are located on two sides of the fourth branch 4225. The third bifurcation branch 4226 extends in a direction away from the reference face 5. The fourth bifurcation branch 4227 extends in a direction away from the reference face 5. The second radiator 422 is back-to-back E-shaped, or is approximately back-to-back E-shaped.

The two sides of the fourth branch 4225 may be understood as two sides of the fourth branch 4225 itself, or may be understood as two sides in an extension direction of the fourth branch 4225.

In an implementation, the third bifurcation branch 4226 and the fourth bifurcation branch 4227 are strip-shaped. An included angle between the third bifurcation branch 4226 and the fourth bifurcation branch 4227 is also the same as the included angle a between the first bifurcation branch 4223 and the second bifurcation branch 4224 in the first implementation.

In addition, a center distance between an end face 42263 of the tail end of the third bifurcation branch 4226 and the reference face 5 is a third value d3. A center distance between an end face 42273 of the tail end of the fourth bifurcation branch 4227 and the reference face 5 is a fourth value d4. A ratio of the third value d3 to the fourth value d4 may be within a range of 0.5 to 2. In other words, when the second radiator 422 further includes the fourth branch 4225, the third bifurcation branch 4226, and the fourth bifurcation branch 4227, the second radiator 422 still has a quasi-symmetrical or symmetrical structure. In this implementation, the ratio of the third value d3 to the fourth value d4 is 1. In another implementation, the ratio of the third value d3 to the fourth value d4 may alternatively be 0.8, 1.22, 1.5, or 2.

Figure 11:
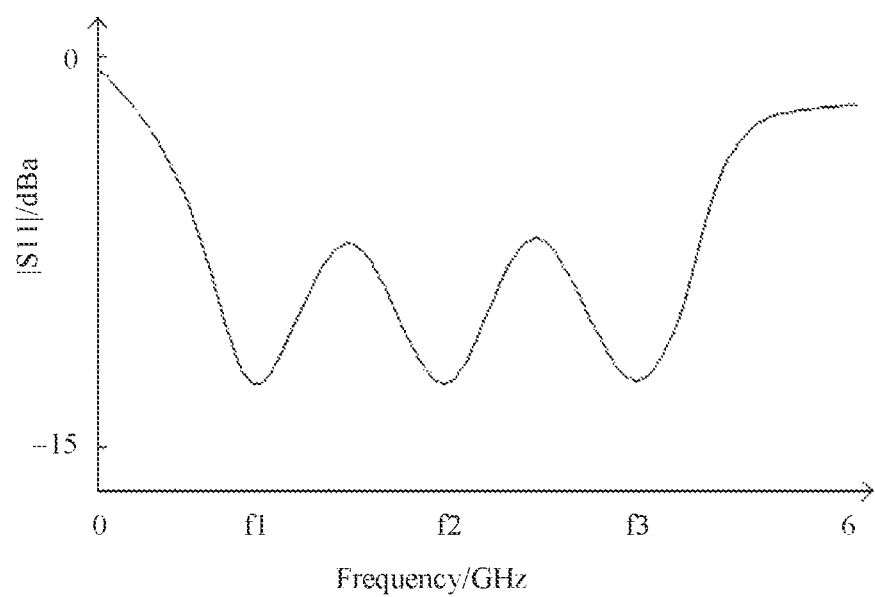
FIG. 11 is a graph of a relationship between a reflection coefficient and a frequency of the radiator shown in FIG. 10 in a frequency band of 0 to 6 GHz.

Referring to FIG. 11, and with reference to FIG. 10, FIG. 11 is a graph of a relationship between a reflection coefficient and a frequency of the radiator 42 shown in FIG. 10 in the frequency band of 0 to 6 GHz. When the radio frequency transceiver circuit 41 transmits radio frequency signals in the frequency band of 0 to 6 GHz, the radio frequency signals are transmitted to the first radiator 421 and the second radiator 422. In this case, the first feeding branch 4211 and the second radiator 422 generate three resonance frequencies in the frequency band. FIG. 11 shows that the three resonance frequencies generated by the first feeding branch 4211 and the second radiator 422 are f1, f2, and f3 respectively.

It may be understood that a principle of forming the first resonance frequency f1 and the second resonance frequency f2 is the same as a principle of forming the first resonance frequency f1 and the second resonance frequency f2 in the first implementation. Details are not described herein. In addition, the third resonance frequency f3 is mainly generated by the third bifurcation branch 4226 and the fourth bifurcation branch 4227.

Specifically, when the radio frequency transceiver circuit 41 transmits radio frequency signals in the frequency band of 0 to 6 GHz, the radio frequency signals are transmitted to the first radiator 421 and the second radiator 422. In this case, at the frequency f3, the second radiator 422 has a current flowing from the head end 42211 of the first branch 4221 to the end face 42263 of the tail end of the third bifurcation branch 4226, and a current flowing from the tail end 42212 of the first branch 4221 to the end face 42273 of the tail end of the fourth bifurcation branch 4227. It can be determined based on current distribution on the third bifurcation branch 4226 and the fourth bifurcation branch 4227 that a resonance mode generated by the third bifurcation branch 4226 and the fourth bifurcation branch 4227 is a convection mode. In addition, the frequency f3 is a resonance frequency of the convection mode, that is, the third resonance frequency f3 shown in FIG. 11.

It may be understood that the three resonance frequencies f1, f2, and f3 generated by the first radiator 421 and the second radiator 422 may be any value from 0 to 6 GHz. For example, f1, f2, and f3 are 4 GHz, 4.6 GHz, and 5 GHz respectively.

In addition, when a length of the fourth branch 4225, a length of the third bifurcation branch 4226, a length of the fourth bifurcation branch 4227, or the ratio of the third value d3 to the fourth value d4 is changed, the third resonance frequency f3 is also changed. For example, under a same condition, when the ratio of the third value d3 to the fourth value d4 is changed from 1 to 2, the third resonance frequency f3 may be changed from 5 GHz to 5.1 GHz.

In this implementation, the fourth branch 4225, the third bifurcation branch 4226, and the fourth bifurcation branch 4227 are connected to one side of the first branch 4221 away from the second branch 4222. Therefore, a third convection mode is generated by using the third bifurcation branch 4226 and the fourth bifurcation branch 4227, that is, a quantity of convection modes generated by the first radiator 421 and the second radiator 422 is increased to three. In this case, a resonance mode with a low specific absorption rate covers a relatively wide frequency band in the frequency band of 0 to 6 GHz. Therefore, the operating frequency band of the antenna is wider. In other words, the operating frequency band of the antenna may be resonance frequencies corresponding to the three convection modes. For example, the operating frequency band is 3.8 GHz to 4.2 GHz, 4.4 GHz to 4.8 GHz, and 4.8 GHz to 5.2 GHz.

Figure 12:
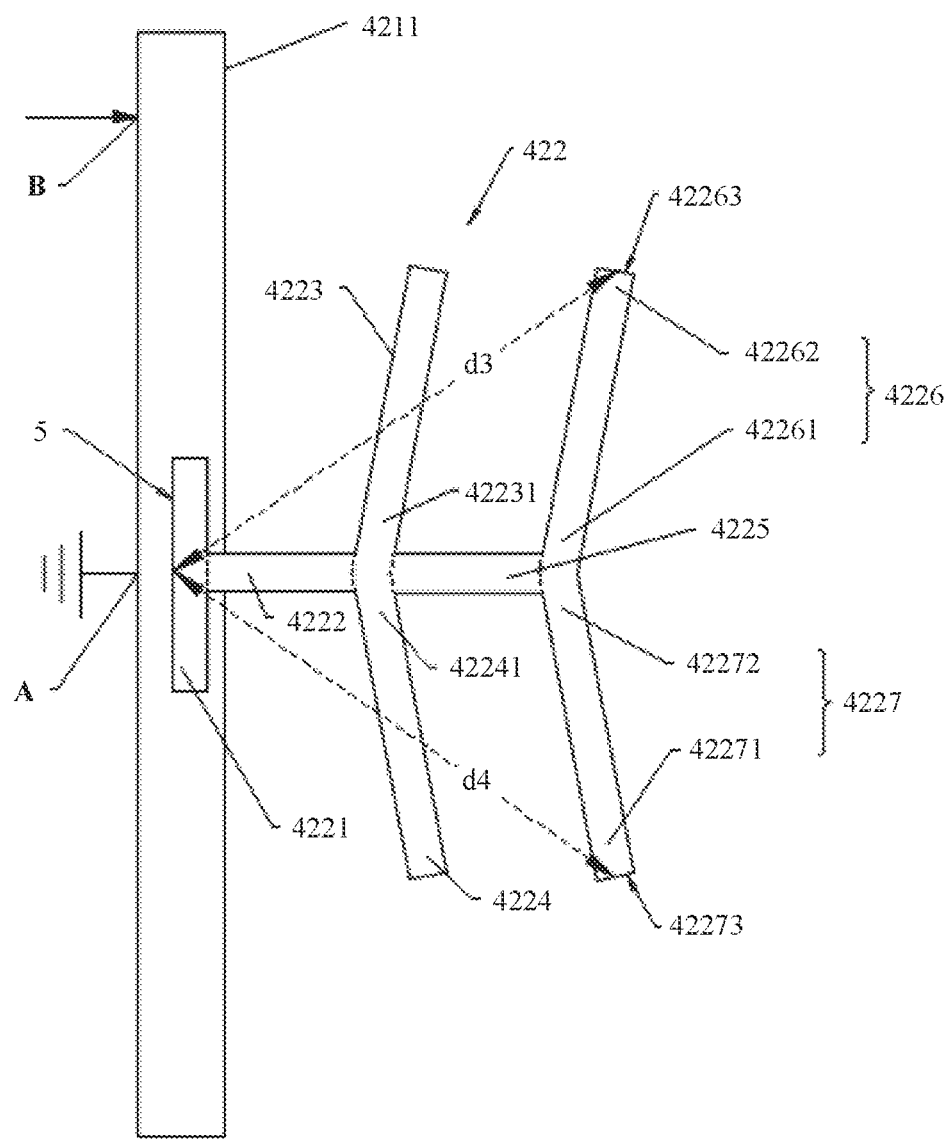
FIG. 12 is a schematic view of a structure of still another implementation of a radiator according to an embodiment of this application.

In a third implementation, technical content mostly the same as that in the first implementation is not described again. FIG. 12 is a schematic view of a structure of still another implementation of the radiator 42 according to an embodiment of this application. The second radiator 422 further includes a fourth branch 4225, a third bifurcation branch 4226, and a fourth bifurcation branch 4227. The fourth branch 4225, the third bifurcation branch 4226, and the fourth bifurcation branch 4227 are all located on one side of the first bifurcation branch 4223 and the second bifurcation branch 4224 away from the second branch 4222. A head end 42261 of the third bifurcation branch 4226 is connected to a head end 42271 of the fourth bifurcation branch 4227. One end of the fourth branch 4225 is connected to the head end 42261 of the third bifurcation branch 4226 and the head end 42271 of the fourth bifurcation branch 4227, and the other end of the fourth branch 4225 is connected to the head end 42231 of the first bifurcation branch 4223 and the head end 42241 of the second bifurcation branch 4224. A tail end 42262 of the third bifurcation branch 4226 and a tail end 42272 of the fourth bifurcation branch 4227 are located on two sides of the fourth branch 4225. The third bifurcation branch 4226 extends in a direction away from the reference face 5. The fourth bifurcation branch 4227 extends in a direction away from the reference face 5. The second radiator 422 is back-to-back E-shaped, or is approximately back-to-back E-shaped.

The two sides of the fourth branch 4225 may be understood as two sides of the fourth branch 4225 itself, or may be understood as two sides in an extension direction of the fourth branch 4225.

In an implementation, the third bifurcation branch 4226 and the fourth bifurcation branch 4227 are strip-shaped. An included angle between the third bifurcation branch 4226 and the fourth bifurcation branch 4227 is also the same as the included angle a between the first bifurcation branch 4223 and the second bifurcation branch 4224 in the first implementation.

In addition, a center distance between an end face 42263 of the tail end of the third bifurcation branch 4226 and the reference face 5 is a third value d3. A center distance between an end face 42273 of the tail end of the fourth bifurcation branch 4227 and the reference face 5 is a fourth value d4. A ratio of the third value d3 to the fourth value d4 is within a range of 0.5 to 2. In other words, when the second radiator 422 further includes the fourth branch 4225, the third bifurcation branch 4226, and the fourth bifurcation branch 4227, the second radiator 422 still has a quasi-symmetrical or symmetrical structure. In this implementation, the ratio of the third value d3 to the fourth value d4 is 1. In another implementation, the ratio of the third value d3 to the fourth value d4 may alternatively be 0.8, 1.22, 1.5, or 2.

It may be understood that when the radio frequency transceiver circuit 41 transmits radio frequency signals in the frequency band of 0 to 6 GHz, the radio frequency signals are transmitted to the first radiator 421 and the second radiator 422. In this case, the first radiator 421 and the second radiator 422 generate three resonance frequencies in the frequency band, and the three resonance frequencies are f1, f2, and f3 respectively. The three resonance modes are also all convection modes. In addition, a principle of forming the first resonance frequency f1 and the second resonance frequency f2 is the same as a principle of forming the first resonance frequency f1 and the second resonance frequency f2 in the first implementation. Details are not described herein. In addition, the third resonance frequency f3 is mainly generated by the third bifurcation branch 4226 and the fourth bifurcation branch 4227.

Specifically, when the radio frequency transceiver circuit 41 transmits radio frequency signals in the frequency band of 0 to 6 GHz, the radio frequency signals are transmitted to the first radiator 421 and the second radiator 422. In this case, at the frequency f3, the second radiator 422 has a current flowing from the fourth branch 4225 to the end face 42263 of the tail end of the third bifurcation branch 4226, and a current flowing from the fourth branch 4225 to the end face 42273 of the tail end of the fourth bifurcation branch 4227. It can be determined based on current distribution on the third bifurcation branch 4226 and the fourth bifurcation branch 4227 that a resonance mode generated by the third bifurcation branch 4226 and the fourth bifurcation branch 4227 is a convection mode. In addition, the frequency f3 is a resonance frequency of the convection mode.

It may be understood that the three resonance frequencies f1, f2, and f3 generated by the first radiator 421 and the second radiator 422 may be any value from 0 to 6 GHz. For example, f1, f2, and f3 are 4 GHz, 4.6 GHz, and 5 GHz respectively.

In addition, when a length of the fourth branch 4225, a length of the third bifurcation branch 4226, a length of the fourth bifurcation branch 4227, or the ratio of the third value d3 to the fourth value d4 is changed, the third resonance frequency f3 is also changed. For example, under a same condition, when the ratio of the third value d3 to the fourth value d4 is changed from 1 to 2, the third resonance frequency f3 may be changed from 5 GHz to 5.1 GHz.

In this implementation, the fourth branch 4225, the third bifurcation branch 4226, and the fourth bifurcation branch 4227 are connected to one side of the first bifurcation branch 4223 and the second bifurcation branch 4224 away from the second branch 4222. Therefore, a third convection mode is generated by using the current on the third bifurcation branch 4226 and the fourth bifurcation branch 4227, that is, a quantity of convection modes generated by the first radiator 421 and the second radiator 422 is increased to three. In this case, a resonance mode with a low specific absorption rate covers a relatively wide frequency band in the frequency band of 0 to 6 GHz. Therefore, the operating frequency band of the antenna is wider. In other words, the operating frequency band of the antenna may be resonance frequencies of the three convection modes. For example, the operating frequency band is 3.8 GHz to 4.2 GHz, 4.4 GHz to 4.8 GHz, and 4.8 GHz to 5.2 GHz.

Figure 13:
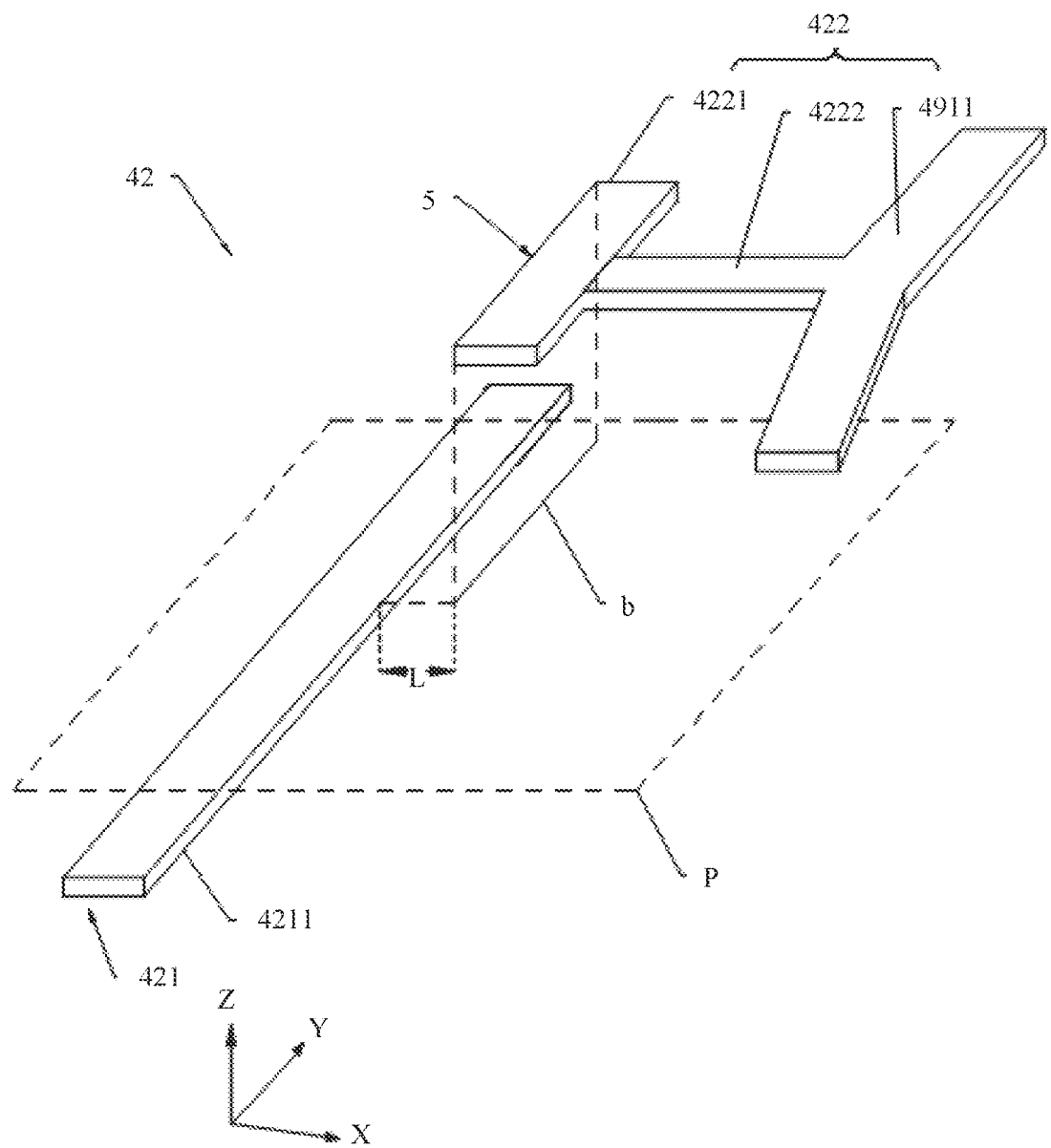
FIG. 13 is a schematic view of a structure of still another implementation of a radiator according to an embodiment of this application.
Figure 14:
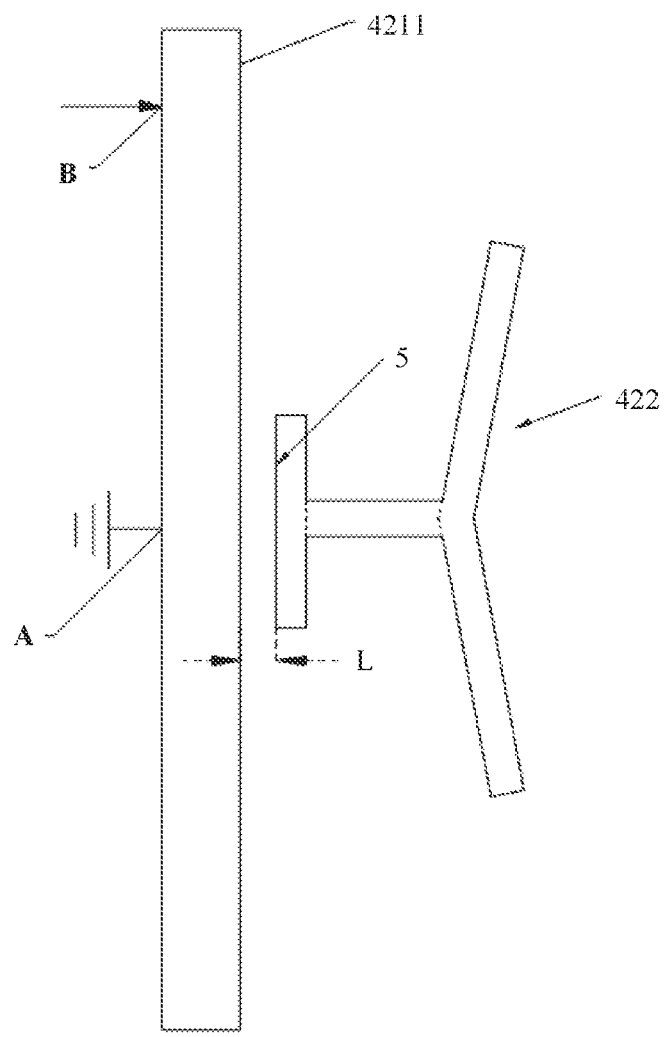
FIG. 14 is a schematic top view of the radiator shown in FIG. 13.

In a fourth implementation, technical content mostly the same as that in the first implementation is not described again. Referring to FIG. 13 and FIG. 14, FIG. 14 is a schematic top view of the radiator shown in FIG. 13. A shortest distance L between the first feeding branch 4211 and the first projection b of the reference face 5 on the plane in which the first feeding branch 4211 is located is within a range of 0 to 3 millimeters. In other words, the first feeding branch 4211 is disposed close to the second radiator 422. The shortest distance L in this implementation is 1 millimeter. In another implementation, the shortest distance L may be 0 millimeters, 0.2 millimeter, 0.75 millimeter, 1.3 millimeters, or 2.6 millimeters.

Figure 15:
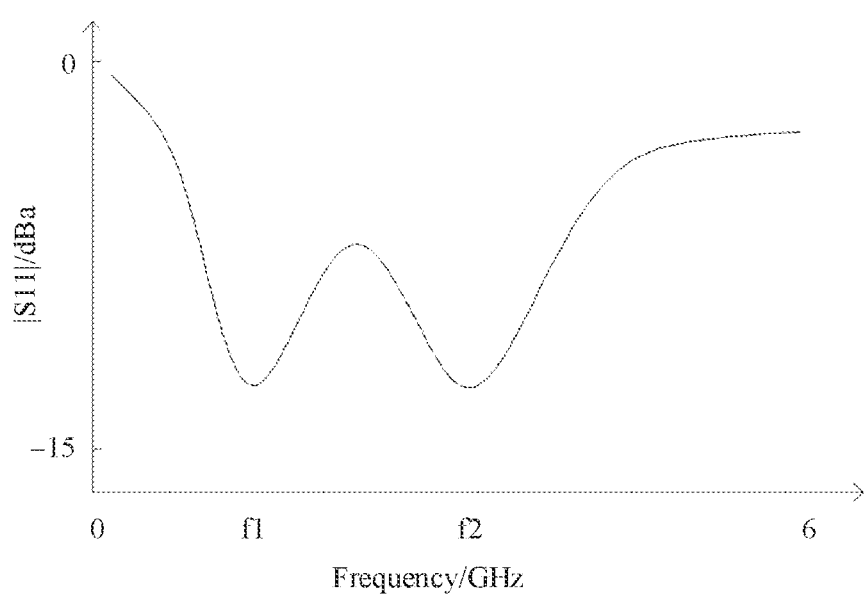
FIG. 15 is a graph of a relationship between a reflection coefficient and a frequency of the radiator shown in FIG. 14 in a frequency band of 0 to 6 GHz.

FIG. 15 is a graph of a relationship between a reflection coefficient and a frequency of the radiator 42 shown in FIG. 14 in the frequency band of 0 to 6 GHz. When radio frequency signals at a frequency of 0 to 6 GHz are fed to the first radiator 421 and the second radiator 422, the first radiator 421 and the second radiator 422 generate two resonance modes in the frequency band, that is, the first radiator 421 and the second radiator 422 may generate two resonance frequencies in the frequency band. FIG. 15 shows that the two resonance frequencies generated by the first radiator 421 and the second radiator 422 are f1 and f2 respectively. It may be understood that a principle of forming the two convection modes in this implementation is the same as a principle of forming the first convection mode and the second convection mode in the first implementation. Details are not described herein.

In this implementation, the two resonance frequencies f1 and f2 generated by the first radiator 421 and the second radiator 422 may be any value from 0 to 6 GHz. For example, f1 may be 4 GHz, and f2 may be 4.6 GHz. In addition, when the position of the feeding point B or the external environment in which the first radiator 421 and the second radiator 422 are located (for example, fixed positions of the first radiator 421 and the second radiator 422) is changed, the two resonance frequencies f1 and f2 generated by the first radiator 421 and the second radiator 422 are also changed, that is, the two resonance frequencies f1 and f2 may be other values.

For example, under a same condition, when the shortest distance L is changed from 1 millimeter to 1.2 millimeters, the second resonance frequency f2 generated by the first radiator 421 and the second radiator 422 is changed from 4.6 GHz to 4.7 GHz.

In this implementation, when the first radiator 421 and the second radiator 422 receive the radio frequency signals in the frequency band of 0 to 6 GHz, the first radiator 421 and the second radiator 422 can generate a convection mode in the frequency band. The operating frequency band of the antenna 40 may be set around a resonance frequency of the convection mode, so that when the first radiator 421 and the second radiator 422 radiate signals, the signals radiated by the first radiator 421 and the second radiator 422 have little adverse impact on the user.

In another implementation, the structure of the second radiator 422 is not limited to the structure shown in FIG. 13 and FIG. 14. The structure of the second radiator 422 may alternatively be any structure in the first implementation to the third implementation. A specific structure is not limited in this implementation.

Figure 16:
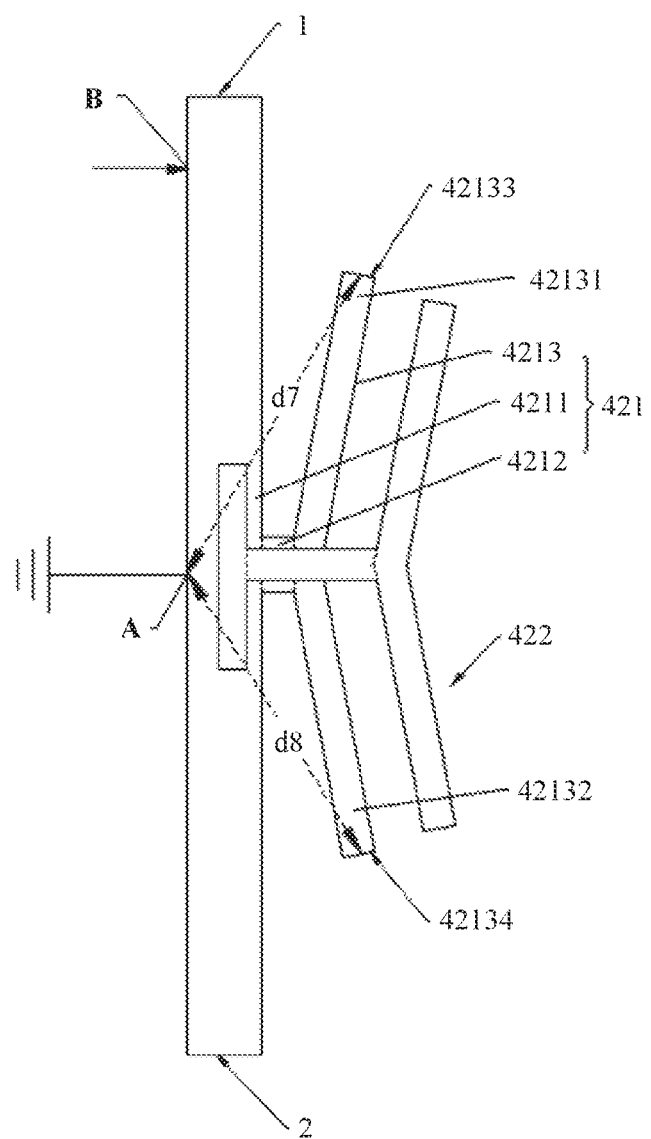
FIG. 16 is a schematic view of a structure of still another implementation of a radiator according to an embodiment of this application.

In a fifth implementation, technical content mostly the same as that in the first implementation is not described again. FIG. 16 is a schematic view of a structure of still another implementation of the radiator 42 according to an embodiment of this application. The first radiator 421 further includes a connection branch 4212 and a second feeding branch 4213. The second feeding branch 4213 includes a first tail end 42131 and a second tail end 42132 disposed away from the first tail end 42131. One end of the connection branch 4212 is connected between the first end face 1 and the second end face 2 of the first feeding branch 4211, and the other end of the connection branch 4212 is connected between the first tail end 42131 and the second tail end 42132. In addition, the first tail end 42131 and the second tail end 42132 are located on two sides of the connection branch 4212.

It may be understood that the two sides of the connection branch 4212 may be understood as two sides of the connection branch 4212 itself, or may be understood as two sides in an extension direction of the connection branch 4212.

In an implementation, the first feeding branch 4211, the connection branch 4212, and the second feeding branch 4213 are all strip-shaped. In this case, the first radiator 421 is I-shaped or is approximately I-shaped. Certainly, in another implementation, shapes of the connection branch 4212 and the second feeding branch 4213 may alternatively be other shapes. For example, the second feeding branch 4213 is arc-shaped. This is not specifically limited in this application.

In addition, a distance between a center of an end face 42133 of the first tail end 42131 and the grounding point A is a seventh value d7. A distance between a center of an end face 42134 of the second tail end 42132 and the grounding point A is an eighth value d8. A ratio of the seventh value d7 to the eighth value d8 is within a range of 0.3 to 3. In this implementation, the ratio of the seventh value d7 to the eighth value d8 is 1. In another implementation, the ratio of the seventh value d7 to the eighth value d8 may alternatively be 0.5, 0.6, 2, or 2.5.

It may be understood that when the radio frequency transceiver circuit 41 transmits radio frequency signals in the frequency band of 0 to 6 GHz, the radio frequency signals are transmitted to the first radiator 421 and the second radiator 422. In this case, the first radiator 421 and the second radiator 422 generate three resonance frequencies in the frequency band, and the three resonance frequencies are f1, f2, and f3 respectively. The three resonance modes are also all convection modes. In addition, a principle of forming the first resonance frequency f1 and the second resonance frequency f2 is the same as a principle of forming the first resonance frequency f1 and the second resonance frequency f2 in the first implementation. Details are not described herein. The third resonance frequency f3 is mainly generated by the second feeding branch 4213.

Specifically, when the radio frequency transceiver circuit 41 transmits radio frequency signals in the frequency band of 0 to 6 GHz, the radio frequency signals are transmitted to the first radiator 421 and the second radiator 422. In this case, at the frequency f3, the second feeding branch 4213 has a current flowing from the connection branch 4212 to the two end faces of the second feeding branch 4213. It can be determined based on current distribution on the second feeding branch 4213 that a resonance mode generated by the second feeding branch 4213 is a convection mode. In addition, the frequency f3 is a resonance frequency of the convection mode.

It may be understood that the third resonance frequency f3 generated by the second feeding branch 4213 may be any value in the frequency band of 0 to 6 GHz. For example, f3 is 5 GHz. In addition, when a length of the second feeding branch 4213, a length of the connection branch 4212, and the ratio of the seventh value d7 to the eighth value d8 are changed, the resonance frequency f3 of the third convection mode is also changed, that is, the resonance frequency of the third convection mode may alternatively be another value.

In this implementation, the connection branch 4212 and the second feeding branch 4213 are disposed on one side of the first feeding branch 4211, so that the third convection mode is generated by using the current on the connection branch 4212 and the current on the second feeding branch 4213, that is, a quantity of convection modes generated by the first radiator 421 and the second radiator 422 is increased to three. In this case, a resonance mode with a low specific absorption rate covers a relatively wide frequency band in the frequency band of 0 to 6 GHz. Therefore, the operating frequency band of the antenna is wider. In other words, the operating frequency band of the antenna may be a set surrounding frequency band in which the resonance frequencies of the three convection modes are located.

In another implementation, the structure of the second radiator 422 is not limited to the structure shown in FIG. 16. The structure of the second radiator 422 may alternatively be any structure in the second implementation and the third implementation. Details are not described herein again.

Figure 17:
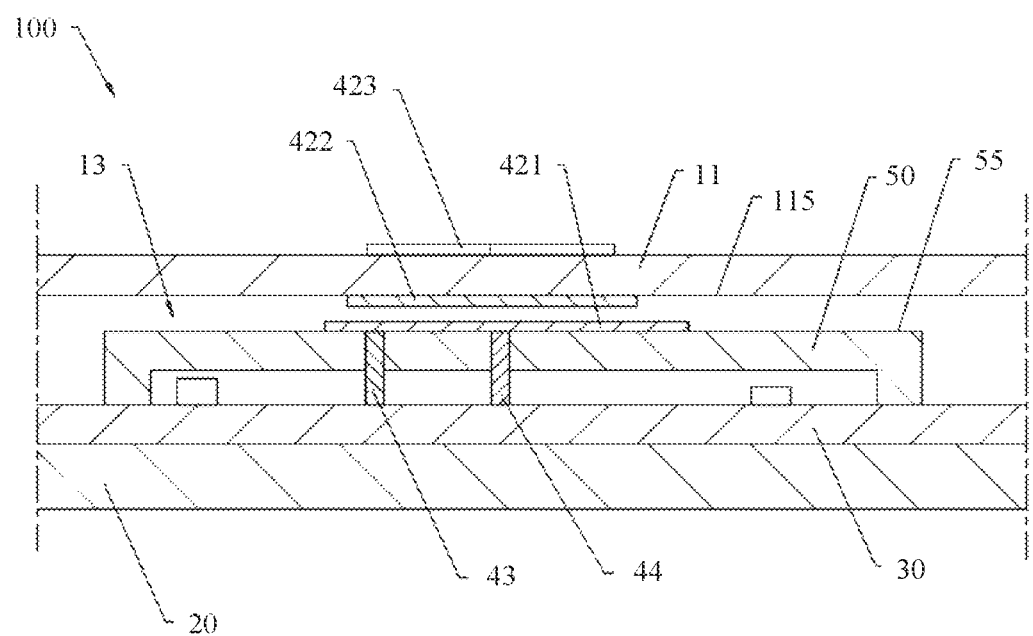
FIG. 17 is a schematic cross-sectional view of another implementation of the electronic device shown in FIG. 1 at a line M-M.

In a sixth implementation, technical content mostly the same as that in the first implementation is not described again. FIG. 17 is a schematic cross-sectional view of another implementation of the electronic device 100 shown in FIG. 1 at the line M-M. The radiator 42 further includes a third radiator 423. The third radiator 423 is located on one side of the second radiator 422 away from the first radiator 421.

In this implementation, the third radiator 423 is formed on the surface of the rear cover 11 away from the accommodating space 13 by using LDS, that is, the third radiator 423 is formed on an outer surface of the rear cover 11. In addition, it can be learned from the first implementation that the first radiator 421 is formed on the first surface 55 of the support 50. The second radiator 422 is formed on the second surface 115 of the rear cover 11. In this case, the first radiator 421, the second radiator 422, and the third radiator 423 are located at different layers. Certainly, the third radiator 423 may alternatively be formed in another manner. For example, a conductive material (for example, a metallic material such as gold, silver, or copper, or graphene) is formed on the surface of the rear cover 11 away from the accommodating space 13, and the conductive material forms the third radiator 423.

Figure 18:
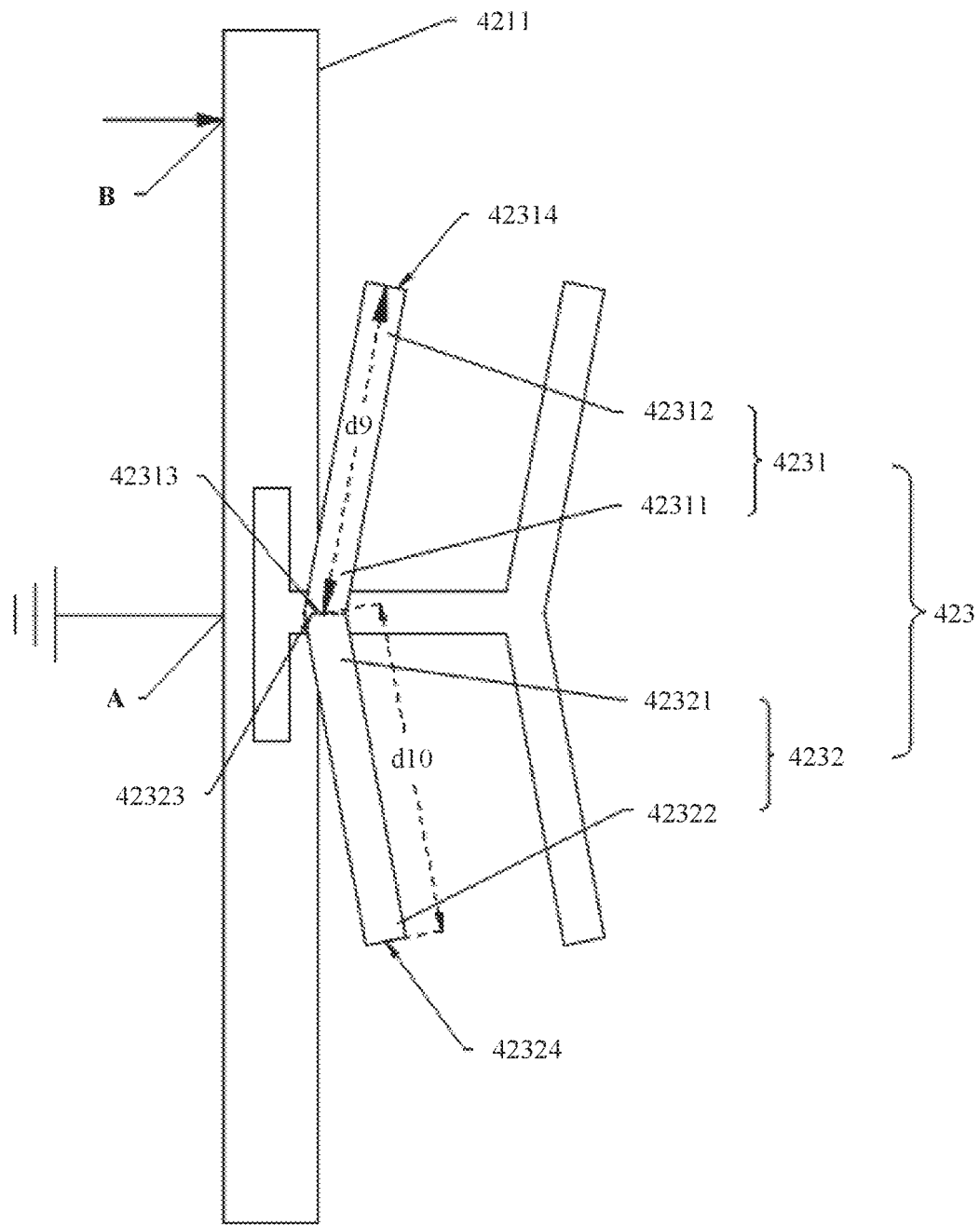
FIG. 18 is a schematic view of a structure of a radiator of the electronic device shown in FIG. 17.

FIG. 18 is a schematic view of a structure of the radiator 42 of the electronic device 100 shown in FIG. 17. The third radiator 423 includes a fifth bifurcation branch 4231 and a sixth bifurcation branch 4232. A head end 42311 of the fifth bifurcation branch 4231 and a head end 42321 of the sixth bifurcation branch 4232 are connected to each other. The fifth bifurcation branch 4231 extends in a direction away from the head end 42321 of the sixth bifurcation branch 4232. The sixth bifurcation branch 4232 extends in a direction away from the head end 42311 of the fifth bifurcation branch 4231.

In addition, a projection of the third radiator 423 on the first radiator 421 is partly located in the first radiator 421. In another implementation, the projection of the third radiator 423 on the first radiator 421 may be completely located in the first radiator 421.

In addition, a center distance between an end face 42313 of the head end and an end face 42314 of a tail end of the fifth bifurcation branch 4231 is a ninth value d9. A center distance between an end face 42323 of the head end and an end face 42324 of a tail end of the sixth bifurcation branch 4232 is a tenth value d10. A ratio of the ninth value d9 to the tenth value d10 is within a range of 0.5 to 2. In other words, the third radiator 423 has a quasi-symmetrical or symmetrical structure. In this implementation, the ratio of the ninth value d9 to the tenth value d10 is 1. In another implementation, the ratio of the ninth value d9 to the tenth value d10 may alternatively be 0.8, 1.22, 1.5, or 2.

Figure 19:
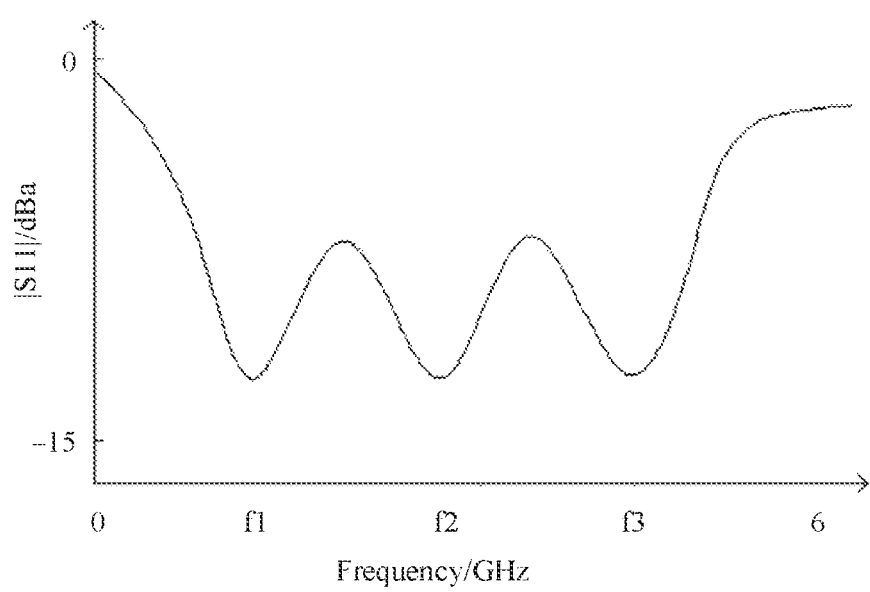
FIG. 19 is a graph of a relationship between a reflection coefficient and a frequency of the radiator shown in FIG. 18 in a frequency band of 0 to 6 GHz.

FIG. 19 is a graph of a relationship between a reflection coefficient and a frequency of the radiator 42 shown in FIG. 18 in the frequency band of 0 to 6 GHz. When the radio frequency transceiver circuit 41 transmits radio frequency signals in the frequency band of 0 to 6 GHz, the radio frequency signals are transmitted to the first feeding branch 4211, the second radiator 422, and the third radiator 423. In this case, the first feeding branch 4211, the second radiator 422, and the third radiator 423 generate three resonance frequencies in the frequency band. FIG. 19 shows that the three resonance frequencies generated by the first feeding branch 4211, the second radiator 422, and the third radiator 423 are f1, f2 and f3 respectively.

It may be understood that a principle of forming the first resonance frequency f1 and the second resonance frequency f2 is the same as a principle of forming the first resonance frequency f1 and the second resonance frequency f2 in the first implementation. Details are not described herein. In addition, the third resonance frequency f3 is mainly a resonance mode generated by the third radiator 423.

Specifically, when the radio frequency transceiver circuit 41 transmits radio frequency signals in the frequency band of 0 to 6 GHz, the radio frequency signals are transmitted to the first feeding branch 4211, the second radiator 422, and the third radiator 423. In this case, at the frequency f3, the third radiator 423 has a current flowing from the head end 42311 to the tail end 42312 of the fifth bifurcation branch 4231, and a current flowing from the head end 42321 to the tail end 42322 of the sixth bifurcation branch 4232. It can be determined based on current distribution on the third radiator 423 that a resonance mode generated by the third radiator 423 is a convection mode. In addition, the frequency f3 is a resonance frequency of the convection mode, that is, the third resonance frequency f3 shown in FIG. 19.

It may be understood that the three resonance frequencies f1, f2, and f3 generated by the first feeding branch 4211, the second radiator 422, and the third radiator 423 may be any value from 0 to 6 GHz. For example, f1, f2, and f3 are 4 GHz, 4.6 GHz, and 5 GHz respectively.

In addition, when a length of the fifth bifurcation branch 4231, a length of the sixth bifurcation branch 4232, or the ratio of the ninth value d9 to the tenth value d10 is changed, the third resonance frequency f3 is also changed. For example, under a same condition, when the ratio of the third value d3 to the fourth value d4 is changed from 1 to 2, the third resonance frequency f3 may be changed from 5 GHz to 5.1 GHz.

In this implementation, because the third radiator 423 is disposed on one side of the second radiator 422 away from the first radiator 421, a third convection mode is generated by using a current on the third radiator 423, that is, a quantity of convection modes generated by the first radiator 421, the second radiator 422, and the third radiator 423 is increased to three. In this case, a resonance mode with a low specific absorption rate covers a relatively wide frequency band in the frequency band of 0 to 6 GHz. Therefore, the operating frequency band of the antenna is wider. In other words, the operating frequency band of the antenna may be a surrounding frequency band in which the resonance frequencies of the three convection modes are located. For example, the operating frequency band is 3.8 GHz to 4.2 GHz, 4.4 GHz to 4.8 GHz, and 4.8 GHz to 5.2 GHz.

In another implementation, the structure of the first radiator 421 is not limited to the structure shown in FIG. 18. The structure of the first radiator 421 may alternatively be the structure of the first radiator 421 in the fifth implementation. In addition, the structure of the second radiator 422 is not limited to the structure shown in FIG. 18. The structure of the second radiator 422 may alternatively be any structure in the second implementation and the third implementation. A specific structure is not limited in this implementation.

In another implementation, the third radiator 423 may alternatively be a multi-branch structure. For example, the third radiator 423 is I-shaped or back-to-back E-shaped.

Figure 20A:
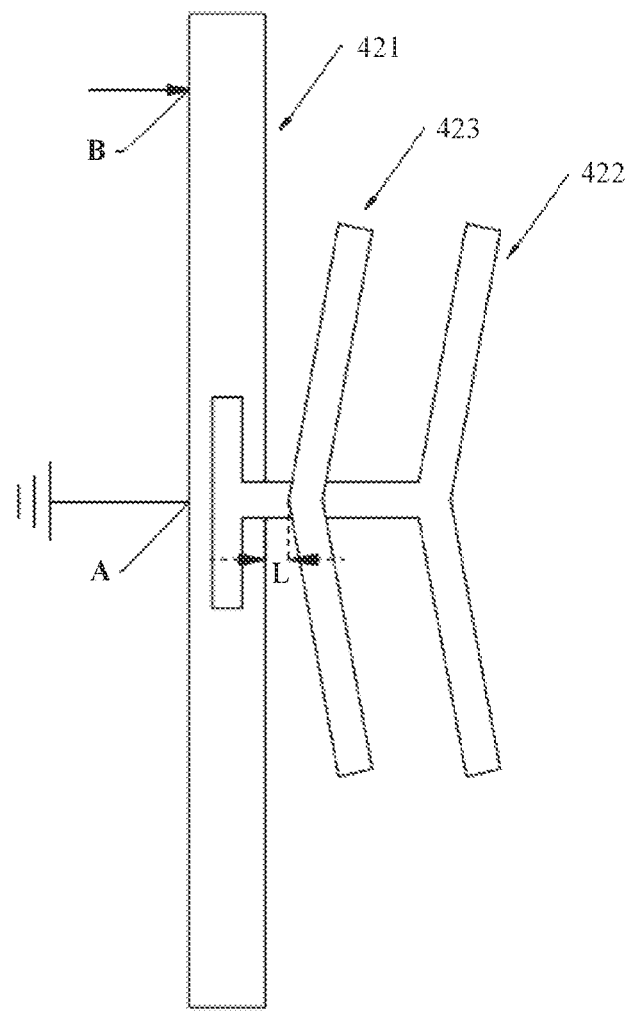
FIG. 20a is a schematic view of a structure of still another implementation of a radiator according to an embodiment of this application.

In another implementation, FIG. 20a is a schematic view of a structure of still another implementation of the radiator 42 according to an embodiment of this application. A shortest distance L between the first radiator 421 and the projection of the third radiator 423 on the first radiator 421 is within a range of 0 to 3 millimeters. For example, L may be 0 millimeters, 0.2 millimeter, 0.75 millimeter, 1.3 millimeters, or 2.6 millimeters.

In this implementation, the first radiator 421, the second radiator 422, and the third radiator 423 can also generate three convection modes. It may be understood that a principle of forming the three convection modes in this implementation is the same as a principle of forming the three convection modes in the sixth implementation. Details are not described herein.

Figure 20B:
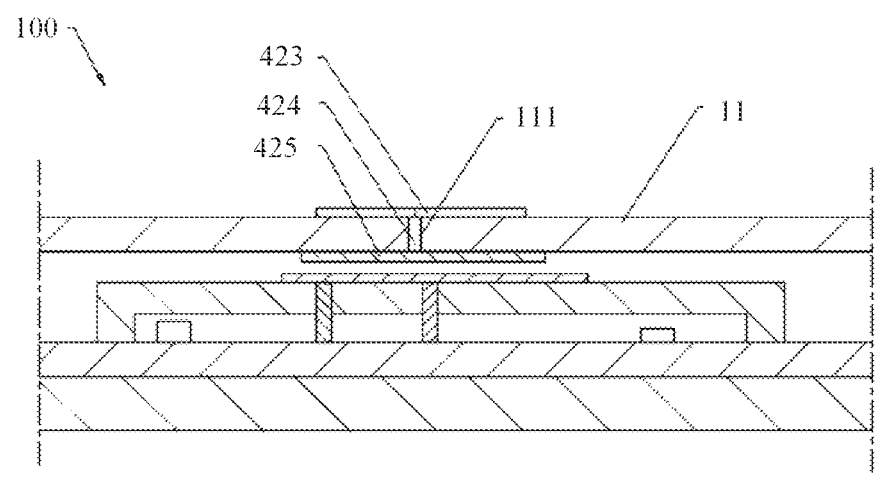
FIG. 20b is a schematic cross-sectional view of still another implementation of the electronic device shown in FIG. 1 at a line M-M.

In another implementation, FIG. 20b is a schematic cross-sectional view of still another implementation of the electronic device 100 shown in FIG. 1 at the line M-M. The radiator 42 may further include a fourth connection branch 424. The fourth connection branch 424 is connected between the third radiator 423 and the second radiator 422. In an implementation, a through hole 111 may be opened in the rear cover 11. The through hole 111 penetrates an inner surface and the outer surface of the rear cover 11. The fourth connection branch 424 is located in the through hole 111. In this case, because the third radiator 423 is formed on the outer surface of the rear cover 11 and the second radiator 422 is formed on the inner surface of the rear cover 11, the fourth connection branch 424 can connect the third radiator 423 to the second radiator 422.

Figure 21:
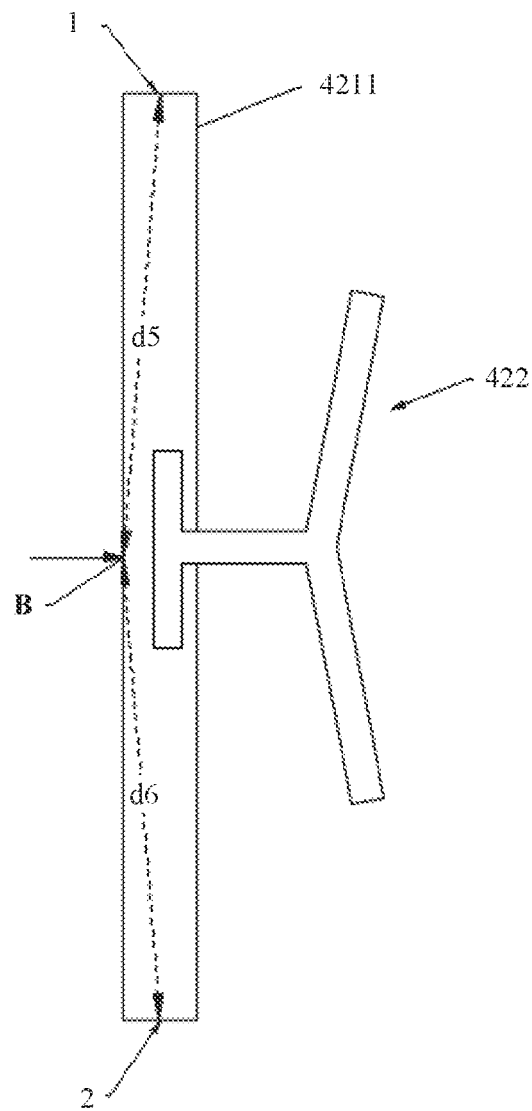
FIG. 21 is a schematic view of a structure of still another implementation of a radiator according to an embodiment of this application.

In a seventh implementation, technical content mostly the same as that in the first implementation is not described again. FIG. 21 is a schematic view of a structure of still another implementation of the radiator 42 according to an embodiment of this application. The first radiator 421 has a feeding point B, but does not have a grounding point A.

Definitions of a fifth value d5 and a sixth value d6 in this implementation are different from definitions of the fifth value d5 and the sixth value d6 in the first implementation. Specifically, a distance between a center of a first end face 1 and the feeding point B of the first feeding branch 4211 is a fifth value d5. A distance between a center of a second end face 2 and the feeding point B is a sixth value d6. A ratio of the fifth value d5 to the sixth value d6 is within a range of 0.3 to 3. In this case, the first radiator 421 has a quasi-symmetrical or symmetrical structure. In this implementation, the ratio of the fifth value d5 to the sixth value d6 is 1. In another implementation, the ratio of the fifth value d5 to the sixth value d6 may alternatively be 0.3, 0.8, 1.2, 2.3, or 2.9.

It may be understood that when radio frequency signals at a frequency of 0 to 6 GHz are fed to the first feeding branch 4211 and the second radiator 422, the first feeding branch 4211 and the second radiator 422 generate two resonance modes in the frequency band, that is, the first feeding branch 4211 and the second radiator 422 may generate two resonance frequencies in the frequency band, and the two resonance frequencies are f1 and f2 respectively.

In this case, at the frequency f1, the first feeding branch 4211 has a first current flowing from the first end face 1 to the feeding point B and a second current flowing in a direction from the second end face 2 to the feeding point B. In addition, current distribution on the second radiator 422 is the same as current distribution on the second radiator 422 in the first implementation. Therefore, it can be determined based on current distribution on the first feeding branch 4211 and the second radiator 422 that a resonance mode generated by the first feeding branch 4211 and the second radiator 422 at the frequency f1 is a convection mode. In addition, the frequency f1 is a resonance frequency of the convection mode.

In addition, at the frequency f2, the first feeding branch 4211 has a first current flowing from the first end face 1 to the feeding point B and a second current flowing in a direction from the second end face 2 to the feeding point B. In addition, current distribution on the second radiator 422 is the same as current distribution on the second radiator 422 in the first implementation. Therefore, it can be determined based on current distribution on the first feeding branch 4211 and the second radiator 422 that a resonance mode generated by the first feeding branch 4211 and the second radiator 422 at the frequency f2 is a convection mode. In addition, the frequency f2 is a resonance frequency of the convection mode.

It may be understood that the structure of the first radiator 421 is not limited to the structure shown in FIG. 21. The structure of the first radiator 421 may alternatively be the structure of the first radiator 421 in the fifth implementation. In addition, the structure of the second radiator 422 is not limited to the structure shown in FIG. 21. The structure of the second radiator 422 may alternatively be any structure in the second implementation and the third implementation. Details are not described herein again. Certainly, in another implementation, the radiator 42 may alternatively include a third radiator 423. For a manner of disposing the third radiator 423, refer to the sixth implementation. Details are not described herein again. In another implementation, for a position relationship between the first radiator 421 and the second radiator 422, refer to the fourth implementation. Details are not described herein again.

Figure 22:
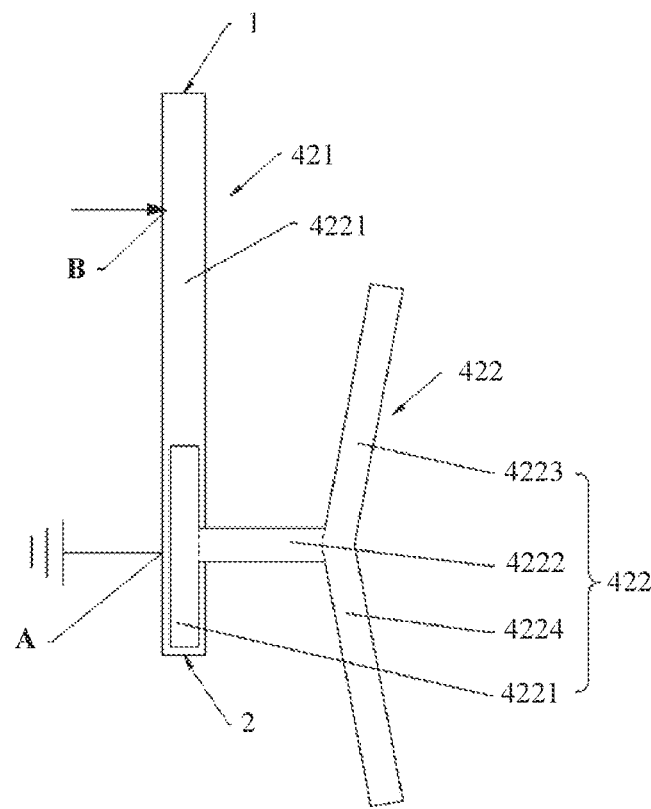
FIG. 22 is a schematic view of a structure of still another implementation of a radiator according to an embodiment of this application.

In an eighth implementation, technical content mostly the same as that in the first implementation is not described again. FIG. 22 is a schematic view of a structure of still another implementation of the radiator 42 according to an embodiment of this application. The first radiator 421 may be an inverted-F antenna (Inverted-F Antenna, IFA), or may be a composite left/right-handed antenna (composite right/left-handed antenna, CRLH).

Figure 23:
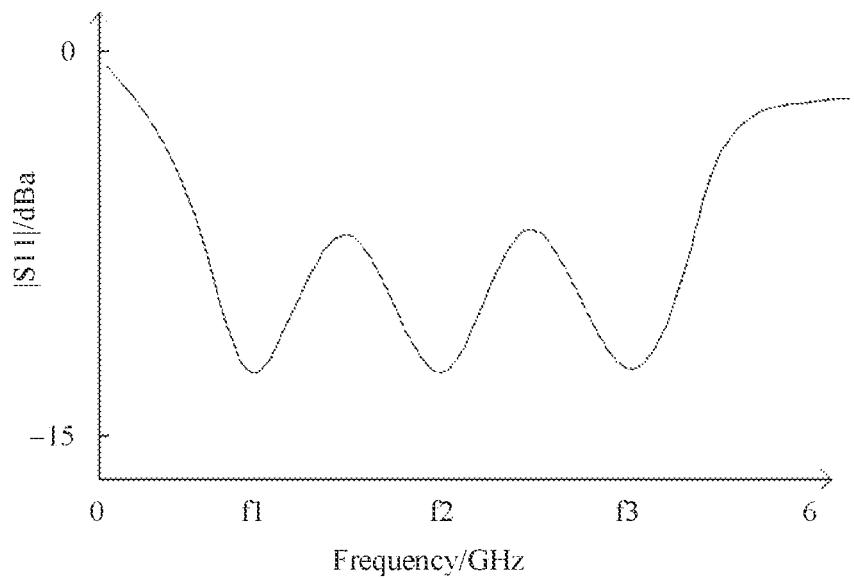
FIG. 23 is a graph of a relationship between a reflection coefficient and a frequency of the radiator shown in FIG. 22 in a frequency band of 0 to 6 GHz.

FIG. 23 is a graph of a relationship between a reflection coefficient and a frequency of the radiator 42 shown in FIG. 22 in the frequency band of 0 to 6 GHz. When the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 generate three resonance modes in the frequency band, that is, the first radiator 421 and the second radiator 422 may generate three resonance frequencies in the frequency band. FIG. 23 shows that the resonance frequencies generated by the first radiator 421 and the second radiator 422 are f1, f2, and f3 respectively. In addition, by observing current distribution on the first radiator 421 and the second radiator 422 at each of the frequencies f1, f2, and f3, it can be determined that the first resonance mode may be a quarter mode, and the second resonance mode is a convection mode, and the third resonance mode is a differential mode.

It may be understood that a principle of forming the convection mode in this implementation is the same as a principle of forming the second convection mode in the first implementation. Details are not described herein.

It may be understood that when a length of the feeding branch 4211, a length of the first branch 4211, a length of the second branch 4222, a length of the first bifurcation branch 4223, a length of the second bifurcation branch 4224, a position of the feeding point B, or a position of the feeding point A is changed, or relative positions of the second radiator 422 and the first radiator 421 or an external environment in which the first radiator 421 and the second radiator 422 are located is changed, the resonance frequency of the convection mode is also changed.

In this implementation, when the first radiator 421 and the second radiator 422 receive the radio frequency signals in the frequency band of 0 to 6 GHz, the first radiator 421 and the second radiator 422 can generate a convection mode in the frequency band. In this case, the operating frequency band of the antenna 40 may be set around a resonance frequency of the convection mode, so that when the first radiator 421 and the second radiator 422 radiate signals, the signals radiated by the first radiator 421 and the second radiator 422 have little adverse impact on the user.

In another implementation, the structure of the second radiator 422 is not limited to the structure shown in FIG. 22. The structure of the second radiator 422 may alternatively be any structure in the second implementation and the third implementation. Details are not described herein again. In addition, the position relationship between the first radiator 421 and the second radiator 422 may alternatively be the position shown in the fourth implementation. The radiator 42 may alternatively include a third radiator 423. For a manner of disposing the third radiator 423, refer to the sixth implementation. Details are not described herein again.

Figure 24:
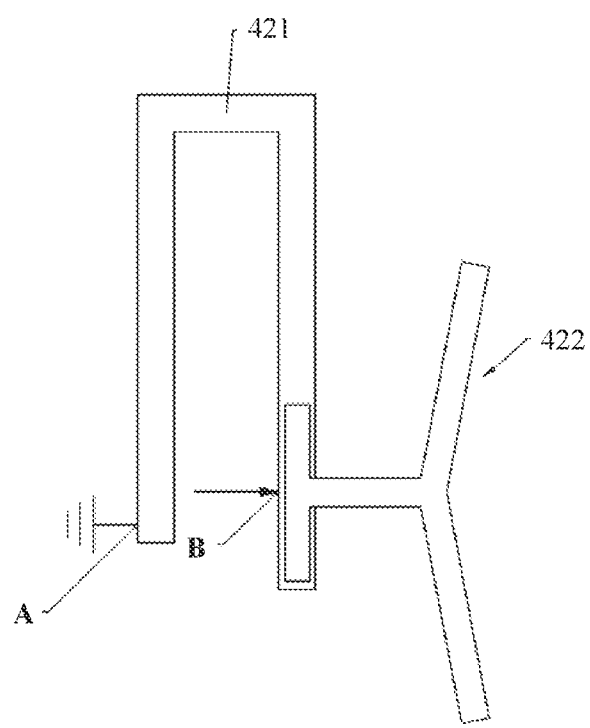
FIG. 24 is a schematic view of a structure of still another implementation of a radiator according to an embodiment of this application.

In a ninth implementation, technical content mostly the same as that in the first implementation is not described again. FIG. 24 is a schematic view of a structure of still another implementation of the radiator 42 according to an embodiment of this application. The first radiator 421 is a loop antenna (loop antenna). In this case, the first radiator 421 is U-shaped, or is approximately U-shaped.

It may be understood that when the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 generate three resonance modes in the frequency band, that is, the first radiator 421 and the second radiator 422 may generate three resonance frequencies f1, f2, and f3 respectively in the frequency band. In addition, by observing current distribution on the first radiator 421 and the second radiator 422 at each of the frequencies f1, 2, and f3, it can be determined that the first resonance mode may be a quarter mode, and the second resonance mode is a convection mode, and the third resonance mode is a differential mode.

It may be understood that a principle of forming the convection mode is the same as a principle of forming the second convection mode in the first implementation. Details are not described herein.

In this implementation, when the first radiator 421 and the second radiator 422 receive the radio frequency signals in the frequency band of 0 to 6 GHz, the first radiator 421 and the second radiator 422 can generate a convection mode in the frequency band. In this case, the operating frequency band of the antenna 40 may be set around a resonance frequency of the convection mode, so that when the first radiator 421 and the second radiator 422 radiate signals, the signals radiated by the first radiator 421 and the second radiator 422 have little adverse impact on the user.

It may be understood that a position of the second radiator 422 is not limited to one end portion of the first radiator 421 shown in FIG. 24. Alternatively, a position of the second radiator 422 may be any position facing the first radiator 421.

In another implementation, the structure of the second radiator 422 is not limited to the structure shown in FIG. 24. The structure of the second radiator 422 may alternatively be any structure in the second implementation and the third implementation. Details are not described herein again. In addition, the position relationship between the first radiator 421 and the second radiator 422 may alternatively be the position shown in the fourth implementation. The radiator 42 may alternatively include a third radiator 423. For a manner of disposing the third radiator 423, refer to the sixth implementation. Details are not described herein again.

Figure 25A:
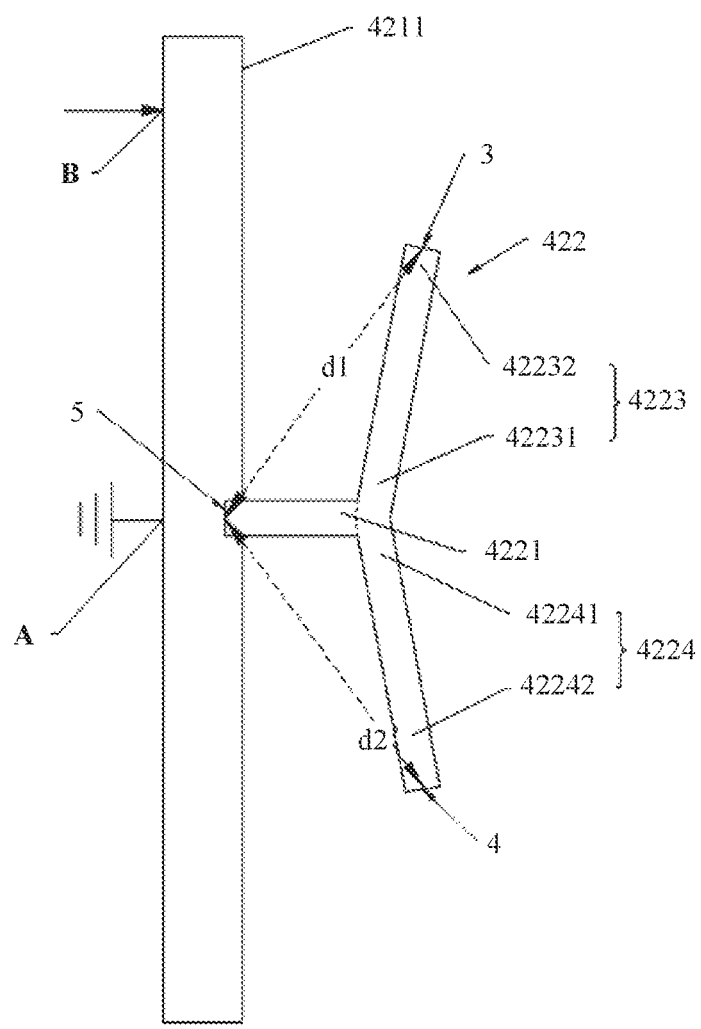
FIG. 25a is a schematic view of a structure of still another implementation of a radiator according to an embodiment of this application.

In a tenth implementation, technical content mostly the same as that in the first implementation is not described again. FIG. 25a is a schematic view of a structure of still another implementation of the radiator 42 according to an embodiment of this application. The second radiator 422 includes a first branch 4221, a first bifurcation branch 4223, and a second bifurcation branch 4224. A head end 42231 of the first bifurcation branch 4223 and a head end 42241 of the second bifurcation branch 4224 are connected to the first branch 4221. A tail end 42232 of the first bifurcation branch 4223 and a tail end 42242 of the second bifurcation branch 4224 are located on two sides of the first branch 4221. In this case, the second radiator 422 is Y-shaped, or is approximately T-shaped.

The two sides of the first branch 4221 may be understood as two sides of the first branch 4221 itself, or may be understood as two sides in an extension direction of the first branch 4221.

In addition, the first branch 4221 has a reference face 5 away from the first bifurcation branch 4223 and the second bifurcation branch 4224.

In addition, a projection of the reference face 5 on the first feeding branch 4211 partly overlaps the first feeding branch 4211. In another implementation, alternatively, a projection of the reference face 5 on the first feeding branch 4211 may completely overlap the first feeding branch 4211.

In addition, a center distance between an end face 3 of the tail end of the first bifurcation branch 4223 and the reference face 5 is a first value d1. A center distance between an end face 4 of the tail end of the second bifurcation branch 4224 and the reference face 5 is a second value d2. In this case, a ratio of the first value d1 to the second value d2 is within a range of 0.5 to 2. In this case, the second radiator 422 has a quasi-symmetrical or symmetrical structure. In this implementation, the ratio of the first value d1 to the second value d2 is 1. In another implementation, the ratio of the first value d1 to the second value d2 may alternatively be 0.8, 1.22, 1.5, or 2.

It may be understood that when radio frequency signals in the frequency band of 0 to 6 GHz are fed to the first feeding branch 4211 and the second radiator 422, the first radiator 421 and the second radiator 422 generate two resonance modes in the frequency band, that is, the first radiator 421 and the second radiator 422 may generate two resonance frequencies in the frequency band. The two resonance modes are both convection modes. In addition, a principle of forming the two convection modes is the same as a principle of forming the first convection mode and the second convection mode in the first implementation. Details are not described herein.

Figure 25B:
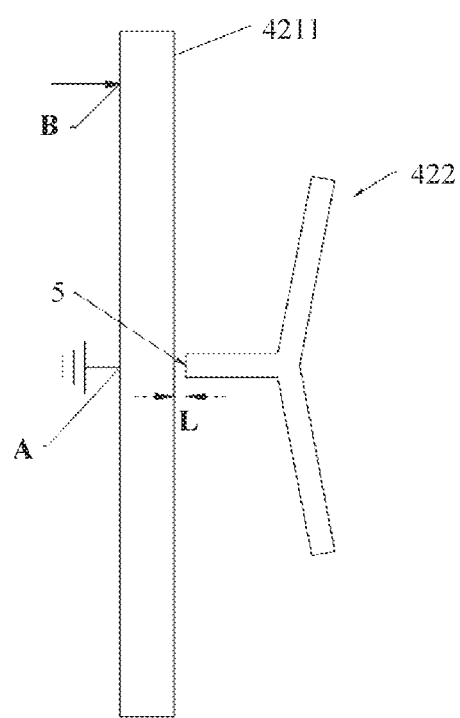
FIG. 25b is a schematic view of a structure of still another implementation of a radiator according to an embodiment of this application.

In another implementation. FIG. 25b is a schematic view of a structure of still another implementation of the radiator according to an embodiment of this application. A shortest distance L between the first feeding branch 4211 and the projection of the reference face 5 on the first feeding branch 4211 is within a range of 0 to 3 millimeters. The shortest distance L in this implementation is 1 millimeter. In another implementation, the shortest distance L may be 0 millimeters, 0.2 millimeter, 0.75 millimeter, or 1.3 millimeters. In this case, when radio frequency signals at a frequency of 0 to 6 GHz are fed to the first feeding branch 4211 and the second radiator 422, currents on the first feeding branch 4211 and the second radiator 422 can also generate two convection modes. It may be understood that a principle of forming the first convection mode is the same as a principle of forming the first convection mode in the tenth implementation. A principle of forming the second convection mode is the same as a principle of forming the second convection mode in the tenth implementation. Details are not described herein.

In addition, when the shortest distance L is another value, the second resonance frequency f2 is also changed, that is, the second resonance frequency f2 may be another value.

Figure 25C:
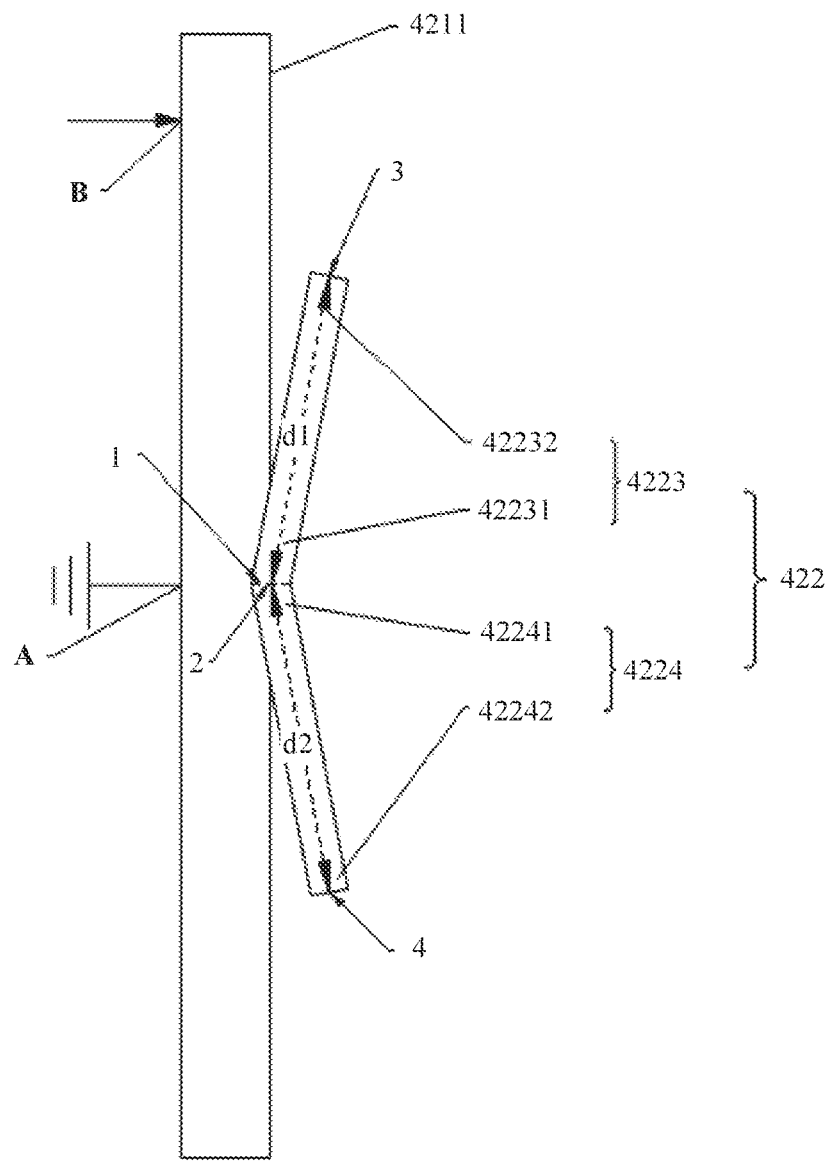
FIG. 25c is a schematic view of a structure of still another implementation of a radiator according to an embodiment of this application.

In an eleventh implementation, technical content mostly the same as that in the ninth implementation is not described again. FIG. 25c is a schematic view of a structure of still another implementation of the radiator 42 according to an embodiment of this application. The second radiator 422 includes a first bifurcation branch 4223 and a second bifurcation branch 4224. A head end 42231 of the first bifurcation branch 4223 and a head end 42241 of the second bifurcation branch 4224 are connected to each other. The first bifurcation branch 4223 extends in a direction away from the head end 42241 of the second bifurcation branch 4224. The second bifurcation branch 4224 extends in a direction away from the head end 42231 of the first bifurcation branch 4223.

In an implementation, both the first bifurcation branch 4223 and the second bifurcation branch 4224 are strip-shaped. In this case, the second radiator 422 is V-shaped, or is approximately V-shaped.

In addition, a projection of the second radiator 422 on the first radiator 421 is partly located in the first radiator 421. In another implementation, the projection of the second radiator 422 on the first radiator 421 is completely located in the first radiator 421.

In addition, a center distance between an end face 1 of the head end and an end face 3 of a tail end of the first bifurcation branch 4223 is a first value d1. A center distance between an end face 2 of the head end and an end face 4 of a tail end of the second bifurcation branch 4224 is a second value d2. A ratio of the first value d1 to the second value d2 is within a range of 0.5 to 2. In this implementation, the ratio of the first value d1 to the second value d2 is 1. In another implementation, the ratio of the first value d1 to the second value d2 may alternatively be 0.8, 1.22, 1.5, or 2.

Figure 26:
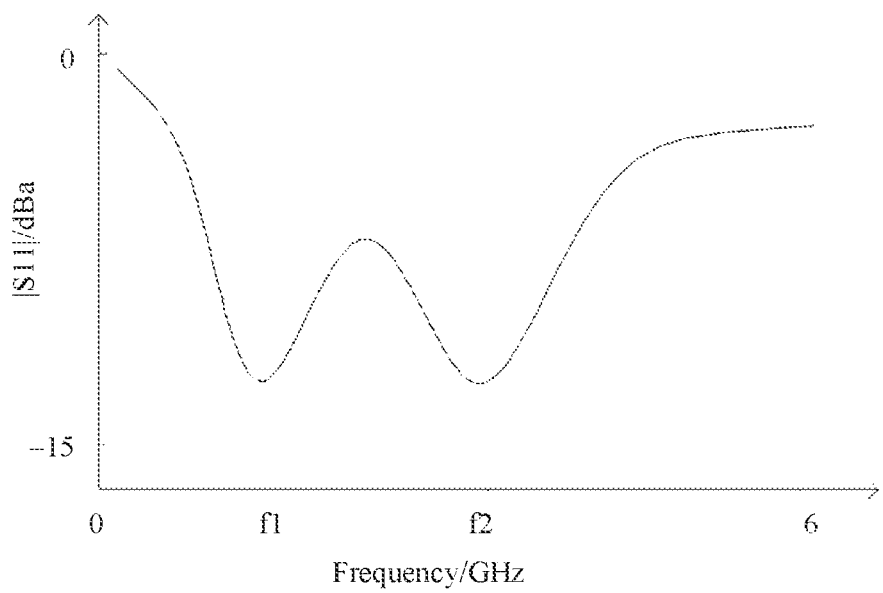
FIG. 26 is a graph of a relationship between a reflection coefficient and a frequency of the radiator shown in FIG. 25c in a frequency band of 0 to 6 GHz.

FIG. 26 is a graph of a relationship between a reflection coefficient and a frequency of the radiator 42 shown in FIG. 25c in the frequency band of 0 to 6 GHz. When the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 may generate two resonance frequencies from 0 to 6 GHz. FIG. 26 shows that the two resonance frequencies generated by the first radiator 421 and the second radiator 422 are f1 and f2 respectively.

It may be understood that a principle of forming the first resonance frequency f1 is the same as a principle of forming the first resonance frequency f1 in the first implementation. Details are not described herein. In addition, the second resonance frequency is mainly generated by the second radiator 422.

Specifically, when the radio frequency transceiver circuit 41 transmits radio frequency signals in the frequency band of 0 to 6 GHz, the radio frequency signals are transmitted to the first radiator 421 and the second radiator 422. In this case, at the frequency f2, the second radiator 422 may generate a current flowing from the head end 42231 to the end face 3 of the tail end of the first bifurcation branch 4223, and a current flowing from the head end 2 to the end face 4 of the tail end of the second bifurcation branch 4224. In addition, it can be determined based on current distribution on the second radiator 422 that a resonance mode generated by the second radiator 422 is a convection mode. In addition, the frequency f2 is a resonance frequency of the convection mode, that is, the second resonance frequency f2 shown in FIG. 26.

It may be understood that the two resonance frequencies f1 and f2 generated by the first radiator 421 and the second radiator 422 may be any value from 0 to 6 GHz. For example, f1 and f2 are 4 GHz and 5 GHz respectively.

In addition, when a length of the first bifurcation branch 4223, a length of the second bifurcation branch 4224, or the ratio of the first value d1 to the second value d2 is changed, the second resonance frequency f2 is also changed, that is, the second resonance frequency f2 is another value.

In this implementation, when the first radiator 421 and the second radiator 422 receive the radio frequency signals in the frequency band of 0 to 6 GHz, the first radiator 421 and the second radiator 422 can generate a convection mode in the frequency band. In this case, the operating frequency band of the antenna 40 may be around a resonance frequency of the convection mode, so that when the first radiator 421 and the second radiator 422 radiate signals, the signals radiated by the first radiator 421 and the second radiator 422 have little adverse impact on the user.

In addition, because the first radiator 421 and the second radiator 422 can generate more than one convection mode from 0 to 6 GHz, a resonance mode with a low specific absorption rate covers a relatively wide frequency band in the frequency band of 0 to 6 GHz. Therefore, the operating frequency band of the antenna is wider.

It may be understood that the structure of the first radiator 421 is not limited to the structure shown in FIG. 25c. The structure of the first radiator 421 may alternatively be the structure of the first radiator 421 in the fifth implementation. Details are not described herein again. In addition, in another implementation, the radiator 42 may alternatively include a third radiator 423. For a manner of disposing the third radiator 423, refer to the sixth implementation. Details are not described herein again. In addition, in another implementation, the first radiator 421 may also have a feeding point B, but does not have a grounding point A. In this case, for a manner of disposing the first radiator 421, refer to the seventh implementation. Details are not described herein again.

Figure 27A:
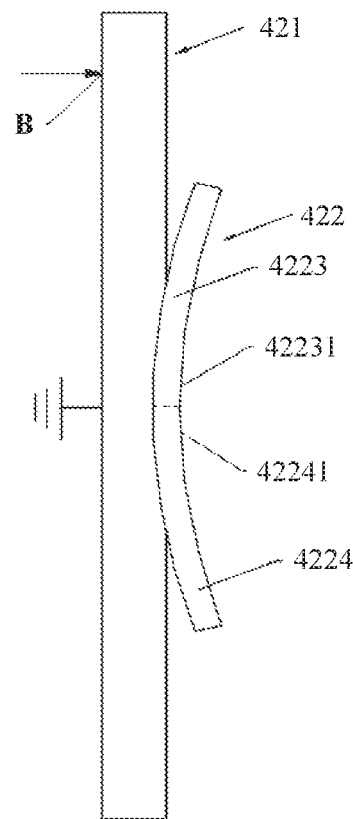
FIG. 27a is a schematic view of a structure of still another implementation of a radiator according to an embodiment of this application.

In another implementation, FIG. 27a is a schematic view of a structure of still another implementation of the radiator 42 according to an embodiment of this application. Both the first bifurcation branch 4223 and the second bifurcation branch 4224 are arc-shaped. In this case, when the head end 42231 of the first bifurcation branch 4223 and the head end 42241 of the second bifurcation branch 4224 are connected to each other, the second radiator 422 is also arc-shaped. It may be understood that when radio frequency signals at a frequency of 0 to 6 GHz are fed to the first radiator 421 and the second radiator 422, currents on the first radiator 421 and the second radiator 422 can also generate two convection modes. It may be understood that a principle of forming the first convection mode is the same as a principle of forming the first convection mode in the first implementation. A principle of forming the second convection mode is the same as a principle of forming the second convection mode in the eleventh implementation. Details are not described herein.

Figure 27B:
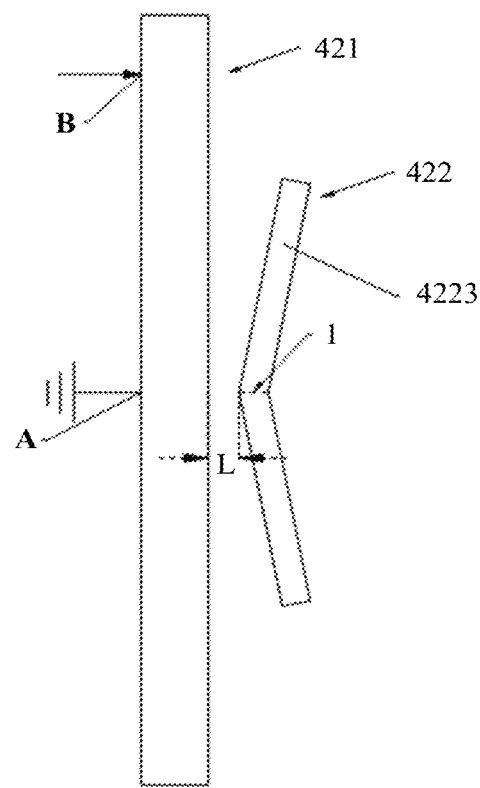
FIG. 27b is a schematic view of a structure of still another implementation of a radiator according to an embodiment of this application.

In another implementation, FIG. 27b is a schematic view of a structure of still another implementation of the radiator 42 according to an embodiment of this application. A shortest distance L between the first radiator 421 and the projection of the second radiator 422 on the first radiator 421 is within a range of 0 to 3 millimeters. The shortest distance L in this implementation is 1 millimeter. In another implementation, the shortest distance L may be 0 millimeters, 0.2 millimeter, 0.75 millimeter, or 1.3 millimeters. In this case, when radio frequency signals at a frequency of 0 to 6 GHz are fed to the first radiator 421 and the second radiator 422, currents on the first radiator 421 and the second radiator 422 can also generate two convection modes. It may be understood that a principle of forming the first convection mode is the same as a principle of forming the first convection mode in the first implementation. A principle of forming the second convection mode is the same as a principle of forming the second convection mode in the eleventh implementation. Details are not described herein.

In addition, when the shortest distance L is another value, the second resonance frequency f2 is also changed, that is, the second resonance frequency f2 may be another value.

Figure 28:
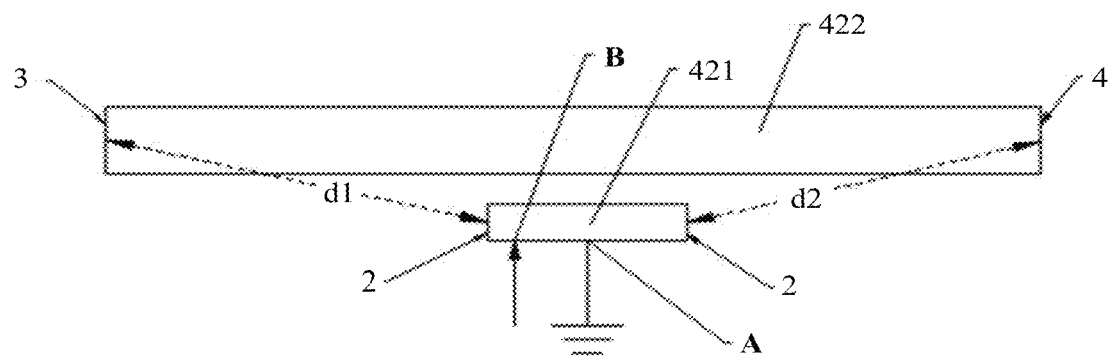
FIG. 28 is a schematic view of a structure of still another implementation of a radiator according to an embodiment of this application.
Figure 29:
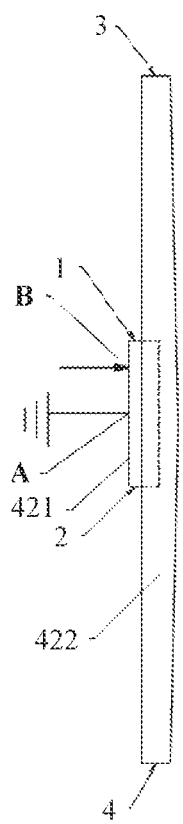
FIG. 29 is a schematic view of a structure of the radiator shown in FIG. 28 from another perspective.

In a twelfth implementation, technical content mostly the same as that in the first implementation is not described again. FIG. 28 is a schematic view of a structure of still another implementation of the radiator 42 according to an embodiment of this application. FIG. 29 is a schematic view of a structure of the radiator 42 shown in FIG. 28 from another perspective. The first radiator 421 is coupled to the second radiator 422, that is, a radio frequency signal may be coupled and fed to the second radiator 422 through the first radiator 421. The first radiator 421 includes a first end face 1 and a second end face 2 disposed away from the first end face 1. The second radiator 422 includes a third end face 3 and a fourth end face 4 disposed away from the third end face 3. The first end face 1 is located between the third end face 3 and the fourth end face 4. The second end face 2 is located between the first end face 1 and the fourth end face 4.

In addition, a projection of the second radiator 422 on the first radiator 421 is a first projection. The first projection partly overlaps the first radiator 421. In another implementation, the first projection completely overlaps the first radiator 421, that is, the first radiator 421 is located in the first projection.

In addition, a center distance between the first end face 1 and the third end face 3 is a first value d1. A center distance between the second end face 2 and the fourth end face 4 is a second value d2. A ratio of the first value d1 to the second value d2 is within a range of 0.5 to 2. In this implementation, the ratio of the first value d1 to the second value d2 is 1. In another implementation, the ratio of the first value d1 to the second value d2 may alternatively be 0.8, 1.22, 1.5, or 2.

Figure 30A:
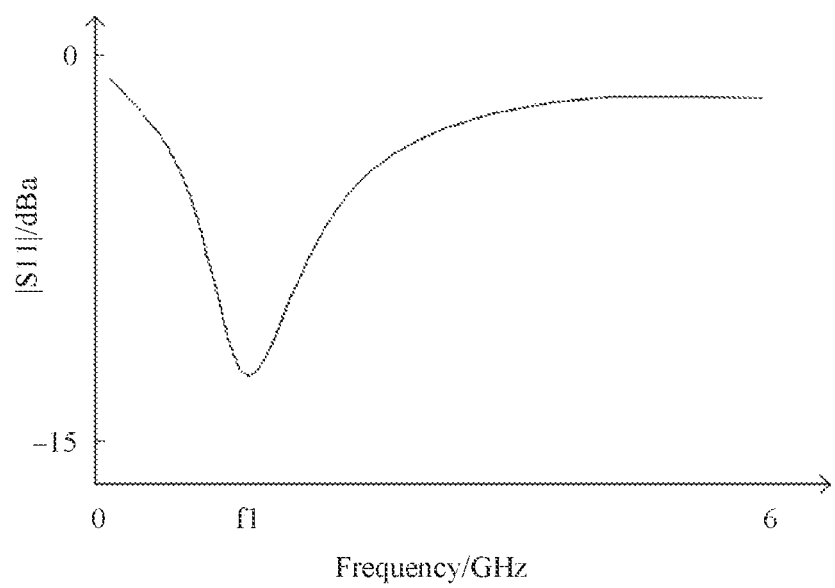
FIG. 30a is a graph of a relationship between a reflection coefficient and a frequency of the radiator shown in FIG. 28 in a frequency band of 0 to 6 GHz.

FIG. 30a is a graph of a relationship between a reflection coefficient and a frequency of the radiator 42 shown in FIG. 28 in the frequency band of 0 to 6 GHz. When the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 generate one resonance mode in the frequency band, that is, the first radiator 421 and the second radiator 422 may generate one resonance frequency in the frequency band. FIG. 30a shows that the resonance frequency generated by the first radiator 421 and the second radiator 422 is f1.

It may be understood that when the radio frequency transceiver circuit 41 transmits radio frequency signals in the frequency band of 0 to 6 GHz, the radio frequency signals are transmitted to the first radiator 421 and the second radiator 422. In this case, at the frequency f1, the second radiator 422 may generate a current flowing from the third end face 3 and the fourth end face 4 to a center of the second radiator 422. Therefore, it can be determined based on current distribution on the second radiator 422 that a resonance mode generated by the second radiator 422 at the frequency f1 is a convection mode. In addition, the frequency f1 is a resonance frequency of the convection mode, that is, the resonance frequency f1 shown in FIG. 30a.

In this implementation, when the first radiator 421 and the second radiator 422 receive the radio frequency signals in the frequency band of 0 to 6 GHz, the second radiator 422 can generate a convection mode in the frequency band. In this case, the operating frequency band of the antenna 40 may be a resonance frequency of the convection mode, so that when the second radiator 422 radiates signals, the signals radiated by the first radiator 421 and the second radiator 422 have little adverse impact on the user.

It may be understood that the resonance frequency f1 may be any value from 0 to 6 GHz. For example, f1 is 5 GHz. In addition, when the ratio of the first value d1 to the second value d2 is another value, the resonance frequency f1 is also changed.

In another implementation, the radiator 42 may alternatively include a third radiator 423. For a manner of disposing the third radiator 423, refer to the sixth implementation. Details are not described herein again. In addition, in another implementation, the first radiator 421 may also have a feeding point B, but does not have a grounding point A. In this case, for a manner of disposing the first radiator 421, refer to the seventh implementation. Details are not described herein again.

Figure 30B:
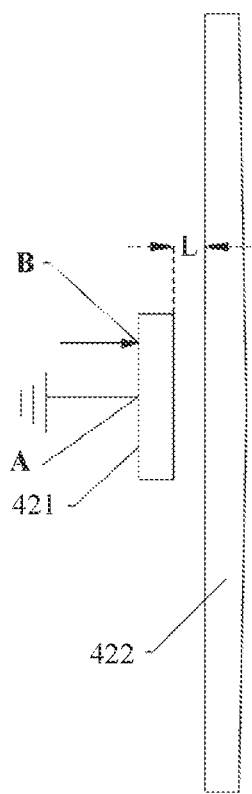
FIG. 30b is a schematic view of a structure of still another implementation of a radiator according to an embodiment of this application.

In another implementation, FIG. 30b is a schematic view of a structure of still another implementation of the radiator 42 according to an embodiment of this application. A shortest distance between the first feeding branch 4211 and the projection of the second radiator 422 on the first radiator 421 is within a range of 0 to 3 millimeters. The shortest distance L in this implementation is 1 millimeter. In another implementation, the shortest distance L may be 0 millimeters, 0.2 millimeter, 0.75 millimeter, or 1.3 millimeters. In this case, when radio frequency signals at a frequency of 0 to 6 GHz are fed to the first radiator 421 and the second radiator 422, currents on the first radiator 421 and the second radiator 422 can also generate one convection mode. It may be understood that a principle of forming the convection mode is the same as a principle of forming the convection mode in the twelfth implementation. Details are not described herein.

In this implementation, the resonance frequency f1 generated by the first radiator 421 and the second radiator 422 may be any value from 0 to 6 GHz. For example, f1 may be 4 GHz. In addition, a specific value of the resonance frequency f1 is related to the shortest distance L and a length of the second radiator 422.

Figure 31:
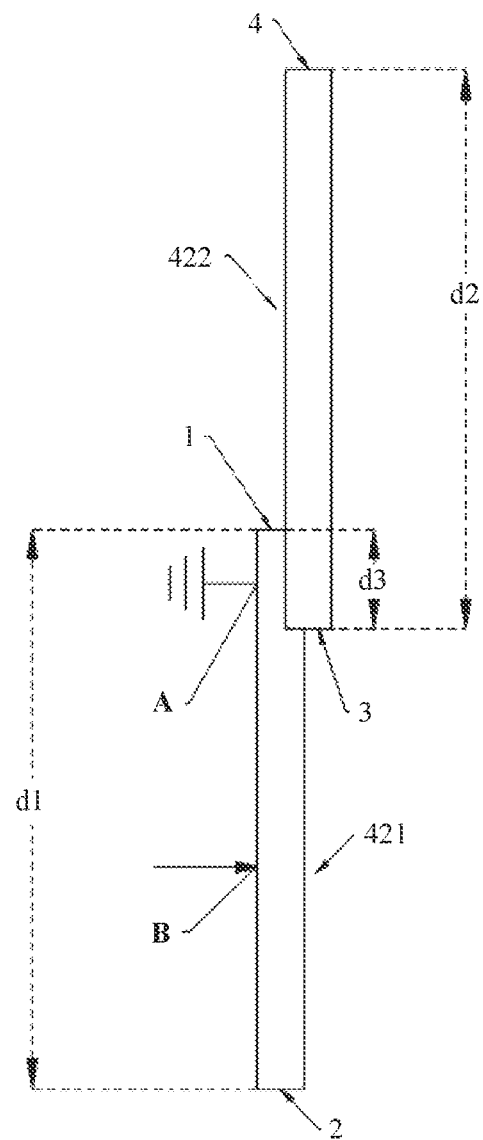
FIG. 31 is a schematic view of a structure of still another implementation of a radiator according to an embodiment of this application.

In a thirteenth implementation, technical content mostly the same as that in the first implementation is not described again. FIG. 31 is a schematic view of a structure of still another implementation of the radiator 42 according to an embodiment of this application. The first radiator 421 includes a first end face 1 and a second end face 2 disposed away from the first end face 1. The second radiator 422 includes a third end face 3 and a fourth end face 4 disposed away from the third end face 3. The third end face 3 is located between the first end face 1 and the second end face 2. The fourth end face 4 is located on one side of the first end face 1 away from the third end face 3.

A projection of the second radiator 422 on the first radiator 421 partly overlaps the first radiator 421.

A center distance between the first end face 1 and the second end face 2 is a first value d1. A center distance between the third end face 3 and the fourth end face 4 is a second value d2. A ratio of the first value d1 to the second value d2 is within a range of 0.5 to 2. In other words, the radiator 42 has a quasi-symmetrical or symmetrical structure. In this implementation, the ratio of the first value d1 to the second value d2 is 1. In another implementation, the ratio of the first value d1 to the second value d2 may alternatively be 0.8, 1.22, 1.5, or 2.

Figure 32:
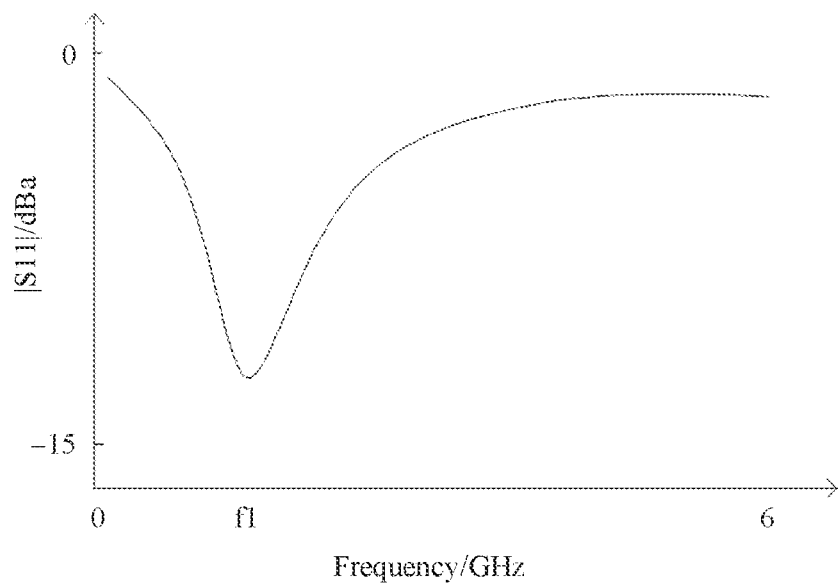
FIG. 32 is a graph of a relationship between a reflection coefficient and a frequency of the radiator shown in FIG. 31 in a frequency band of 0 to 6 GHz.
Figure 33A:
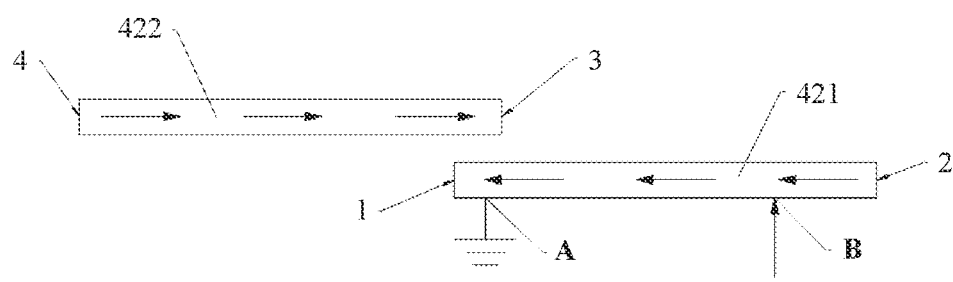
FIG. 33a is a schematic view of a current flow direction of the radiator shown in FIG. 31 at a frequency f1.

FIG. 32 is a graph of a relationship between a reflection coefficient and a frequency of the radiator 42 shown in FIG. 31 in the frequency band of 0 to 6 GHz. FIG. 33a is a schematic view of a current flow direction of the radiator 42 shown in FIG. 31 at a frequency f1. When the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 generate one resonance mode in the frequency band, that is, the first radiator 421 and the second radiator 422 may generate one resonance frequency in the frequency band. FIG. 32 shows that the resonance frequency generated by the first radiator 421 and the second radiator 422 is f1.

It may be understood that when the radio frequency transceiver circuit 41 transmits radio frequency signals in the frequency band of 0 to 6 GHz, the radio frequency signals are transmitted to the first radiator 421 and the second radiator 422. In this case, at the frequency f1, the first radiator 421 may generate a current flowing in a direction from the second end face 2 to the first end face 1, and the second radiator 422 may generate a current flowing in a direction from the fourth end face 4 to the third end face 3. Therefore, it can be determined based on current distribution on the first radiator 421 and the second radiator 422 that a resonance mode generated by the first radiator 421 and the second radiator 422 at the frequency f1 is a convection mode. In addition, the frequency f1 is a resonance frequency of the convection mode, that is, the resonance frequency f1 shown in FIG. 32.

In this implementation, when the first radiator 421 and the second radiator 422 receive the radio frequency signals in the frequency band of 0 to 6 GHz, the second radiator 422 can generate a convection mode in the frequency band. In this case, the operating frequency band of the antenna 40 may be a resonance frequency of the convection mode, so that when the second radiator 422 radiates signals, the signals radiated by the first radiator 421 and the second radiator 422 have little adverse impact on the user.

It may be understood that the resonance frequency f1 may be any value from 0 to 6 GHz. For example, f1 is 5 GHz. In addition, when the ratio of the first value d1 to the second value d2 is another value, the resonance frequency f1 is also changed.

In another implementation, the radiator 42 may alternatively include a third radiator 423. For a manner of disposing the third radiator 423, refer to the sixth implementation. Details are not described herein again. In addition, in another implementation, the first radiator 421 may also have a feeding point B, but does not have a grounding point A. In this case, for a manner of disposing the first radiator 421, refer to the seventh implementation. Details are not described herein again.

Figure 33B:
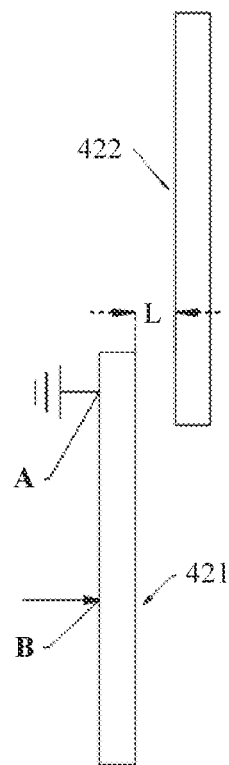
FIG. 33b is a schematic view of a structure of still another implementation of a radiator according to an embodiment of this application.

In another implementation. FIG. 33b is a schematic view of a structure of still another implementation of the radiator 42 according to an embodiment of this application. A shortest distance between the first radiator 421 and the projection of the second radiator 422 on the first radiator 421 is within a range of 0 to 3 millimeters. The shortest distance L in this implementation is 1 millimeter. In another implementation, the shortest distance L may be 0 millimeters, 0.2 millimeter, 0.75 millimeter, or 1.3 millimeters. In this case, when radio frequency signals at a frequency of 0 to 6 GHz are fed to the first radiator 421 and the second radiator 422, currents on the first radiator 421 and the second radiator 422 can also generate one convection mode. It may be understood that a principle of forming the convection mode is the same as a principle of forming the convection mode in the thirteenth implementation. Details are not described herein.

In addition, when the shortest distance L is another value, the resonance frequency is also changed, that is, the resonance frequency may be another value. For example, when the shortest distance L is 1.2 millimeters, the resonance frequency is 4.4 GHz.

The first embodiment is described in detail above. The first radiator 421 of the radiator 42 is formed on the surface of the support 50 facing the rear cover 11, that is, the first surface 55. The second radiator 422 is formed on the surface of the rear cover 11 facing the accommodating space 13, that is, the second surface 115. In this case, signals are radiated outside of the electronic device 100 through the first radiator 421 and the second radiator 422. Several other embodiments, that is, several manners of disposing the first radiator 421 and the second radiator 422, are hereinafter described in detail with reference to related drawings.

Figure 34:
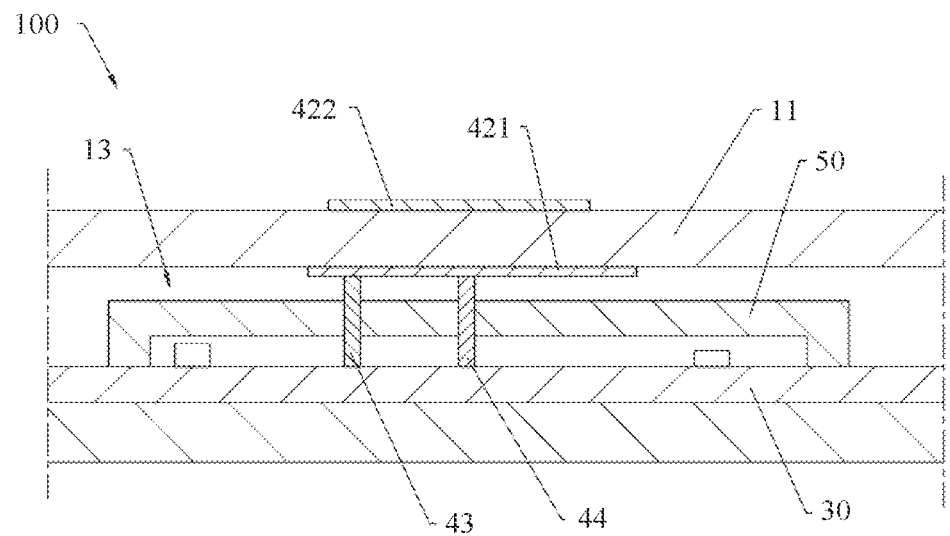
FIG. 34 is a schematic cross-sectional view of still another implementation of the electronic device shown in FIG. 1 at a line M-M.

In a second embodiment, technical content the same as that in the first embodiment is not described again. FIG. 34 is a schematic cross-sectional view of still another implementation of the electronic device 100 shown in FIG. 1 at the line M-M. The rear cover 11 is made of an insulating material. The first radiator 421 is fixed to the surface of the rear cover 11 facing the accommodating space 13. In an implementation, by using LDS, the first radiator 421 is formed on the surface of the rear cover 11 facing the accommodating space 13. Certainly, in another implementation, a flexible circuit board may also be pasted on the surface of the rear cover 11 facing the accommodating space 13, so that the first radiator 421 is formed on the flexible circuit board. In addition, FIG. 34 shows the support 50. In another implementation, alternatively, the electronic device 100 may not be provided with the support 50.

In an implementation, the antenna 40 further includes a first spring 43 and a second spring 44. The first spring 43 is fixed to the circuit board 30. The first spring 43 is configured to feed a radio frequency signal transmitted by the radio frequency transceiver circuit 41 into the first radiator 421. The second spring 44 is configured to ground the first radiator 421. In another implementation, a radio frequency signal transmitted by the radio frequency transceiver circuit 41 may alternatively be fed into the first radiator 421 by using a connector. In addition, the second spring 44 may alternatively be grounded by using the connector. In addition, in another implementation, the first radiator 421 may alternatively not be grounded by using the second spring 44, that is, the first radiator 421 is not grounded.

In addition, the second radiator 422 is fixed to the surface of the rear cover 11 away from the accommodating space 13, that is, the second radiator 422 is formed on the outer surface of the rear cover 11. In an implementation, the second radiator 422 is formed on the surface of the rear cover 11 away from the accommodating space 13 by using LDS. Certainly, in another implementation, a flexible circuit board may also be pasted on the surface of the rear cover 11 away from the accommodating space 13, so that the second radiator 422 is formed on the flexible circuit board.

In this case, the first radiator 421 is fixed to the surface of the rear cover 11 facing the accommodating space 13, and the second radiator 422 is fixed to the surface of the rear cover 11 away from the accommodating space 13, so that the second radiator 422 and the first radiator 421 are spaced apart. Further, when the radio frequency transceiver circuit 41 transmits a radio frequency signal, the radio frequency signal is fed to the second radiator 422 through the first radiator 421. In this case, each of the first radiator 421 and the second radiator 422 radiates a signal outside of the electronic device 100 based on the radio frequency signal.

Figure 35:
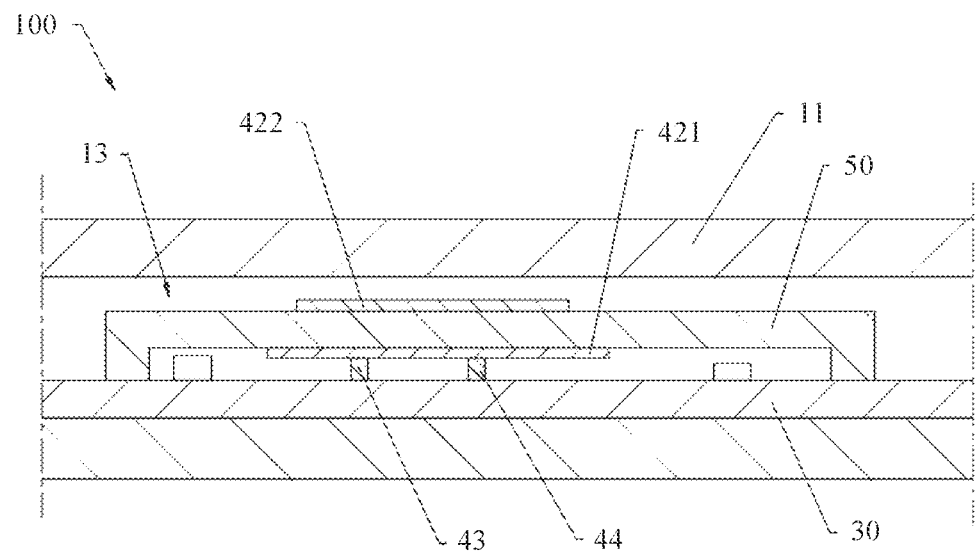
FIG. 35 is a schematic cross-sectional view of still another implementation of the electronic device shown in FIG. 1 at a line M-M.

In a third embodiment, technical content the same as that in the first embodiment is not described again. FIG. 35 is a schematic cross-sectional view of still another implementation of the electronic device shown in FIG. 1 at the line M-M. The support 50 is made of an insulating material. The first radiator 421 is formed on a surface of the support 50 facing the circuit board 30. In an implementation, by using LDS, the first radiator 421 is formed on the surface of the support 50 facing the circuit board 30. Certainly, in another implementation, the flexible circuit board may also be bonded to the surface of the support 50 facing the circuit board 30, to form the first radiator 421 on the flexible circuit board.

In an implementation, the antenna further includes a first spring 43 and a second spring 44. The first spring 43 is fixed to the circuit board 30. The first spring 43 is configured to feed a radio frequency signal transmitted by the radio frequency transceiver circuit 41 into the first radiator 421. The second spring 44 is configured to ground the first radiator 421. In another implementation, a radio frequency signal transmitted by the radio frequency transceiver circuit 41 may alternatively be fed into the first radiator 421 by using a connector. In addition, the second spring 44 may alternatively be grounded by using the connector. In addition, in another implementation, the first radiator 421 may alternatively not be grounded by using the second spring 44, that is, the first radiator 421 is not grounded.

In addition, the second radiator 422 is formed on the surface of the support 50 facing the rear cover 11. In an implementation, by using LDS, the second radiator 422 is formed on the surface of the support 50 facing the rear cover 11. Certainly, in another implementation, the flexible circuit board may also be bonded to the surface of the support 50 facing the rear cover 11, so that the second radiator 422 is formed on the flexible circuit board.

In this case, the first radiator 421 is formed on the surface of the support 50 facing the circuit board 30, and the second radiator 422 is formed on the surface of the support 50 facing the rear cover 11, so that the second radiator 422 and the first radiator 421 are spaced apart. Further, when the radio frequency transceiver circuit 41 transmits a radio frequency signal, the radio frequency signal is fed to the second radiator 422 through the first radiator 421. In this case, each of the first radiator 421 and the second radiator 422 radiates a signal outside of the electronic device 100 based on the radio frequency signal.

In another embodiment, alternatively, the second radiator 422 may be formed on the surface of the rear cover 11 facing the accommodating space 13, or the second radiator 422 may be formed on the surface of the rear cover 11 away from the accommodating space 13.

Figure 36:
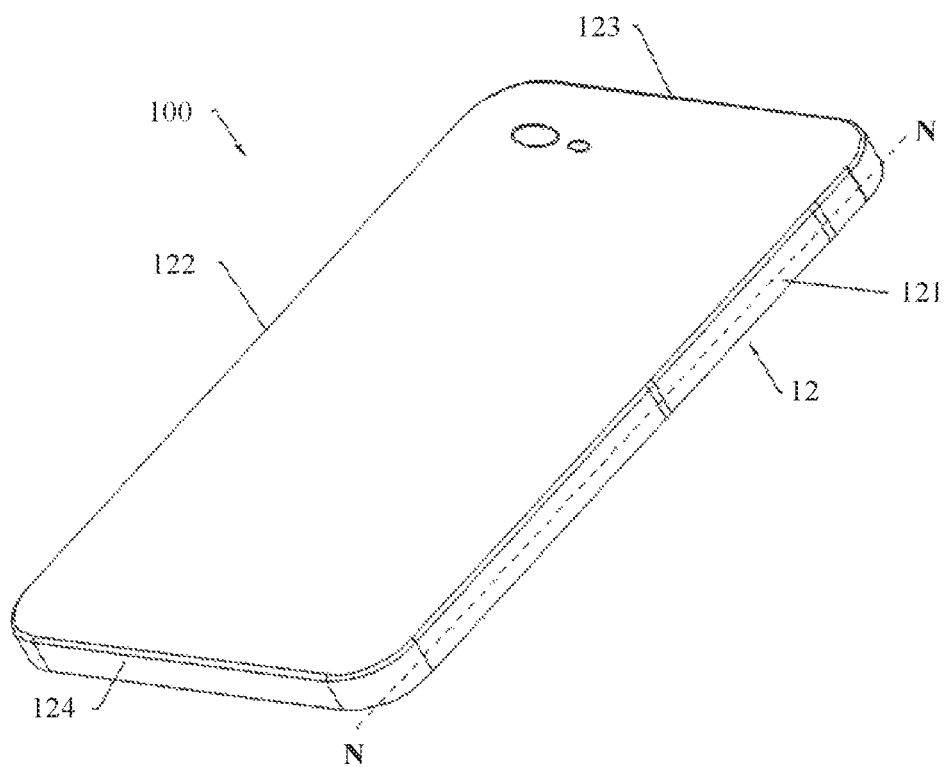
FIG. 36 is a schematic view of a structure of another implementation of an electronic device according to an embodiment of this application.
Figure 37:
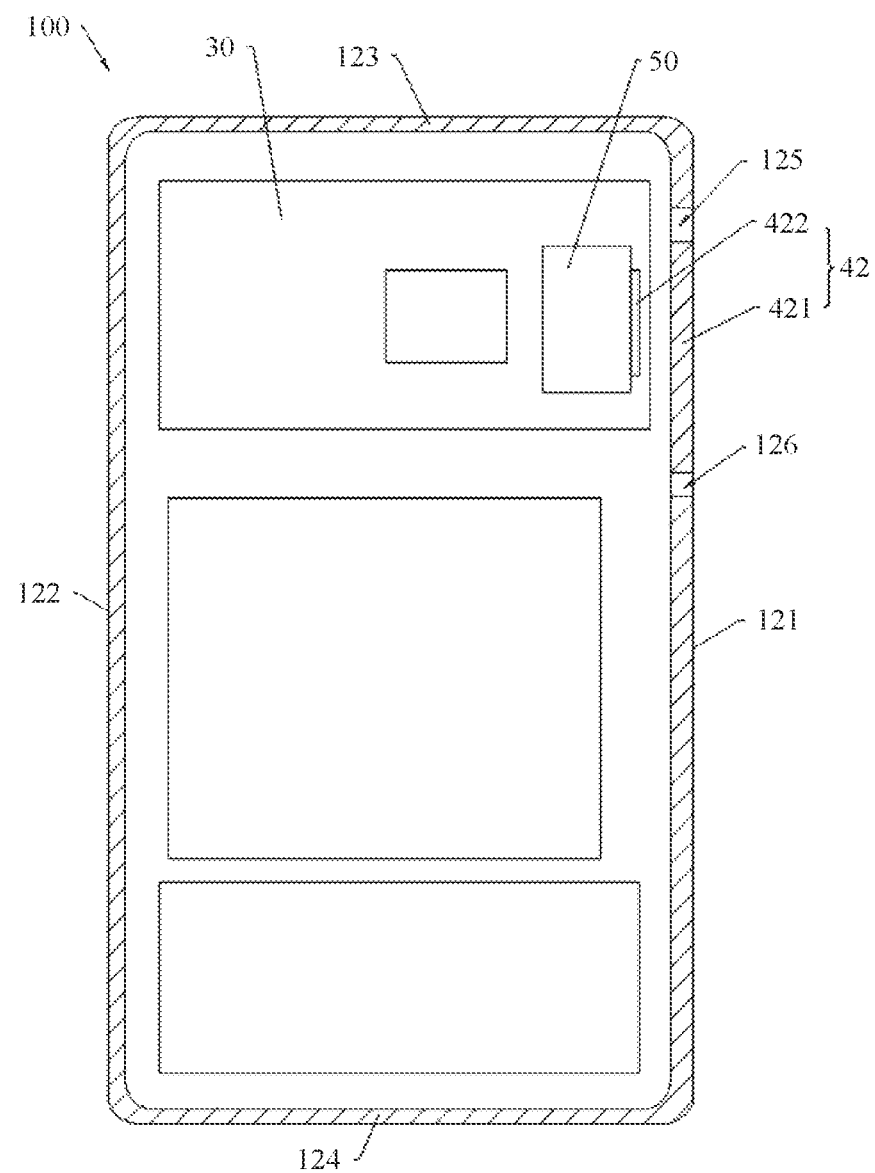
FIG. 37 is a schematic cross-sectional view of the electronic device shown in FIG. 36 at a line N-N.

In a fourth embodiment, technical content the same as that in the first embodiment is not described again. FIG. 36 is a schematic view of a structure of another implementation of the electronic device 100 according to an embodiment of this application. FIG. 37 is a schematic cross-sectional view of the electronic device 100 shown in FIG. 36 at a line N-N. The bezel 12 may be made of a metallic material. The bezel 12 includes a first long bezel 121 and a second long bezel 122 that are disposed opposite to each other, and a first short bezel 123 and a second short bezel 124 that are disposed opposite to each other. The first short bezel 123 and the second short bezel 124 are connected between the first long bezel 121 and the second long bezel 122. In an implementation, a first antenna slot 125 and a second antenna slot 126 are separately disposed on the first long bezel 121 of the bezel 12. In this case, the first antenna slot 125 and the second antenna slot 126 isolate a metallic part from the first long bezel 121. The metallic part forms the first radiator 421 of the radiator 42.

In addition, the rear cover 11 may be made of an insulating material. The second radiator 422 is formed on a surface of the support 50 facing the first long bezel 121. In an implementation, by using LDS, the second radiator 422 is formed on the surface of the support 50 facing the first long bezel 121. Certainly, in another implementation, the flexible circuit board may also be bonded to the surface of the support 50 facing the first long bezel 121, so that the second radiator 422 is formed on the flexible circuit board.

In this case, the first radiator 421 is formed on the first long bezel 121, and the second radiator 422 is formed on the surface of the support 50 facing the first long bezel 121, so that the second radiator 422 and the first radiator 421 are spaced apart. Further, when the radio frequency transceiver circuit 41 transmits a radio frequency signal, the radio frequency signal is fed to the second radiator 422 through the first radiator 421. In this case, each of the first radiator 421 and the second radiator 422 radiates a signal outside of the electronic device 100 based on the radio frequency signal.

In another implementation, an insulating material is disposed in the first antenna slot 125 and the second antenna slot 126. On one hand, the insulating material can connect the isolated metallic part to a metallic part that is not isolated from the first long bezel 121, thereby ensuring integrity of the first long bezel 121, and further preventing an appearance of the electronic device 100 from being affected by a dent on an exterior surface of the electronic device 100. On the other hand, it can be ensured that the isolated metallic part is insulated from the non-isolated metallic part.

In another implementation, the first radiator 421 may alternatively be implemented in the following manner. Specifically, a metallic part is isolated from the first short bezel 123, the second short bezel 124, or the second long bezel 122 of the bezel 12 in a same manner as the foregoing implementation, to form the first radiator 421 of the radiator 42.

Figure 38:
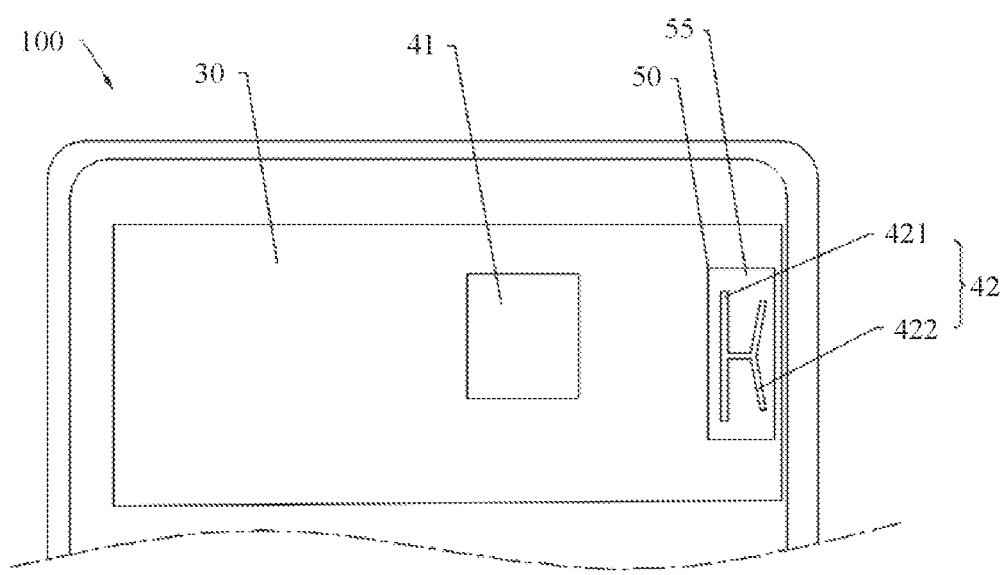
FIG. 38 is a schematic view of a partial structure of still another implementation of an electronic device according to an embodiment of this application.
Figure 39:
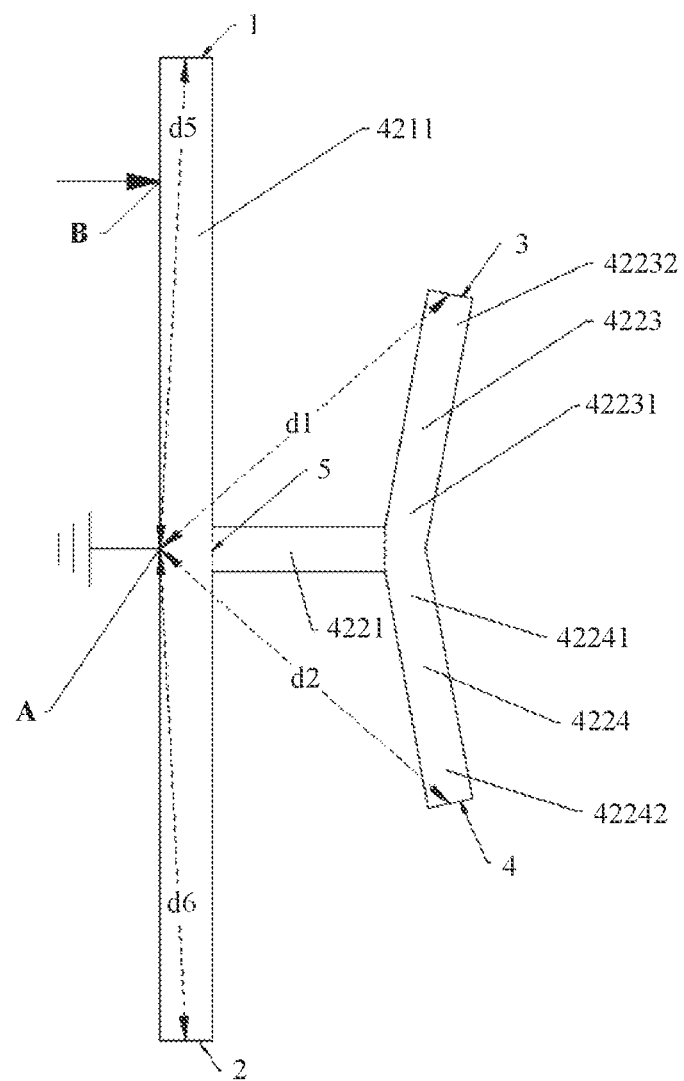
FIG. 39 is a schematic view of a structure of a radiator shown in FIG. 38.

In a fifth embodiment, technical content the same as that in the first implementation of the first embodiment is not described again. FIG. 38 is a schematic view of a partial structure of still another implementation of the electronic device 100 according to an embodiment of this application. FIG. 39 is a schematic view of a structure of the radiator 42 shown in FIG. 38. The first radiator 421 and the second radiator 422 are disposed at a same layer, and the first radiator 421 is connected to the second radiator 422.

In an implementation, when the support 50 has a frame structure, the support 50 covers the circuit board 30, and a space S is enclosed by the support 50 and the circuit board 30. For specific structures of the support 50 and the circuit board 30, refer to FIG. 3a in the first implementation. The first radiator 421 and the second radiator 422 are formed on the first surface 55 of the support 50. In addition, the first radiator 421 and the second radiator 422 may be formed on a surface of the support 50 facing the space S. In another embodiment, alternatively, the first radiator 421 and the second radiator 422 may be formed on the surface of the rear cover 11 facing the accommodating space 13, or the first radiator 421 and the second radiator 422 may be formed on the surface of the rear cover 11 away from the accommodating space 13.

In addition, the first radiator 421 includes a first feeding branch 4211. The first feeding branch 4211 is strip-shaped.

In addition, a distance between a center of the first end face 1 and the grounding point A is a fifth value d5. A distance between a center of the second end face 2 and the grounding point A is a sixth value d6. A ratio of the fifth value d5 to the sixth value d6 is within a range of 0.3 to 3. In other words, the first feeding branch 4211 has a quasi-symmetrical or symmetrical structure.

The second radiator 422 includes a first branch 4221, a first bifurcation branch 4223, and a second bifurcation branch 4224. Ahead end 42231 of the first bifurcation branch 4223 and a head end 42241 of the second bifurcation branch 4224 are connected to the first branch 4221. A tail end 42232 of the first bifurcation branch 4223 and a tail end 42242 of the second bifurcation branch 4224 are located on two sides of the first branch 4221. In this case, the second radiator 422 is Y-shaped, or is approximately T-shaped.

It may be understood that the two sides of the first branch 4221 may be understood as two sides of the first branch 4221 itself, or may be understood as two sides in an extension direction of the first branch 4221.

Figure 40:
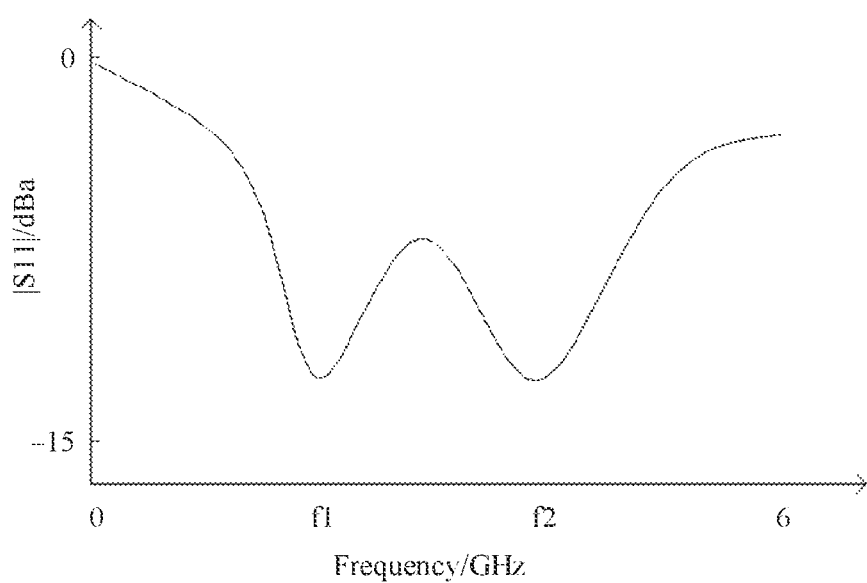
FIG. 40 is a graph of a relationship between a reflection coefficient and a frequency of the radiator shown in FIG. 39 in a frequency band of 0 to 6 GHz.

A center distance between an end face 3 of the tail end of the first bifurcation branch 4223 and the grounding point A is a first value d1, and a center distance between an end face 4 of the tail end of the second bifurcation branch 4224 and the grounding point A is a second value d2. A ratio of the first value d1 to the second value d2 is within a range of 0.3 to 3. In other words, the second radiator 422 has a quasi-symmetrical or symmetrical structure. FIG. 40 is a graph of a relationship between a reflection coefficient and a frequency of the radiator 42 shown in FIG. 39 in the frequency band of 0 to 6 GHz. When the radio frequency transceiver circuit 41 transmits radio frequency signals in the frequency band of 0 to 6 GHz, the radio frequency signals are transmitted to the first radiator 421 and the second radiator 422. The first radiator 421 and the second radiator 422 may generate two resonance frequencies from 0 to 6 GHz. FIG. 40 shows that the two resonance frequencies generated by the first radiator 421 and the second radiator 422 are f1 and f2 respectively.

Figure 41:
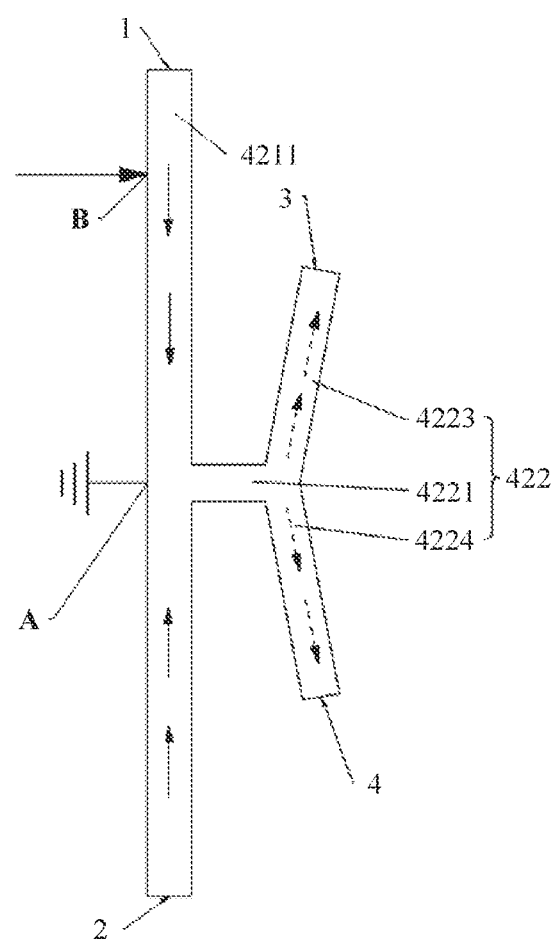
FIG. 41 is a schematic view of a current flow direction of the radiator shown in FIG. 39 at a frequency f1.
Figure 42:
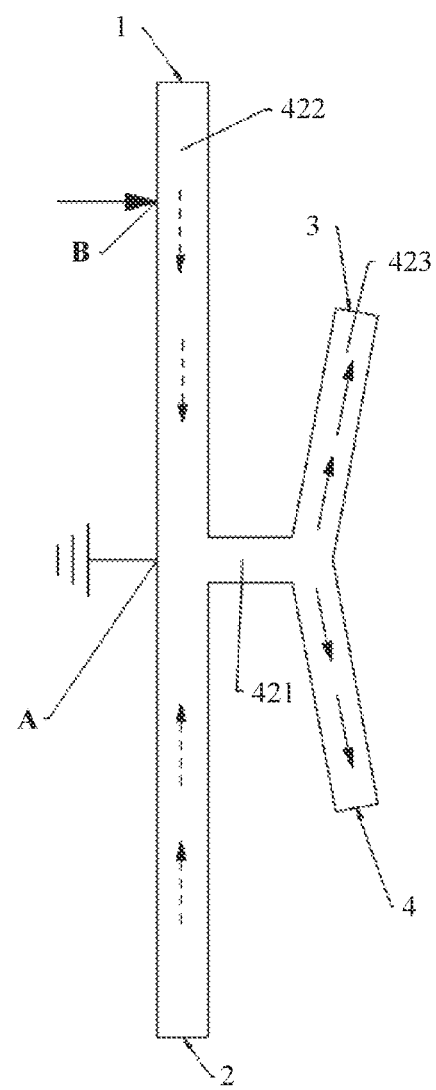
FIG. 42 is a schematic view of a current flow direction of the radiator shown in FIG. 39 at a frequency f2.

With reference to FIG. 41 and FIG. 42, the following describes in detail the resonance frequencies f1 and 12 both being resonance frequencies of convection modes. FIG. 41 is a schematic view of a current flow direction of the radiator shown in FIG. 39 at the frequency f1. FIG. 42 is a schematic view of a current flow direction of the radiator shown in FIG. 39 at the frequency f2.

Referring to FIG. 41, when the radio frequency transceiver circuit 41 transmits radio frequency signals in the frequency band of 0 to 6 GHz, the radio frequency signals are transmitted to the first feeding branch 4211 and the second radiator 422. In this case, at the frequency f1, the first feeding branch 4211 may generate a first current simultaneously flowing in directions from the first end face 1 and the second end face 2 to the grounding point A.

In addition, because the second radiator 422 is connected to the first feeding branch 4211, the radio frequency signals can be coupled and fed to the second radiator 422 through the first feeding branch 4211. In this case, the second radiator 422 has a second current flowing in directions to the end face 3 of the tail end of the first bifurcation branch 4223 and the end face 4 of the tail end of the second bifurcation branch 4224.

Therefore, it can be determined based on current distribution on the first feeding branch 4211 and the second radiator 422 that a resonance mode generated by the first feeding branch 4211 and the second radiator 422 at the frequency f1 is a convection mode. In addition, the frequency f1 is a resonance frequency of the convection mode, that is, the first resonance frequency f1 shown in FIG. 40.

In addition, by measuring intensity of the first current and the second current, it can be learned that the intensity of the first current is greater than the intensity of the second current, that is, the intensity of the current on the first feeding branch 4211 is greater than the intensity of the current on the second radiator 422. Therefore, the resonance frequency f1 is mainly a resonance frequency generated by the first feeding branch 4211.

Referring to FIG. 42, when the radio frequency transceiver circuit 41 transmits radio frequency signals in the frequency band of 0 to 6 GHz, the radio frequency signals are transmitted to the first feeding branch 4211 and the second radiator 422. In this case, at the frequency f2, the first feeding branch 4211 may generate a first current simultaneously flowing in directions from the first end face 1 and the second end face 2 to the grounding point A.

In addition, because the second radiator 422 is connected to the first feeding branch 4211, when the radio frequency signals are coupled and fed to the second radiator 422 through the first feeding branch 4211, the second radiator 422 has a second current flowing in directions to the end face 3 of the tail end of the first bifurcation branch 4223 and the end face 4 of the tail end of the second bifurcation branch 4224.

Therefore, it can be determined based on current distribution on the first feeding branch 4211 and the second radiator 422 that a resonance mode generated by the first feeding branch 4211 and the second radiator 422 at the frequency f2 is a convection mode. In addition, the frequency f2 is a resonance frequency of the convection mode, that is, the second resonance frequency f1 shown in FIG. 40.

In addition, by measuring intensity of the first current and the second current, it can be learned that the intensity of the first current is less than the intensity of the second current, that is, the intensity of the current on the first feeding branch 4211 is less than the intensity of the current on the second radiator 422. Therefore, the resonance frequency f2 is mainly a resonance frequency generated by the second radiator 422.

In this implementation, when the first radiator 421 and the second radiator 422 receive the radio frequency signals in the frequency band of 0 to 6 GHz, the first radiator 421 and the second radiator 422 can generate resonance frequencies of two convection modes in the frequency band. The operating frequency band of the antenna 40 is set near the resonance frequency of the convection mode. In this way, when the first radiator 421 and the second radiator 422 radiate signals, the signals have little adverse impact on the user.

In addition, because the first radiator 421 and the second radiator 422 can generate more than one convection mode from 0 to 6 GHz, a resonance mode with a low specific absorption rate covers a relatively wide frequency band in the frequency band of 0 to 6 GHz. In other words, there are more convection modes, and the operating frequency band set near the resonance frequency is also wider.

It can be learned based on the foregoing description and with reference to FIG. 41 and FIG. 42 that the two resonance frequencies shown in FIG. 40 are both resonance frequencies of convection modes. In other words, the first radiator 421 and the second radiator 422 in this implementation can generate two convection modes.

In this implementation, the two resonance frequencies f1 and f2 generated by the first radiator 421 and the second radiator 422 may be any value. For example, f1 may be 4 GHz, and f2 may be 4.6 GHz. It may be understood that values of the two resonance frequencies f1 and f2 are related to a factor such as a length of the first feeding branch 4211, a length of the second radiator 422, a position of the feeding point B. or an external environment in which the first radiator 421 and the second radiator 422 are located (for example, fixed positions of the first radiator 421 and the second radiator 422). In other words, by changing the factor such as the length of the first feeding branch 4211, the length of the second radiator 422, the position of the feeding point B. or the external environment in which the first radiator 421 and the second radiator 422 are located, the values of f1 and f2 can be effectively changed.

For example, under a same condition, when the length of the first feeding branch 4211 is changed from 30 millimeters to 28 millimeters, the first resonance frequency f1 may be changed from 4 GHz to 4.1 GHz.

Figure 43:
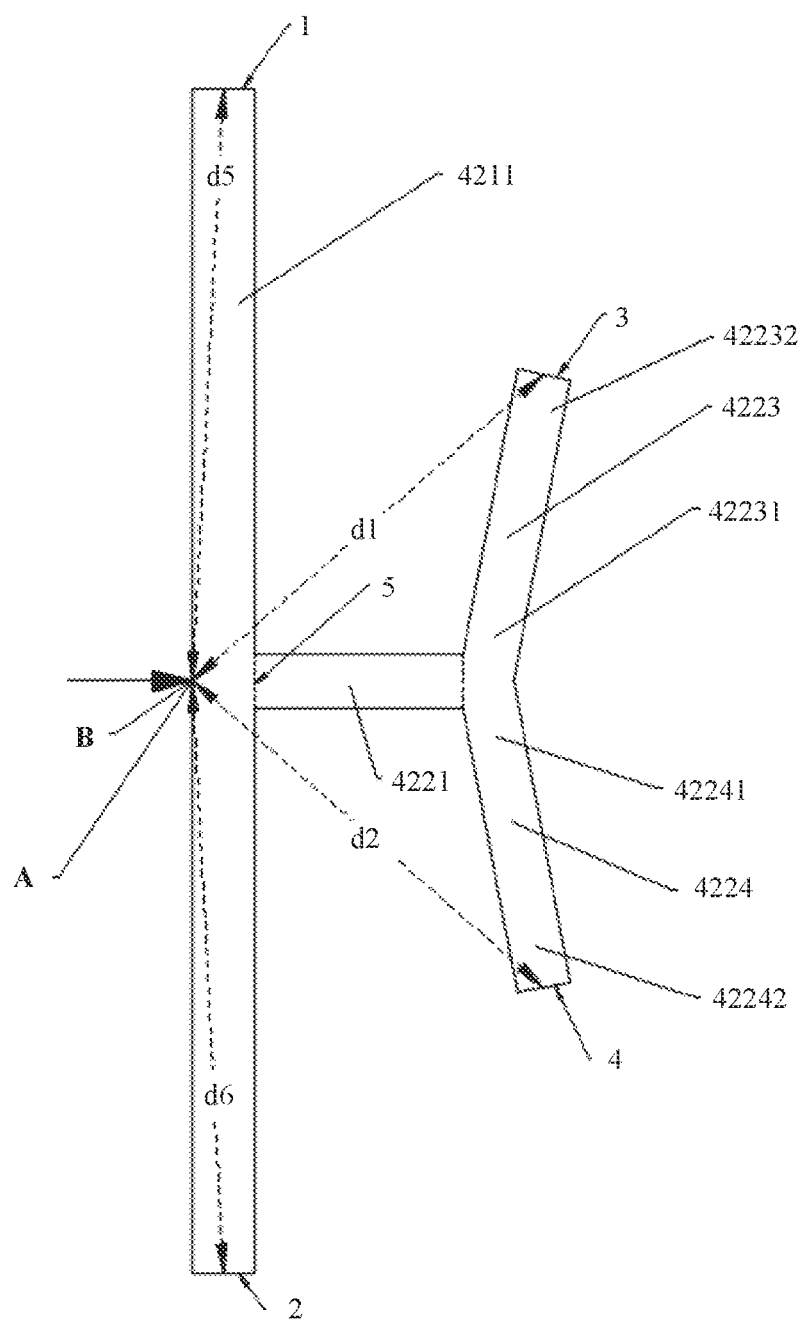
FIG. 43 is a schematic view of a structure of still another implementation of a radiator according to an embodiment of this application.

In a sixth embodiment, technical content the same as that in the first implementation of the fifth embodiment is not described again. FIG. 43 is a schematic view of a structure of still another implementation of the radiator 42 according to an embodiment of this application. The first radiator 421 has a feeding point B, but does not have a grounding point A.

Definitions of a fifth value d5 and a sixth value d6 in this implementation are different from definitions of the fifth value d5 and the sixth value d6 in the fifth embodiment. Specifically, a distance between a center of the first end face 1 and the feeding point B is a fifth value d5. A distance between a center of the second end face 2 and the feeding point B is a sixth value d6. A ratio of the fifth value d5 to the sixth value d6 is within a range of 0.3 to 3. In other words, the first feeding branch 4211 has a quasi-symmetrical or symmetrical structure. In this implementation, the ratio of the fifth value d5 to the sixth value d6 is 1. In another implementation, the ratio of the fifth value d5 to the sixth value d6 may alternatively be 0.3, 0.8, 1.2, 2.3, or 2.9.

In addition, a center distance between an end face 3 of a tail end of the first bifurcation branch 4223 and the feeding point B is a first value d1. A center distance between an end face 4 of a tail end of the second bifurcation branch 4224 and the feeding point B is a second value d2. A ratio of the first value d1 to the second value d2 is within a range of 0.3 to 3. In other words, the second radiator 422 has a quasi-symmetrical or symmetrical structure.

It may be understood that when radio frequency signals at a frequency of 0 to 6 GHz are fed to the first feeding branch 4211 and the second radiator 422, the first feeding branch 4211 and the second radiator 422 generate two resonance modes in the frequency band, that is, the first feeding branch 4211 and the second radiator 422 may generate two resonance frequencies in the frequency band, and the two resonance frequencies are f1 and f2 respectively.

In this case, at the frequency f1, the first feeding branch 4211 has a first current flowing from the first end face 1 to the feeding point B and a second current flowing in a direction from the second end face 2 to the feeding point B. In addition, current distribution on the second radiator 422 is the same as current distribution on the second radiator 422 in the fifth embodiment. Therefore, it can be determined based on current distribution on the first feeding branch 4211 and the second radiator 422 that a resonance mode generated by the first feeding branch 4211 and the second radiator 422 at the frequency f1 is a convection mode. In addition, the frequency f1 is a resonance frequency of the convection mode.

In addition, at the frequency f2, the first feeding branch 4211 has a first current flowing from the first end face 1 to the feeding point B and a second current flowing in a direction from the second end face 2 to the feeding point B. In addition, current distribution on the second radiator 422 is the same as current distribution on the second radiator 422 in the fifth embodiment. Therefore, it can be determined based on current distribution on the first feeding branch 4211 and the second radiator 422 that a resonance mode generated by the first feeding branch 4211 and the second radiator 422 at the frequency f2 is a convection mode. In addition, the frequency f2 is a resonance frequency of the convection mode.

In this implementation, when the first feeding branch 4211 and the second radiator 422 receive the radio frequency signals, the first feeding branch 4211 and the second radiator 422 may generate the resonance frequency of the convection mode in the frequency band. The operating frequency band of the antenna is set near the resonance frequency of the convection mode. In this way, when the first feeding branch 4211 and the second radiator 422 radiate signals, the signals have little adverse impact on the user.

In the technical solutions of this application, according to the foregoing embodiments and implementations, it may be found that, in the technical solutions of this application, the structures of the first radiator 421 and the second radiator 422 are disposed to generate a convection mode with a low specific absorption rate by using the first radiator 42 and the second radiator 422, and further, when the first radiator 421 and the second radiator 422 radiate signals, the signals have little adverse impact on the user.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
    a first radiator comprising a first feeding branch comprising:
        a grounding point;
        a first end face; and
        a second end face disposed away from the first end face, wherein a first distance between a first center of the first end face and the grounding point is a first value, wherein a second distance between a second center of the second end face and the grounding point is a second value, and wherein a first ratio of the first value to the second value is within a range of 0.3 to 3; and
    a second radiator coupled to the first radiator and comprising:
        a first branch comprising a first head end, a first tail end, and a reference face, wherein a projection of the reference face on the first radiator is a first projection, and wherein the first projection is partly or completely overlapping the first radiator, or a shortest distance between the first projection and the first radiator is within a range of 0 to 3 millimeters;
        a second branch comprising a first end coupled between the first head end and the first tail end, and a second end, wherein the second branch faces away from the reference face; and
        a third branch comprising a second head end and a second tail end,
        wherein the second end is coupled between the second head end and second tail end,
        wherein the first head end and the first tail end are respectively located on two sides of the second branch,
        wherein the second head end and the second tail end are located on another two sides of the second branch;
        wherein a first center distance between a third end face of the second head end and the reference face is a third value,
    wherein a second center distance between a fourth end face of the second tail end and the reference face is a fourth value, and
    wherein a second ratio of the third value to the fourth value is within a range of 0.5 to 2.

2. The electronic device of claim 1, wherein the first radiator further comprises:
    a connection branch comprising a third end coupled between the first end face and the second end face, and a fourth end coupled between the first end face and the second end face; and
    a second feeding branch comprising a fifth end and a sixth end disposed away from the fifth end, wherein the fifth end and the sixth end are located on two sides of the connection branch, wherein a third distance between a third center of a fifth end face of the fifth end and the grounding point is a fifth value, wherein a fourth distance between a fourth center of a sixth end face of the sixth end and the grounding point is a sixth value, and wherein a third ratio of the fifth value to the sixth value is within a range of 0.3 to 3.

3. The electronic device of claim 1, wherein the first feeding branch further comprises:
    a feeding point;
    a fifth end face; and
    a sixth end face disposed away from the fifth end face, wherein a third distance between a third center of the fifth end face and the feeding point is a fifth value, wherein a fourth distance between a fourth center of the sixth end face and the feeding point is a sixth value, and wherein a ratio of the fifth value to the sixth value is within a range of 0.3 to 3.

4. The electronic device of claim 1, wherein the first radiator is an inverted-F antenna.

5. The electronic device of claim 1, wherein the first radiator is a composite left-handed antenna or a composite right-handed antenna.

6. The electronic device of claim 1, wherein the first radiator is a loop antenna.

7. The electronic device of claim 1, further comprising:
    a housing comprising a first surface and a second surface disposed opposite to the first surface, wherein the first radiator is fixed to the first surface, and wherein the second radiator is fixed to the second surface;
a screen mounted in the housing; and
an accommodating space enclosed by the screen and the housing, and facing the first surface.

8. The electronic device of claim 1, further comprising:
a housing;
a screen mounted in the housing;
an accommodating space enclosed by the screen and the housing, wherein the second radiator is fixed to a first surface of the housing either facing the accommodating space, or facing away from the accommodating space;
a circuit board located in the accommodating space; and
a support fixed to the circuit board, wherein the first radiator is fixed to a second surface of the support facing the accommodating space.

9. The electronic device of claim 1, further comprising:
a housing;
a screen mounted in the housing;
an accommodating space enclosed by the screen and the housing, wherein the second radiator is fixed to a surface of the housing either facing the accommodating space, or facing away from the accommodating space;
a circuit board located in the accommodating space; and
a support fixed to the circuit board and encloses a space with the circuit board, wherein the first radiator is fixed to a first surface of the support facing the space, and wherein the second radiator is fixed to a second surface of the support facing away from the space.

10. An electronic device comprising:
a first radiator comprising a first feeding branch comprising:
  a grounding point;
  a first end face; and
  a second end face disposed away from the first end face, wherein a first distance between a first center of the first end face and the grounding point is a first value, wherein a second distance between a second center of the second end face and the grounding point is a second value, and wherein a first ratio of the first value to the second value is within a range of 0.3 to 3; and
a second radiator coupled to the first radiator and comprising:
  a first bifurcation branch comprising a first head end and a first tail end, wherein the first tail end comprises a third end face;
  a second bifurcation branch comprising a second head end and a second tail end, wherein the second tail end comprises a fourth end face; and
  a first branch comprising:
    a first end coupled to the first head end and the second head end, wherein the first tail end and the second tail end are located on two different sides of the first branch; and
    a reference face facing away from the first bifurcation branch and the second bifurcation branch, wherein a projection of the reference face on the first radiator is a first projection, and wherein the first projection partly or completely overlaps the first radiator or a shortest distance between the first projection and the first radiator is within a range of 0 to 3 millimeters,
  wherein a first center distance between the third end face and the reference face is a third value, wherein a second center distance between the fourth end face and the reference face is a fourth value, and
  wherein a first second ratio of the third value to the fourth value is within a range of 0.5 to 2.

11. The electronic device of claim 10, wherein both the first bifurcation branch and the second bifurcation branch are strip-shaped, wherein an included angle between the first bifurcation branch and the second bifurcation branch is a, and wherein 0°<a≤180°.

12. The electronic device of claim 11, wherein the first radiator further comprises:
a connection branch comprising a third end coupled between the first end face and the second end face, and a fourth end coupled between the first end face and the second end face; and
a second feeding branch comprising a fifth end and a sixth end disposed away from the first end, wherein the fifth end and the sixth end are located on two sides of the connection branch, wherein a third distance between a third center of a fifth end face of the fifth end and the grounding point is a fifth value, wherein a fourth distance between a fourth center of a sixth end face of the sixth end and the grounding point is a sixth value, and wherein a third ratio of the fifth value to the sixth value is within a range of 0.3 to 3.

13. The electronic device of claim 10, wherein the first feeding branch further comprises:
a feeding point;
a fifth end face; and
a sixth end face disposed away from the fifth end face, wherein a third distance between a third center of the fifth end face and the feeding point is a fifth value, wherein a fourth distance between a fourth center of the sixth end face and the feeding point is a sixth value, and wherein a ratio of the fifth value to the sixth value is within a range of 0.3 to 3.

14. An electronic device comprising:
a first radiator comprising a first feeding branch comprising:
  a grounding point;
  a first end face; and
  a second end face disposed away from the first end face, wherein a first distance between a first center of the first end face and the grounding point is a first value, wherein a second distance between a second center of the second end face and the grounding point is a second value, and wherein a first ratio of the first value to the second value is within a range of 0.3 to 3; and
a second radiator coupled to the first radiator and comprising:
  a first bifurcation branch comprising a first head end and a first tail end, wherein the first head end comprises a third end face, and wherein the first tail end comprises a fourth end face;
  a second bifurcation branch comprising a second head end coupled to the first head end, and a second tail end, wherein the second head end comprises a fifth end face, and wherein the second tail end comprises a sixth end face; and
  a projection of the second radiator on the first radiator is a first projection,
  wherein the first projection is partly or completely overlapping the first radiator, or a shortest distance between the first projection and the first radiator is within a range of 0 to 3 millimeters, wherein a first center distance between the third end face the fourth end face is a third value, wherein a second center distance between the fifth end face and the sixth end face of is a fourth value, and wherein a second ratio of the third value to the fourth value is within a range of 0.2 to 2.

15. The electronic device of claim 14, wherein both the first bifurcation branch and the second bifurcation branch are strip-shaped, wherein an included angle between the first bifurcation branch and the second bifurcation branch is a, and wherein 0°<a<180°.

16. The electronic device of claim 14, wherein the first radiator further comprises:
   a connection branch comprising a third end coupled between the first end face and the second end face, and a fourth end coupled between the first end face and the second end face; and
   a second feeding branch comprising:
      a fifth end; and
      a sixth end disposed away from the fifth end, wherein the fifth end and the sixth end are located on two sides of the connection branch, wherein a third distance between a third center of an end face of the fifth end and the grounding point is a fifth value, wherein a fourth distance between a fourth center of an end face of the sixth end and the grounding point is an sixth value, and wherein a third ratio of the fifth value to the sixth value is within a range of 0.3 to 3.

17. The electronic device of claim 14, wherein the first feeding branch further comprises:
   a feeding point;
   a seventh end face; and
   an eighth end face disposed away from the third end face, wherein a third distance between a third center of the seventh end face and the feeding point is a fifth value, wherein a fourth distance between a fourth center of the eighth end face and the feeding point is a sixth value, and wherein a ratio of the fifth value to the sixth value is within a range of 0.3 to 3.

18. The electronic device of claim 14, wherein the first radiator has a quasi-symmetrical structure.

19. The electronic device of claim 14, wherein the first radiator has a symmetrical structure.

20. The electronic device of claim 14, wherein the first radiator is a loop antenna.

* * * * *

UNITED STATES PATENT AND TRADEMARK OFFICE
CERTIFICATE OF CORRECTION

PATENT NO. : 12,322,873 B2
APPLICATION NO. : 17/780848
DATED : June 3, 2025
INVENTOR(S) : Xiaowei Zhang et al.

Page 1 of 1

It is certified that error appears in the above-identified patent and that said Letters Patent is hereby corrected as shown below:

In the Claims

Claim 10, Column 54, Line 4: "wherein a first second ratio" should read "wherein a second ratio"

Signed and Sealed this
Fifteenth Day of July, 2025

Coke Morgan Stewart
*Acting Director of the United States Patent and Trademark Office*